United States Patent
Yoshida et al.

(10) Patent No.: US 6,897,718 B2
(45) Date of Patent: May 24, 2005

(54) LOW-LOSS MAGNETIC POWDER CORE, AND SWITCHING POWER SUPPLY, ACTIVE FILTER, FILTER, AND AMPLIFYING DEVICE USING THE SAME

(75) Inventors: Shoji Yoshida, Niigata-ken (JP); Hidetaka Kenmotsu, Niigata-ken (JP); Takao Mizushima, Niigata-ken (JP); Kazuaki Ikarashi, Niigata-ken (JP); Yutaka Naito, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 323 days.

(21) Appl. No.: 10/441,375

(22) Filed: May 20, 2003

(65) Prior Publication Data

US 2003/0205295 A1 Nov. 6, 2003

Related U.S. Application Data

(62) Division of application No. 09/809,366, filed on Mar. 15, 2001, now Pat. No. 6,594,157.

(30) Foreign Application Priority Data

| Mar. 21, 2000 | (JP) | 2000-079055 |
| Mar. 21, 2000 | (JP) | 2000-079056 |
| Mar. 21, 2000 | (JP) | 2000-079057 |
| Mar. 21, 2000 | (JP) | 2000-079061 |
| Aug. 31, 2000 | (JP) | 2000-264589 |

(51) Int. Cl.$^7$ .............. H03B 1/00; H03K 5/00; H04B 1/10
(52) U.S. Cl. ............. 327/552; 252/62.55; 148/304; 148/403
(58) Field of Search .............. 327/552; 252/62.55; 148/304, 403

(56) References Cited

U.S. PATENT DOCUMENTS

| 4,385,932 A | 5/1983 | Inomata et al. |
| 4,637,843 A | 1/1987 | Takayama et al. |
| 5,738,733 A | 4/1998 | Inoue |
| 5,876,519 A | 3/1999 | Inoue et al. |
| 5,961,745 A | 10/1999 | Inoue et al. |
| 5,976,274 A | 11/1999 | Inoue et al. |
| 6,077,367 A | 6/2000 | Mizushima et al. |
| 6,086,651 A | 7/2000 | Mizushima et al. |
| 6,172,589 B1 * | 1/2001 | Fujita et al. ............. 335/306 |
| 6,280,536 B1 * | 8/2001 | Inoue et al. ............. 148/302 |
| 6,350,323 B1 * | 2/2002 | Inoue et al. ............. 148/304 |

* cited by examiner

*Primary Examiner*—John P. Sheehan
(74) *Attorney, Agent, or Firm*—Brinks Hofer Gilson & Lione

(57) ABSTRACT

A magnetic powder core comprises a molded article of a mixture of a glassy alloy powder and an insulating material. The glassy alloy comprises Fe and at least one element selected from Al, P, C, Si, and B, and has a texture primarily composed of an amorphous phase. The glassy alloy exhibits a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature. The magnetic core precursor is produced mixing the glassy alloy powder with the insulating material, compacting the mixture to form a magnetic core precursor, and annealing the magnetic core precursor at a temperature in the range between $(T_g-170)$ K and $T_g$ K to relieve the internal stress of the magnetic core precursor. The glassy alloy exhibits low coercive force and low core loss.

1 Claim, 49 Drawing Sheets

LOW-LOSS MAGNETIC POWDER CORE, AND SWITCHING POWER SUPPLY, ACTIVE FILTER, FILTER, AND AMPLIFYING DEVICE USING THE SAME

This application is a divisional application of U.S. application Ser. No. 09/809,366 filed on Mar. 15, 2001 now U.S. Pat. No. 6,594,157, entitled "Low-Loss Magnetic Powder Core, And Switching Power Supply, Active Filter, Filter And Amplifying Device Using The Same".

BACKGROUND OF THE INVENTION

1. Field of the Invention

The present invention relates to magnetic powder cores and to methods for making the same. In particular, the present invention relates to a low-coercive-force, low-loss magnetic powder core and a method for making the same. The present invention also relates to switching power supplies, various converter circuits, and active filters. Furthermore, the present invention relates to filters and amplifying devices, and particularly, relates to a low-loss filter outputting less distorted waveforms.

2. Description of the Related Art

As magnetic cores used in core components, such as transformer cores for switching power supplies and smoothing choke cores, which require a constant permeability up to the high frequency region, ferrite closed-magnetic-circuit cores, ferrite gapped cores, and amorphous-alloy-tape-wound cores provided with gaps have been proposed. Also, magnetic powder cores formed by compacting a mixture of a powder, such as carbonyl iron, permalloy, or sendust, and an insulating material have been proposed.

Ferrite sintered magnetic cores exhibit low core loss, but simultaneously exhibit small saturation magnetic flux densities. Thus, in ferrite closed-magnetic-circuit cores and ferrite gapped cores, a leakage magnetic flux from the gap section adversely affects peripheral electric circuits. Magnetic powder cores using powders of carbonyl iron, permalloy, and sendust have the disadvantage of large core loss, although the cores exhibit higher saturation magnetic flux densities compared to ferrite magnetic cores.

In recent years, development of electronic devices has advanced with an increase in the use thereof. In particular, the weight of the development was shifted toward reducing heat dissipation by reducing the size of the electronic devices and reducing the power loss. In order to achieve these aims, switching power supplies, various DC/DC converter circuits, and active filters have been improved. These devices use various types of magnetic elements having magnetic cores. Ferrite is mainly used for the magnetic cores. In some cases, carbonyl iron magnetic cores, FeAlSi-alloy magnetic powder cores, and FeNi-alloy magnetic powder cores are also used.

A ferrite magnetic core is generally provided with a gap to prevent magnetic saturation. A leakage magnetic flux from the gap will adversely affect peripheral circuits. On the other hand, a NiZn ferrite core exhibits a large core loss, resulting in high heat dissipation from a device using this core. A carbonyl magnetic powder core exhibits an extremely large core loss, resulting in significantly high heat dissipation compared to ferrite magnetic cores. In addition, in a FeAlSi-alloy magnetic powder core and a FeNi-alloy magnetic powder core, the core loss thereof is lower than that of the carbonyl iron magnetic powder core, but still does not reach required levels.

Low-pass filters have been used for smoothing the pulse shape output from impulse modulation amplifiers. The requirements for low-pass filters are low loss and less distortion of smoothed waveforms. A low-pass filter is generally provided with a capacitor and an inductor composed of a coil with a magnetic core. Achievement of these requirements strongly depends on properties of the magnetic core constituting the inductor. Thus, conventional low-pass filters use amorphous magnetic cores provided with gaps, ferrite cores provided with gaps, or carbonyl iron gap-free magnetic powder cores.

However, in filters using amorphous magnetic cores provided with gaps or ferrite cores provided with gaps, leakage magnetic fields from the gaps may adversely affect peripheral elements and circuits, resulting in decreased stability in the entire circuits including the filters and generation of noise. Moreover, in these filters, the amplitude permeability varies with changes in the magnetic field and exhibits a large rate of change. When a pulsed current causing a large change in magnetic field is smoothed, the waveform will be significantly distorted.

In the carbonyl iron gap-free magnetic powder cores, the dependence of the amplitude permeability on the magnetic field is constant, and the waveform is not distorted. However, the carbonyl iron gap-free magnetic powder cores dissipate a significant amount of heat due to large core loss.

The large core loss in conventional magnetic powder cores is due to large core loss of the magnetic materials themselves used for the magnetic powder and insufficient relaxation of stress which is applied during compacting of the magnetic powder cores.

SUMMARY OF THE INVENTION

Accordingly, it is an object of the present invention to provide a magnetic powder core having low coercive force and low core loss and a method for making the same.

It is another object of the present invention to provide a switching power supply, converter circuits, and active filters which exhibit low heat dissipation and which can be miniaturized.

It is another object of the present invention to provide a filter which dissipates less heat due to low loss and which suppresses waveform distortion, and an amplifying device provided with this filter.

According to a first aspect of the present invention, a magnetic powder core comprises a molded article of a mixture of a glassy alloy powder and an insulating material, the glassy alloy comprising Fe and at least one element selected from Al, P, C, Si, and B, having a texture primarily composed of an amorphous phase, and exhibiting a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Since the magnetic powder core of the present invention comprises a mixture of the glassy alloy powder and the insulating material, the insulating material enhances the resistivity of the entire magnetic powder core. Thus, the magnetic powder core exhibits reduced core loss due to reduced eddy current loss and high permeability in a high-frequency region.

Preferably, the glassy alloy has a resistivity of at least 1.5 $\mu\Omega$.m. The eddy current loss in the glassy alloy particles in a high-frequency region is thereby effectively decreased, the magnetic powder core exhibiting further reduced core loss.

The magnetic powder has a coercive force of preferably 80 A/m or less and more preferably 40 A/m or less in an applied magnetic field of ±2.4 kA/m.

Preferably, the magnetic powder core has a core loss of 400 kW/m³ or less under the conditions of a frequency of 100 kHz and a magnetic flux density of 0.1 T. This core loss is significantly smaller than that of known magnetic powder cores.

Preferably, the insulating material comprises a silicone rubber. The silicone rubber is effective for relieving the internal stress of the magnetic powder core.

Preferably, the glassy alloy is represented by the following formula:

$$(Fe_{1-a}T_a)_{100-x-v-z-w}Al_x(P_{1-b}Si_b)_vC_zB_w$$

wherein T represents at least one element of Co and Ni, and the subscripts a, b, x, v, z, and w satisfy the relationships, $0 \leq a \leq 0.15$ by atomic ratio, $0 < b \leq 0.8$ by atomic ratio, 0 atomic percent $< x \leq 20$ atomic percent, 0 atomic percent $< v \leq 22$ atomic percent, 0 atomic percent $< z \leq 12$ atomic percent, and 0 atomic percent $< w \leq 16$ atomic percent.

The magnetic powder core of the present invention is formed of the above Fe-based glassy alloy powder in which the Fe content is higher than the Co and/or Ni content. Since this Fe-based glassy alloy exhibits higher saturation magnetic flux density than that of a Co-based glassy alloy, the magnetic powder core exhibits further improved magnetic characteristics.

According to a second aspect of the present invention, a method for making a magnetic powder core comprises a powder preparation step of preparing a powder of a glassy alloy comprising Fe and at least one element selected from Al, P, C, Si, and B, having a texture primarily composed of an amorphous phase, and exhibiting a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature, a molding step of mixing the glassy alloy powder with an insulating material and compacting the mixture to form a magnetic core precursor, and an annealing step of annealing the magnetic core precursor at a temperature in the range between $(T_g - 170)$ K and $T_g$ K to relieve the internal stress of the magnetic core precursor.

Preferably, the magnetic core precursor is annealed at a temperature between $(T_g - 140)$ K and $(T_g - 60)$ K in the annealing step. The internal stress formed in the glassy alloy or the magnetic core precursor during the powder preparation step or the molding step is relieved without crystallization of the glassy alloy.

More preferably, the magnetic core precursor is annealed at a temperature between $(T_g - 140)$ K and $(T_g - 60)$ K. When the magnetic core precursor is annealed at a temperature in the above range, the resulting magnetic powder core exhibits a coercive force of 80 A/m or less in an applied magnetic field of ±2.4 kA/m.

More preferably, the magnetic core precursor is annealed at a temperature between $(T_g - 110)$ K and $(T_g - 60)$ K. When the magnetic core precursor is annealed at a temperature in the above range, the resulting magnetic powder core exhibits a coercive force of 40 A/m or less in an applied magnetic field of ±2.4 kA/m.

In this method, the glassy alloy is preferably represented by the following formula:

$$(Fe_{1-a}T_a)_{100-x-v-z-w}Al_x(P_{1-b}Si_b)_vC_zB_w$$

wherein T represents at least one element of Co and Ni, and the subscripts a, b, x, v, z, and w satisfy the relationships, $0 \leq a \leq 0.15$ by atomic ratio, $0 < b \leq 0.8$ by atomic ratio, 0 atomic percent $< x \leq 20$ atomic percent, 0 atomic percent $< v \leq 22$ atomic percent, 0 atomic percent $< z \leq 12$ atomic percent, and 0 atomic percent $< w \leq 16$ atomic percent.

According to a third aspect of the present invention, a switching power supply comprises a switching element for converting a DC voltage into a rectangular waveform voltage, a transformer for transforming the rectangular waveform voltage, and a rectification circuit and a smoothing circuit for converting the transformed rectangular waveform voltage into a DC voltage, wherein the transformer comprises a magnetic core comprising a molded article of a mixture of a glassy alloy powder and an insulating material, the glassy alloy powder having a texture primarily composed of an amorphous phase and exhibiting a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Since the switching power supply of the present invention includes a transformer having a magnetic core composed of a glassy alloy powder and an insulating material, the internal stress of the magnetic core can be relieved by annealing at a temperature which is sufficiently lower than the crystallization temperature of the glassy alloy, and the heat dissipation from the entire switching power supply can be reduced due to reduced core loss.

The magnetic core exhibiting low permeability does not require a gap for preventing magnetic saturation, and does not generate a leakage magnetic field which adversely affects other peripheral circuit.

According to a fourth aspect of the present invention, a switching power supply comprises a switching element for converting a DC voltage into a rectangular waveform voltage, a transformer for transforming the rectangular waveform voltage, and a rectification circuit and a smoothing circuit for converting the transformed rectangular waveform voltage into a DC voltage, wherein the smoothing circuit comprises a capacitor and a coil provided with a magnetic core, the magnetic core comprising a molded article of a mixture of a glassy alloy powder and an insulating material, the glassy alloy powder comprising Fe and at least one element selected from Al, P, C, Si, and B, having a texture primarily composed of an amorphous phase, and exhibiting a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Since the switching power supply of the present invention includes a transformer having a magnetic core composed of a glassy alloy powder, the internal stress of the magnetic core can be relieved by annealing at a temperature which is sufficiently lower than the crystallization temperature of the glassy alloy, and the heat dissipation from the entire switching power supply can be reduced due to reduced core loss.

The magnetic core exhibiting low permeability does not require a gap for preventing magnetic saturation, and does not generate a leakage magnetic field which adversely affects other peripheral circuit.

According to a fifth aspect of the present invention, a step-down converter circuit comprises a switching element, a coil provided with a magnetic core generating a back electromotive force when the switching element breaks a DC current, a capacitor for smoothing a current generated by the back electromotive force, and a rectifying element connected to the coil provided with the magnetic core in an antiparallel state, the rectifying element, the coil provided with the magnetic core, and the capacitor constituting a circulating current path, wherein the magnetic core comprises a molded article of a mixture of a glassy alloy powder and an insulating material, the glassy alloy having a texture primarily composed of an amorphous phase and exhibiting a temperature difference $\Delta T_x$, which is represented by the equation $\Delta T_x=T_x-T_g$, of at least 20 K in a supercooled liquid, wherein $T_x$ indicates the crystallization temperature and $T_g$ indicates the glass transition temperature.

According to a sixth aspect of the present invention, a boosting converter circuit comprises a switching element, a coil provided with a magnetic core generating a back electromotive force when the switching element breaks a DC current, a rectifying element connected in series in the forward direction to the coil provided with the magnetic core for rectifying a current generated by the back electromotive force, and a capacitor for smoothing the rectified current, wherein the magnetic core comprises a molded article of a mixture of a glassy alloy powder and an insulating material, the glassy alloy having a texture primarily composed of an amorphous phase and exhibiting a temperature difference $\Delta T_x$, which is represented by the equation $\Delta T_x=T_x-T_g$, of at least 20 K in a supercooled liquid, wherein $T_x$ indicates the crystallization temperature and $T_g$ indicates the glass transition temperature.

According to a seventh aspect of the present invention, a polarity-reversing converter circuit comprises a switching element, a coil provided with a magnetic core generating a back electromotive force when the switching element breaks a DC current, a capacitor for smoothing a current generated by the back electromotive force, and a rectifying element connected in series in the backward direction to the coil provided with the magnetic core for blocking the DC current, wherein the magnetic core comprises a molded article of a mixture of a glassy alloy powder and an insulating material, the glassy alloy having a texture primarily composed of an amorphous phase and exhibiting a temperature difference $\Delta T_x$, which is represented by the equation $\Delta T_x=T_x-T_g$, of at least 20 K in a supercooled liquid, wherein $T_x$ indicates the crystallization temperature and $T_g$ indicates the glass transition temperature.

In the step-down converter circuit, the boosting converter circuit, and the polarity-reversing converter circuit, a magnetic core composed of a glassy alloy powder is used. Thus, the internal stress of the magnetic core can be relieved by annealing at a temperature which is sufficiently lower than the crystallization temperature of the glassy alloy, and the heat dissipation from the entire switching power supply can be reduced due to reduced core loss.

The magnetic core exhibiting low permeability does not require a gap for preventing magnetic saturation, and does not generate a leakage magnetic field which adversely affects other peripheral circuit.

According to an eighth aspect of the present invention, an active filter comprises the above-described boosting converter circuit, and a control unit for controlling the switching interval of the switching element of the boosting converter circuit.

The active filter of the present invention uses a coil with a magnetic core composed of a glassy alloy powder in the converter circuit therein. Since this magnetic core exhibits low loss, the heat dissipation from the entire active filter can be reduced.

The magnetic core exhibiting low permeability does not require a gap for preventing magnetic saturation, and does not generate a leakage magnetic field which adversely affects other peripheral circuits.

In the above aspects, the magnetic core exhibits low core loss and low permeability, reducing heat dissipation.

Moreover, the magnetic core exhibiting low permeability does not require a gap for preventing magnetic saturation, and does not generate a leakage magnetic field, which adversely affects other peripheral circuit.

Moreover, the insulating material enhances the resistivity of the entire magnetic core and further reduces core loss due to reduced eddy current loss.

According to a ninth aspect of the present invention, a filter comprises a capacitor and an inductor of a coil wound around a magnetic core, wherein the magnetic core comprises a molded article of a mixture of a glassy alloy powder and an insulating material, the glassy alloy having a texture primarily composed of an amorphous phase and exhibiting a temperature difference $\Delta T_x$, which is represented by the equation $\Delta T_x=T_x-T_g$, of at least 20 K in a supercooled liquid, wherein $T_x$ indicates the crystallization temperature and $T_g$ indicates the glass transition temperature.

In this filter, the internal stress of the glassy alloy can be relieved by annealing at a temperature which is sufficiently lower than the crystallization temperature of the glassy alloy, and the magnetic core exhibits low core loss and a substantially constant amplitude permeability over a wide intensity range of magnetic field. Thus, the filter exhibits reduced heat dissipation and outputs less distorted waveforms.

Moreover, the insulating material enhances the resistivity of the entire magnetic core and further reduces core loss due to reduced eddy current loss. Since high permeability is maintained in a high-frequency region, the filter exhibits further improved high-frequency characteristics.

Preferably, the rate of change in amplitude permeability of the magnetic core in a magnetic field of 2,000 A/m is within ±10% of an amplitude permeability in a magnetic field of 200 A/m, and the permeability of the magnetic core at 100 kHz is in the range of 50 to 200.

The filter outputs less distorted waveforms. Thus, the filter is preferably applicable to a smoothing circuit of a pulse width modulating amplifier.

Preferably, the filter is a low-pass filter. That is, the capacitor and the inductor are connected into an L shape.

Preferably, the glassy alloy is represented by the following formula:

$$(Fe_{1-a2}T_{a2})_{100-x2-v2-z2-w2}Al_{x2}(P_{1-b2}Si_{b2})_{v2}C_{z2}B_{w2}$$

wherein T represents at least one element of Co and Ni, and the subscripts a2, b2, x2, v2, z2, and w2 satisfy the relationships, $0 \leq a2 \leq 0.15$ by atomic ratio, $0 < b2 \leq 0.8$ by atomic ratio, 0 atomic percent $< x2 \leq 20$ atomic percent, 0 atomic percent $< v2 \leq 22$ atomic percent, 0 atomic percent $< z2 \leq 12$ atomic percent, and 0 atomic percent $< w2 \leq 16$ atomic percent.

Since the magnetic core composed of the glassy alloy having the above composition exhibits reduced core loss and a substantially constant amplitude permeability over a variable magnetic field, the filter using the magnetic core exhibits reduced loss and reduced heat dissipation, and outputs waveforms with less distortion.

According to a tenth aspect of the present invention, an amplifying device comprises an amplifier for outputting a pulsed current and a filter connected to the output side of the amplifier for smoothing the pulsed current, wherein the filter comprises a capacitor and an inductor of a coil wound around a magnetic core, wherein the magnetic core comprises a molded article of a mixture of a glassy alloy powder and an insulating material, the glassy alloy having a texture primarily composed of an amorphous phase and exhibiting a temperature difference $\Delta T_x$, which is represented by the equation $\Delta T_x=T_x-T_g$, of at least 20 K in a supercooled liquid, wherein $T_x$ indicates the crystallization temperature and $T_g$ indicates the glass transition temperature.

In the amplifying device of the present invention, the magnetic core composed of the glassy alloy powder and the insulating material. The internal stress of the magnetic core can be relieved by annealing at a temperature which is sufficiently lower than the crystallization temperature of the glassy alloy, and the heat dissipation from the amplifying device can be reduced due to reduced core loss. The amplifying device outputs waveforms with less distortion.

Moreover, the insulating material enhances the resistivity of the entire magnetic core and further reduces core loss due to reduced eddy current loss. Since high permeability is maintained in a high-frequency region, the filter exhibits reduced loss and outputs waveforms with less distortion.

Preferably, the rate of change in amplitude permeability of the magnetic core in a magnetic field of 2,000 A/m is within ±10% of an amplitude permeability in a magnetic field of 200 A/m, and the permeability of the magnetic core at 100 kHz is in the range of 50 to 200.

Within the above rate of change, the output waveform from the amplifying device is less distorted. Moreover, the number of turns of the coil can be reduced, thus resulting in a reduction in size of the amplifying device.

Preferably, the filter is a low-pass filter.

Preferably, the amplifier is a pulse-width-modulation amplifier.

Preferably, the glassy alloy is represented by the following formula:

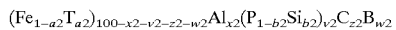

$(Fe_{1-a2}T_{a2})_{100-x2-v2-z2-w2}Al_{x2}(P_{1-b2}Si_{b2})_{v2}C_{z2}B_{w2}$ wherein T represents at least one element of Co and Ni, and the subscripts a2, b2, x2, v2, z2, and w2 satisfy the relationships, $0 \leq a2 \leq 0.15$ by atomic ratio, $0 < b2 \leq 0.8$ by atomic ratio, 0 atomic percent $< x2 \leq 20$ atomic percent, 0 atomic percent $< v2 \leq 22$ atomic percent, 0 atomic percent $< z2 \leq 12$ atomic percent, and 0 atomic percent $< w2 \leq 16$ atomic percent.

Since the magnetic core composed of the glassy alloy having the above composition exhibits reduced core loss and a substantially constant amplitude permeability over a variable magnetic field, the amplifying device using the magnetic core exhibits reduced loss and outputs waveforms with less distortion.

DESCRIPTION OF THE PREFERRED EMBODIMENTS

Preferred embodiments of a magnetic powder core and a method for making the same in accordance with the present invention will now described with reference to the drawings.

The magnetic powder core comprises a molded article of a mixture of a glassy alloy powder and an insulating material, the glassy alloy comprises Fe and at least one element Q selected from Al, P, C, Si, and B, has a texture primarily composed of an amorphous phase, and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature. Preferably, the glassy alloy has a resistivity of at least 1.5 $\mu\Omega$.m.

Figure 1:
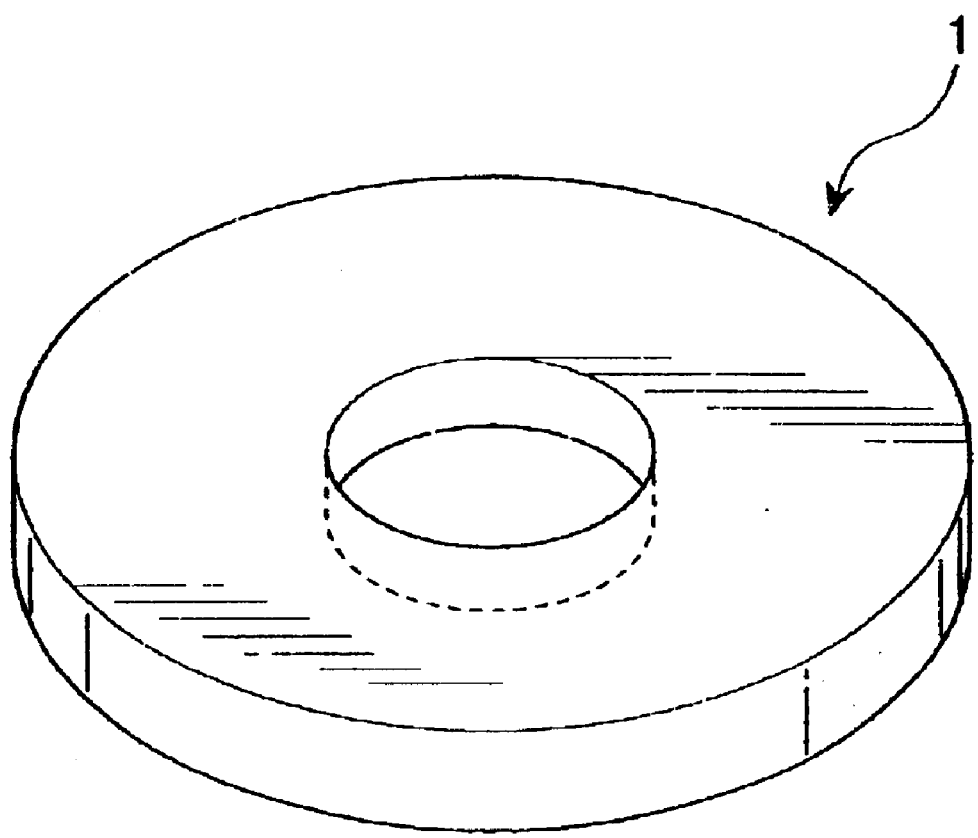
FIG. 1 is an isometric view of an embodiment of a magnetic powder core in accordance with the present invention.

FIG. 1 shows a toroidal magnetic powder core 1. The magnetic powder core 1, however, may have any other shape, e.g., an ellipsoidal ring, an oval ring, an E shape, a U shape, or an I shape.

In the texture constituting the magnetic powder core, the glassy alloy powder is dispersed in the insulating material. Thus, the glassy alloy powder does not form a homogeneous texture which can be formed by the melt of the glassy alloy. Preferably, individual particles are insulated from each other in the matrix of the insulating material. Thus, the magnetic powder core has large resistivity, reduced eddy current loss, and a moderated reduction in permeability in a high-frequency region.

When the temperature difference $\Delta T_x$ in the supercooled liquid of the glassy alloy is less than 20 K, it is difficult to adequately relieve the internal stress without crystallization at an annealing treatment after the compaction molding of the mixture of the glassy alloy powder and the insulating material. When the temperature difference $\Delta T_x$ is at least 20 K, the annealing can be performed at a lower temperature which does not cause excess decomposition of the insulating layer and increased loss.

In the magnetic powder core of the present invention, the magnetic powder has a coercive force of preferably 80 A/m or less and more preferably 40 A/m or less in an applied magnetic field of ±2.4 kA/m.

The insulating material enhances resistivity of the magnetic powder core and maintains the shape of the magnetic powder core by binding the glassy alloy powder. Insulating materials which do not cause large loss in magnetic properties are preferred. Examples of such insulating materials include liquid or powdered organic compounds, e.g., epoxy resins, silicone resins, phenolic resins, urea resins, melamine resins, and polyvinyl alcohol (PVA); liquid glass, i.e., $Na_2O$—$SiO_2$; oxide glass powders, e.g., $Na_2O$—$B_2O_3$—$SiO_2$, PbO—$B_2O_3$—$SiO_2$, PbO—BaO—$SiO_2$, $Na_2O$—$B_2O_3$—ZnO, CaO—BaO—$SiO_2$, $Al_2O_3$—$B_2O_3$—$SiO_2$, and $B_2O_3$—$SiO_2$; and glassy substances formed by sol-gel processes and primarily composed of $SiO_2$, $Al_2O_3$, $ZrO_2$, and $TiO_2$.

The insulating material may be any elastomer, for example, a silicone rubber. The insulating material may be used together with a stearate salt as a lubricant. Examples of stearate salts include zinc stearate, calcium stearate, barium stearate, magnesium stearate, and aluminum stearate.

The glassy alloy powder constituting the magnetic powder core of the present invention is prepared by pulverizing a tape of a glassy alloy having the above-mentioned composition, texture, and properties, by atomizing the melt of the glassy alloy onto a rotating cooling roller, by atomizing and cooling the melt of the glassy alloy with a high-pressure gas, or by atomizing the melt of the glassy alloy into water. Since the glassy alloy powder has a texture primarily composed of an amorphous phase, it exhibits superior soft magnetic characteristics, such as low coercive force.

In particular, the powder prepared by atomizing and cooling the melt of the glassy alloy with a high-pressure gas has higher sphericity compared with the powders prepared by the other processes, resulting in high processability and moldability. Accordingly, this powder is suitable for the magnetic powder core of the present invention.

The glassy alloy has a large temperature difference $\Delta T_x$ of 40 K or more and particularly 50 K or more, and has a large resistivity of at least 1.5 $\mu\Omega$.m in optimized compositions. These properties are not obtainable from conventional alloys. Moreover, the glassy alloy of the present invention exhibits the superior soft magnetic characteristics at room temperature, unlike conventional alloys.

In the supercooled region, which correspond to the temperature difference $\Delta T_x$, the glassy alloy of the present invention maintains a liquid arrangement of atoms. The mobility of these atoms is so low that crystallization does not substantially occur, although atomic vibration occurs.

In the glassy alloy having a large temperature difference $\Delta T_x$, the atomic mobility is low during cooling the melt, and the supercooled liquid state is maintained over a broad temperature range. Since the glassy alloy of the present invention has a large temperature difference $\Delta T_x$ in a supercooled liquid, the alloy is readily supercooled to a glass transition temperature $T_g$ below the crystallization temperature $T_x$ without being crystallized during a cooling step of the melt, readily forming an amorphous phase.

Thus, the amorphous phase can be formed at a relatively low cooling rate. For example, a glassy alloy powder primarily composed of an amorphous phase is obtainable by pulverizing a bulk glassy alloy, which is prepared by a casting process, in addition to liquid quenching processes having relatively high cooling rates, such as a single-roller process.

The glassy alloy preferably used in the magnetic powder core of the present invention contains, for example, iron (Fe) as the major component, aluminum (Al), and at least one element Q selected from P, B, C, and Si. Preferably, the glassy alloy contains all of P, B, C, and Si represented by the element Q.

The glassy alloy may be represented by the following formula:

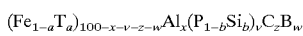

$$(Fe_{1-a}T_a)_{100-x-v-z-w}Al_x(P_{1-b}Si_b)_vC_zB_w$$

wherein T represents at least one element of Co and Ni, and the subscripts a, b, x, v, z, and w satisfy the relationships, $0 \leq a \leq 0.15$ by atomic ratio, $0 < b \leq 0.8$ by atomic ratio, 0 atomic percent $< x \leq 20$ atomic percent, 0 atomic percent $< v \leq 22$ atomic percent, 0 atomic percent $< z \leq 12$ atomic percent, and 0 atomic percent $< w \leq 16$ atomic percent.

Preferably, the subscripts a, b, x, v, z, and w satisfy the relationships, $0 \leq a \leq 0.15$ by atomic ratio, 0.1 by atomic ratio $\leq b \leq 0.35$ by atomic ratio, 0 atomic percent $< x \leq 15$ atomic percent, 8 atomic percent $< v \leq 18$ atomic percent, 0.5 atomic percent $\leq z \leq 7.4$ atomic percent, and 3 atomic percent $\leq w \leq 14$ atomic percent. More preferably, the subscripts a, b, x, v, z, and w satisfy the relationships, $0 \leq a \leq 0.15$ by atomic ratio, 0.1 by atomic ratio $\leq b \leq 0.28$ by atomic ratio, 0 atomic percent$<x \leq 10$ atomic percent, 11.3 atomic percent$<v \leq 14$ atomic percent, 1.8 atomic percent$\leq z \leq 4.6$ atomic percent, and 5.3 atomic percent$\leq w \leq 8.6$ atomic percent.

Fe—Al—Ga—C—P—Si—B glassy alloys are known. These glassy alloys contain iron (Fe) and other elements which facilitate the formation of an amorphous phase, such as aluminum (Al), gallium (Ga), carbon (C), phosphorus (P), silicon (Si), and boron (B).

On the other hand, the glassy alloy of the present invention contains Fe, Al, and at least one element Q selected from P, B, C, and Si. That is, the glassy alloy of the present invention does not contain Ga, but does contain an increased amount of Al. Thus, the present invention is characterized in that the glassy alloy of the present invention can contain an amorphous phase regardless of the omission of Ga, which has been considered to be an essential element for the formation of the amorphous layer, and that this glassy alloy has a large temperature difference $\Delta T_x$ in a supercooled liquid. These facts have been discovered by the present inventors.

Aluminum (Al) is an essential element for the amorphous soft-magnetic alloy. At an Al content x of 20 atomic percent or less, this alloy has a perfect amorphous phase due to extremely enhanced amorphous formability of Al, and the amorphous soft-magnetic alloy has a temperature difference $\Delta T_x$ of 20 K or more in a supercooled liquid.

Since Al has a negative enthalpy of mixing with Fe and has an atomic radius which is larger than that of Fe, a combined use of Al with P, B, and Si, which have atomic radii smaller than that of Fe, inhibits crystallization and can yield a thermally stable amorphous structure.

The Al content x is preferably 20 atomic percent or less, more preferably more than 0 atomic percent to 15 atomic percent, and most preferably more than 0 atomic percent to 10 atomic percent. An Al content x exceeding 20 atomic percent, the alloy has a decreased saturation magnetization due to a relatively low Fe content and does not have a temperature difference $\Delta T_x$ in a supercooled liquid.

Iron (Fe) is essential for the glassy alloy of the present invention as a magnetic element. In the present invention, Fe may be partially replaced with at least one element T selected from Co and Ni. A higher Fe content contributes to improved saturation magnetization of the resulting glassy alloy.

Carbon (C), phosphorus (P), silicon (Si), and boron (B) contribute to the formation of an amorphous phase. A multicomponent system containing Fe, Al, and these elements facilitates the formation of a more stable amorphous phase, compared with an Fe—Al binary system.

In particular, phosphorus (P) having high amorphous formability facilitates the formation of a perfect amorphous phase over the entire texture of the glassy alloy and ensures an adequate temperature difference $\Delta T_x$ in a supercooled liquid. Combined addition of phosphorus and silicon causes a further increased temperature difference $\Delta T_x$ in a supercooled liquid.

When both phosphorus and silicon are added in combination, the total content v of the phosphorus and silicon is preferably more than 0 to 22 atomic percent, more preferably 8 to 18 atomic percent, and most preferably 11.3 to 14 atomic percent. The combined use of P and S with a preferred total content v contributes to an improved temperature difference $\Delta T_x$ in a supercooled liquid.

The subscript b representing the relative Si and P contents by atomic ratio is preferably in the range of $0<b \leq 0.8$ when 0 atomic percent$<v \leq 22$ atomic percent, $0.1 \leq b \leq 0.35$ when 8 atomic percent$\leq v \leq 18$ atomic percent, or $0.1 \leq b \leq 0.28$ when 11.3 atomic percent$\leq v \leq 14$ atomic percent.

When the subscript b exceeds 0.8, an excess amount of Si may undesirably cause disappearance of the temperature difference $\Delta T_x$ in the supercooled liquid.

Herein, the Si content in the glassy alloy is in the range of preferably 17.6 atomic percent or less, more preferably 0.8 to 6.3 atomic percent, and most preferably 1.13 to 3.92 atomic percent.

The above-mentioned ranges for the subscripts b and v representing the P and Si contents, respectively, contribute to an increased temperature difference $\Delta T_x$ in a supercooled liquid.

The subscript z representing the C content is in the range of preferably more than 0 to 12 atomic percent, more preferably 0.5 to 7.4 atomic percent, and most preferably 1.8 to 4.6 atomic percent.

The subscript w representing the B content is in the range of preferably more than 0 to 16 atomic percent, more preferably 3 to 14 atomic percent, and most preferably 5.3 to 8.6 atomic percent.

The glassy alloy may contain 4 atomic percent or less Ge, and 0 to 7 atomic percent of at least one element selected from the group consisting of Nb, Mo, Hf, Ta, W, Zr, and Cr.

The glassy alloy of the present invention has a temperature difference $\Delta T_x$ of at least 20 K in the above-described composition, at least 35 K in a particular composition, or at least 50 K in an optimized composition.

The glassy alloy of the present invention may contain other incidental impurities.

An embodiment of a method for making the magnetic powder core in accordance with the present invention will now be described with reference to the drawings.

The method for making the magnetic powder core includes a powder preparation step of preparing a powder of a glassy alloy comprising Fe and at least one element Q selected from Al, P, C, Si, and B, having a texture primarily composed of an amorphous phase, and exhibiting a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature, a molding step of mixing the glassy alloy powder with an insulating material and compacting the mixture to form a magnetic core precursor, and an annealing step of annealing the magnetic core precursor at a temperature in the range between $(T_g - 170)$ K and $T_g$ K to relieve the internal stress of the magnetic core precursor.

In the powder preparation step, for example, a glassy alloy powder is prepared by pulverizing a glassy alloy tape and then classifying the particles.

The glassy alloy tape is produced by a roller quenching process in which the melt of the glassy alloy is jetted onto a cold rotating roller so that the melt is quenched. The glassy alloy tape may be pulverized using a rotor mill, a ball mill, a jet mill, an atomizer, or a grinding mill.

The trituration is classified to select particles having a predetermined average particle size. The average particle size of the powder is preferably 30 μm or more and more preferably 45 μm to 300 μm. At an average particle size of less than 30 μm, particles may be contaminated by a rotor mill or the like during pulverizing. At an average particle size exceeding 300 μm, relatively large particles may cause the formation of voids in the magnetic powder core in a compaction molding process of a mixture of the powder and an insulating material, resulting in undesirably large coercive force. The classification of the trituration may be performed using a screen, a vibrating screen, an ultrasonic screen, or an air-flow classifier.

In another embodiment of the powder preparation step, the mist of the glassy alloy melt having the above-mentioned composition is sprayed onto a rotating cooling roller. In this process, glassy alloy powder is easily obtained. The average particle size of the powder is determined by controlling the rotation rate of the cooling roller, the temperature of the melt, and spraying conditions.

The glassy alloy powder is also prepared by a gas atomizing process, which involves atomizing a glassy alloy melt with a high pressure gas into a gaseous atmosphere for cooling, or by an aqueous atomizing process, which involves atomizing a glassy alloy melt into water for cooling.

In the gas atomizing process, a crucible with a jet nozzle is filled with the glassy alloy melt maintained at a temperature which is at least 140° C. higher than the melting point of the glassy alloy, and the melt is atomized with an inert gas, such as nitrogen or argon, of a pressure of at least 5.9 MPa. The gaseous atmosphere is preferably an inert gas atmosphere of, for example, argon or nitrogen, in order to prevent oxidation of the alloy.

The atomized melt is instantaneously cooled and is converted into substantially spherical particles having a texture primarily composed of an amorphous phase. In particular, the glassy alloy of the present invention containing Fe, Al, and at least one element Q selected from P, B, C, and Si exhibits high formability of an amorphous phase. Thus, an amorphous alloy can be produced by a gas atomizing process, which is not applicable to conventional FeSiB-based alloys.

The average particle size of the glassy alloy powder prepared by a gas atomizing process is preferably in the range of 2 to 100 $\mu$m and more preferably 2 to 60 $\mu$m. An average particle size of less than 2 $\mu$m decreases the density of the compact, and the magnetic powder core has a decreased saturation magnetic flux density, a decreased permeability, an increased coercive force, and an increased core loss. An average particle size exceeding 100 $\mu$m may cause the formation of voids in the magnetic powder core during compaction molding of a mixture of the glassy alloy powder and an insulating material, resulting in increased coercive force. Moreover, these particles have reduced cooling rates. As a result, the amorphous phase has a decreased volume fraction in the texture.

It is preferable that the average particle size of the resulting powder be precisely controlled using a screen, a vibrating screen, an ultrasonic screen, or an air-flow classifier, although the average particle size is controllable to some extent by the temperature of the melt and the gas pressure during the spraying operation.

In the subsequent molding step, the glassy alloy powder is mixed with the above-mentioned insulating material, and the mixture is compacted to form a magnetic core precursor. The content of the insulating material is preferably 0.3 weight percent to 5 weight percent and more preferably 1 weight percent to 5 weight percent in the mixture. An insulating material content of less than 0.3 weight percent precludes molding of the mixture into a predetermined shape. An insulating material content exceeding 5 weight percent causes deterioration of the soft magnetic characteristics of the magnetic powder core due to a decreased glassy alloy content in the magnetic powder core. Prior to the compaction molding, the solvents and moisture contained in the mixture are preferably removed by evaporation so as to form an insulating layer on the surface of the glassy alloy powder.

Figure 2:
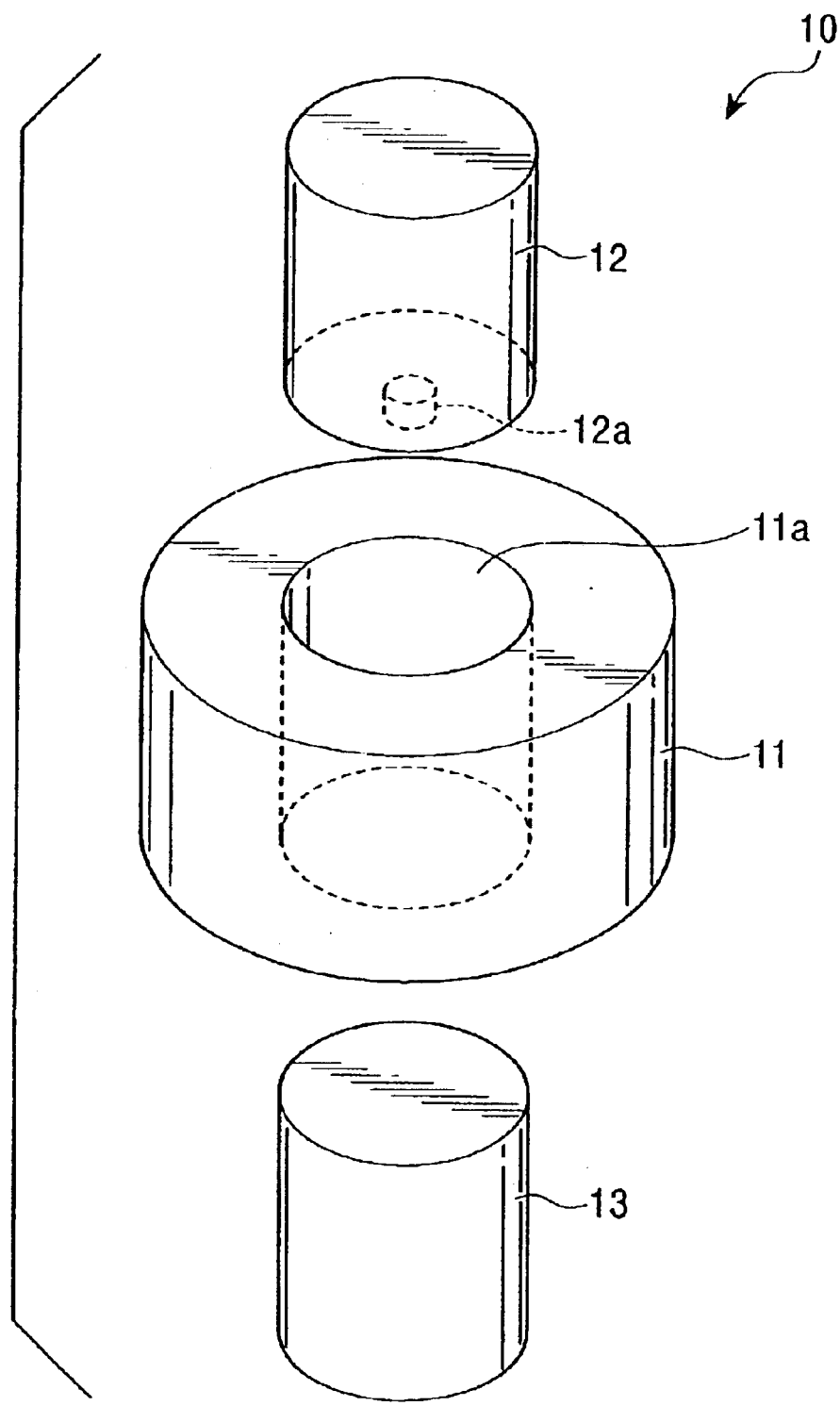
FIG. 2 is an isometric partially broken-away view of a mold used in the production of a magnetic powder core in accordance with the present invention.

Next, the mixture is compacted to form a magnetic core precursor, using a mold 10 shown in FIG. 2. The mold 10 substantially consists of a hollow cylindrical die 11, an upper punch 12, and a lower punch 13. The upper punch 12 and the lower punch 13 will be inserted into a hollow section 11a of the hollow cylindrical die 11. The upper punch 12 has a cylindrical protrusion 12a on the bottom face thereof. An assembly of the upper punch 12, the lower punch 13, and the hollow cylindrical die 11 forms a toroidal mold in the interior of the mold 10. The toroidal mold is filled with the above-mentioned mixture.

The mixture is heated to a predetermined temperature in the mold 10 while applying a unidirectional pressure to compact the mixture.

Figure 3:
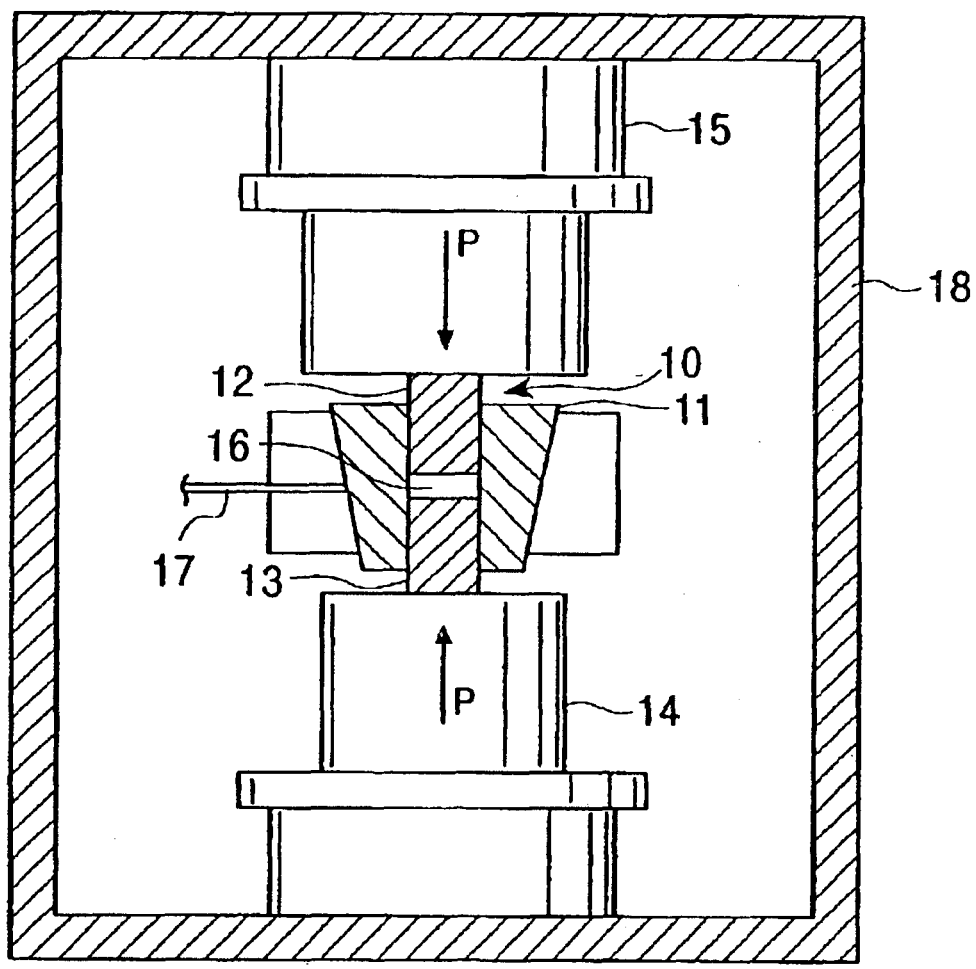
FIG. 3 is a schematic cross-sectional view of a discharge plasma sintering apparatus used in the production of a magnetic powder core in accordance with the present invention.

FIG. 3 is a schematic cross-sectional view of a discharge plasma sintering apparatus which is suitable for compaction molding. The discharge plasma sintering apparatus has the mold 10 filled with the mixture, a lower punch electrode 14, an upper punch electrode 15, and a thermocouple 17 for measuring the temperature of the mixture in the mold 10. The lower punch electrode 14 supports the lower punch 13 and functions as an electrode for applying a pulsed current, whereas the upper punch electrode 15 compresses the upper punch 12 downwardly and functions as another electrode for the pulsed current.

The discharge plasma sintering apparatus is placed in a chamber 18 which is connected to a vacuum pumping system and an atmospheric gas supplying system (both are not shown in the drawing) so that the mixture loaded into the mold 10 is placed in a desired atmosphere, such as an inert gas atmosphere.

The lower punch electrode 14 and the upper punch electrode 15 are connected to an energizing system (not shown in the drawing) so as to supply electrical power between the lower punch 13 and the upper punch 12.

The mold 10 filled with the mixture is placed into the discharge plasma sintering apparatus, and the apparatus is evacuated while the mixture is heated by a pulsed current applied to the upper punch 12 and the lower punch 13 under a unidirectional pressure P applied between the upper punch 12 and the lower punch 13, to complete compaction molding.

Since the applied pulsed current can rapidly heat the mixture to a predetermined temperature in the discharge plasma sintering apparatus, the glassy alloy can be compacted within a short molding time without deterioration of the amorphous phase.

The temperature during the compaction molding depends on the type of the insulating material and the composition of the glassy alloy. In a combination of a liquid-glass insulating material and a glassy alloy tape having a composition of $Fe_{70}Al_7P_{9.65}C_{2.3}B_{8.05}Si_3$, the temperature must be 373 K (100° C.) or more so that the glassy alloy particles are bonded to each other in the matrix of the insulating material, and must be 673 K (400° C.) or less so that the melted insulating material does not ooze from the mold 10. If the insulating material oozes from the mold 10, the magnetic powder core has decreased resistivity due to a decreased insulating material content, resulting in decreased permeability in a high-frequency region.

When the mixture is compacted at a temperature between 373 K (100° C.) and 673 K (400° C.), the insulating material is moderately softened so that the glassy alloy particles are bonded to each other and the mixture is maintained to a desired shape.

In compaction molding under a significantly low unidirectional pressure P, the density of the magnetic powder core is not increased, that is, the magnetic powder core is not dense. Under a high pressure P, the insulating material oozes out, and the insulating material content in the magnetic powder core decreases, resulting in decrease in resistivity and permeability in a high-frequency region. A preferred unidirectional pressure P is determined by the type of the insulating material and the composition of the glassy alloy. In a combination of a liquid-glass insulating material and a glassy alloy tape having a composition of $Fe_{70}Al_7P_{9.65}C_{2.3}B_{8.05}Si_3$, the unidirectional pressure P is in the range of preferably 600 MPa to 1,500 MPa and more preferably 600 MPa to 900 MPa. A toroidal magnetic core precursor is prepared in such a manner.

When a silicone rubber is used as the insulating material, a mixture of the glassy alloy powder and the silicone rubber can be compacted at room temperature in the above molding process to obtain a magnetic core precursor having a predetermined shape.

Since the silicone rubber has elasticity, the glassy alloy powder exhibits small hardening stress and small internal residual stress. Thus, the resulting glassy alloy exhibits improved soft magnetic characteristics without the affection by magnetostriction. As a result, the magnetic powder core exhibits significantly improved coercive force and core loss.

This magnetic powder core exhibits a core loss of 400 $kW/m^3$ or less at a frequency of 100 kHz and a magnetic flux density of 0.1 T. This value is significantly smaller than that of a conventional magnetic powder core.

When a significantly low pressure is applied to the mixture during the compaction molding using the silicone rubber, the resulting magnetic powder core is not dense. When a significantly high pressure is applied, the silicone rubber oozes out, resulting in a decreased silicone rubber content in the magnetic powder core, and the resistivity of the magnetic powder core is decreased, resulting in decreased permeability at a high-frequency region. The preferred pressure depends on the composition of the glassy alloy. When a glassy alloy having a composition of $Fe_{77}Al_1P_{9.23}C_{2.2}B_{7.7}Si_{2.87}$ is used, the pressure is in the range of preferably 500 MPa to 2,500 MPa and more preferably 1,000 MPa to 2,000 MPa.

Next, an annealing step is performed for annealing the magnetic core precursor to relieve the internal stress thereof. The internal stress occurs in the magnetic core precursor and the glassy alloy powder during the powder preparation step and the molding step. The stress is relieved by annealing the magnetic core precursor within a predetermined temperature difference. The resulting magnetic powder core exhibits low coercive force.

The annealing temperature is in the range of desirably $(T_g-170)$ K to $(T_g)$ K, preferably $(T_g-160)$ K to $(T_g-50)$ K, more preferably $(T_g-140)$ K to $(T_g-60)$ K, and $(T_g-110)$ K to $(T_g-60)$ K.

When the magnetic core precursor is annealed at a temperature between $(T_g-160)$ K and $(T_g-50)$, the magnetic powder core has a coercive force of 100 A/m or less at an applied magnetic field of ±2.4 kA/m. When the magnetic core precursor is annealed at a temperature between $(T_g-140)$ K and $(T_g-60)$, the magnetic powder core has a coercive force of 80 A/m or less at an applied magnetic field of ±2.4 kA/m. In addition, when the magnetic core precursor is annealed at a temperature between $(T_g-110)$ K and $(T_g-60)$, the magnetic powder core has a coercive force of 40 A/m or less at an applied magnetic field of ±2.4 kA/m.

At an annealing temperature of less than $(T_g-170)$ K, the internal stress in the magnetic core precursor is not sufficiently relieved. At an annealing temperature exceeding $(T_g)$ K, the alloy exhibits high coercive force due to crystallization.

For example, in the case of a glassy alloy having a composition of $Fe_{70}Al_7P_{9.65}C_{2.3}B_{8.05}Si_3$, the annealing temperature is in the range of desirably 573 K (300° C.) to 723 K (450° C.), preferably 603 K (330° C.) to 713 K (440° C.), more preferably 623 K (350° C.) to 703 K (430° C.), and most preferably 653 K (380° C.) to 703 K (430° C.).

When a silicone rubber is used as the insulating material, the annealing temperature is preferably in the range of 653 K (380° C.) to 703 K (430° C.). At an annealing temperature of less than 653 K, the internal stress in the magnetic core precursor is insufficiently relieved. At an annealing temperature exceeding 703 K, the silicone rubber is significantly decomposed, resulting in decreased mechanical strength of the magnetic powder core. The silicone rubber is preferably annealed in vacuum or in an inert gas atmosphere, such as a nitrogen atmosphere or an argon atmosphere. The nitrogen gas atmosphere is more preferable.

A toroidal magnetic powder core is formed by such annealing.

The resulting magnetic powder core containing the glassy alloy powder exhibits superior soft magnetic characteristics at room temperature and the soft magnetic characteristics are further improved by annealing. This magnetic powder core is applicable to magnetic cores of various magnetic elements which require superior soft magnetic characteristics.

In addition to the above-described compaction molding in the discharge plasma sintering apparatus, the mixture of the glassy alloy powder and the insulating material may be compacted by conventional powder molding, hot pressing, or extruding.

In this embodiment, the toroidal magnetic powder core is manufactured using a mold. In an alternative embodiment, a bulk compact is prepared and is cut into various shapes, e.g., toroidal shapes, rods, E shapes, and U shapes. Magnetic powder cores having desired shapes can also be prepared in such a manner.

The magnetic powder core is formed of a mixture of the above-mentioned glassy alloy powder and the above-mentioned insulating material. The insulating material contributes to increased resistivity of the entire magnetic powder core and reduced core loss due to decreased eddy current loss in the magnetic powder core without decreased permeability in a high-frequency region.

When a glassy alloy having a resistivity of at least 1.5 $\mu\Omega$.m is used, the resulting magnetic powder core shows further reduced core loss due to reduced eddy current loss in the glassy alloy particles in a high-frequency region.

Since the magnetic core precursor is annealed at a temperature between $(T_g-170)$ K and $(T_g)$ K in this embodiment, the internal stress in the glassy alloy or the magnetic core precursor is relieved without crystallization of the glassy alloy. Thus, the magnetic powder core exhibits low coercive force.

A glassy alloy powder prepared by an atomizing process using gas is composed of spherical particles having a small average particle size. A magnetic powder core using this glassy alloy powder exhibits low core loss, a high rate of change in permeability to a change in an applied magnetic field (amplitude permeability), and a high rate of change in inductance to a change in an applied magnetic field (DC-superimposing characteristic).

The silicone rubber as the insulating material does not require heating during compaction molding and can significantly reduce the internal stress in the magnetic powder core. Thus, the magnetic powder core exhibits significantly reduced coercive force and core loss.

Figure 20:
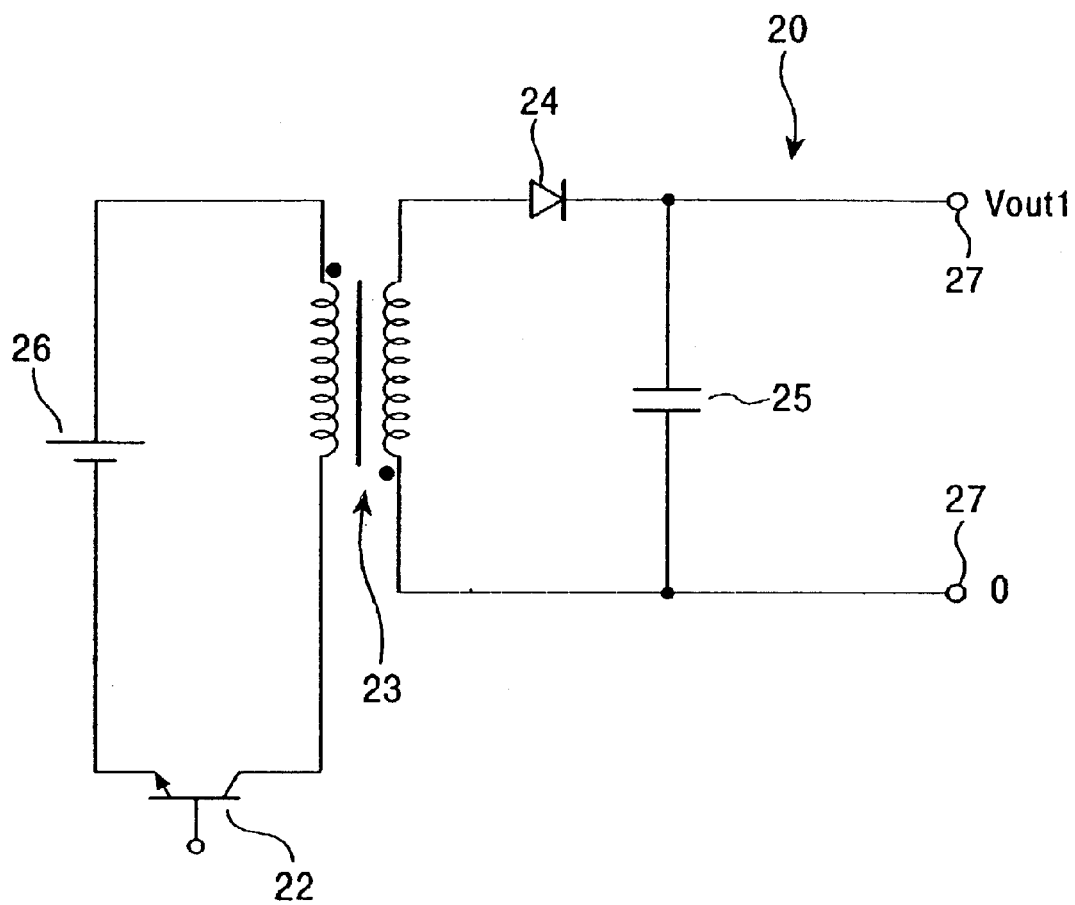
FIG. 20 is a circuit diagram of a switching power supply in accordance with an embodiment of the present invention.

FIG. 20 shows an exemplary switching power supply 20 in accordance with the present invention. This switching power supply 20 includes a switching element 22, a transformer 23, a rectification circuit 24, and a smoothing circuit 25.

The switching element 22 consists of, for example, a switching transistor and converts a DC voltage from a DC power source 26 into a rectangular pulsed current in response to a drive signal input through a base terminal.

The transformer 23 includes a magnetic core composed of the glassy alloy of the present invention. One input terminal is connected to the DC power source 26, whereas the other is connected to the switching element 22. The transformer 23 transforms the rectangular pulsed voltage from the switching element 22.

The rectification circuit 24 consists of, for example, a diode and is connected to one output terminal.

The smoothing circuit 25 consists of, for example, a capacitor and is connected to the output terminals of the transformer 23 in parallel.

The rectification circuit 24 and the smoothing circuit 25 convert the rectangular pulsed voltage, which is transformed in the transformer 23, into a DC voltage Vout1 which is output through output terminals.

The magnetic core constituting the transformer 23 is a molded article of a mixture of a glassy alloy powder and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Preferably, the glassy alloy has a resistivity of at least 1.5 $\mu\Omega$.m.

This magnetic core has low core loss and a low permeability in the range of 100 to 300 at a frequency of 100 kHz.

Figure 21:
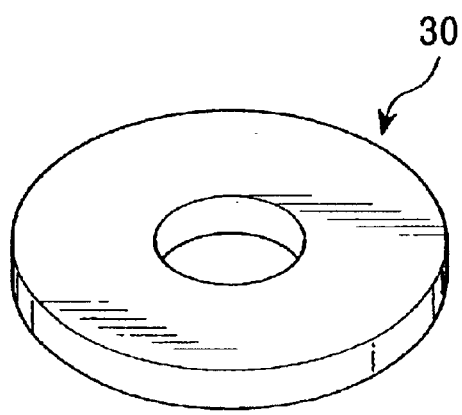
FIG. 21 is an isometric view of a magnetic powder core of a transformer used in the switching power supply shown in FIG. 20.

An exemplary shape of the magnetic core 30 is toroidal as shown in FIG. 21. The magnetic core may have any other shape, for example, an ellipsoidal or oval ring. Alternatively, the magnetic core may have substantially an E shape, a U shape, or an I shape, in a plan view.

The magnetic core 30 is formed of a glassy alloy powder which has a composition described below and is present in a texture of an insulating material. This texture is not homogeneous, since the powder of the glassy alloy is not dissolved into the matrix. It is preferable that the glassy alloy particles be insulated from each other by the insulating material.

The insulating material increases the resistivity of the magnetic core 30, resulting in decreased core loss due to reduced eddy current loss.

At a temperature difference $\Delta T_x$ of less than 20 K in the supercooled liquid of the glassy alloy, the glassy alloy will be inevitably crystallized during annealing for relieving the internal stress. At a temperature difference $\Delta T_x$ exceeding 20 K, the internal stress can be adequately relieved without loss due to decomposition of the insulating material at a reduced temperature.

Since the glassy alloy having a specific composition has a temperature difference $\Delta T_x$ of 60 K or more, the internal stress in the magnetic core 30 can be adequately relieved during annealing. Thus, the magnetic core 30 exhibits improved soft magnetic characteristics without loss due to deterioration of the insulating material during annealing at a reduced temperature. Moreover, the magnetic core 30 exhibits low core loss due to relaxation of the internal stress.

Since the magnetic core 30 has a permeability in the above-described range, the magnetic core 30 does not require a gap for preventing saturation of the magnetic flux. Thus, no leakage magnetic field is generated.

It is preferable to use an insulating material which enhances the resistivity of the magnetic core 30, which binds the glassy alloy particles so as to maintain the shape of the magnetic core 30, and which do not cause large loss of magnetic characteristics. Examples of such insulating materials include liquid or powdered organic compounds, e.g., epoxy resins, silicone resins, phenolic resins, urea resins, melamine resins, and polyvinyl alcohol (PVA); liquid glass, i.e., $Na_2O$—$SiO_2$; oxide glass powders, e.g., $Na_2O$—$B_2O_3$—$SiO_2$, $PbO$—$B_2O_3$—$SiO_2$, $PbO$—$BaO$—$SiO_2$, $Na_2O$—$B_2O_3$—$ZnO$, $CaO$—$BaO$—$SiO_2$, $Al_2O_3$—$B_2O_3$—$SiO_2$, and $B_2O_3$—$SiO_2$; and glassy substances formed by sol-gel processes and primarily composed of $SiO_2$, $Al_2O_3$, $ZrO_2$, and $TiO_2$.

The insulating material may be used together with a stearate salt as a lubricant. Examples of stearate salts include zinc stearate, calcium stearate, barium stearate, magnesium stearate, and aluminum stearate.

The glassy alloy powder contains a primary phase having a resistivity of at least 1.5 $\mu.\Omega$ and a temperature difference $\Delta T_x$ of at least 20 K in a supercooled liquid. The glassy alloy powder is prepared by atomizing the melt of the glassy alloy onto a cooling roller, by atomizing the melt of the glassy alloy together with a pressurized gas into the atmosphere, or by atomizing the melt of the glassy alloy into water. The resulting glassy alloy powder exhibits low core loss and superior soft magnetic characteristics.

In the supercooled region, which correspond to the temperature difference $\Delta T_x$, the glassy alloy of the present invention maintains a liquid arrangement of atoms. The mobility of these atoms is so low that crystallization does not substantially occur, although atomic vibration occurs.

In the glassy alloy having a large temperature difference $\Delta T_x$, the atomic mobility is low during cooling the melt, and the supercooled liquid state is maintained over the large temperature difference.

Thus, the glassy alloy can have an adequate amorphous phase by a relatively low cooling rate. The glassy alloy primarily composed of the amorphous phase can be prepared, for example, by a liquid quenching process having a relatively low cooling rate, such as a single roller process, or by pulverizing a bulk glassy alloy prepared by a casting method.

The switching power supply 20 has the transformer 23 including the magnetic core 30 composed of the glassy alloy powder. The internal stress of the magnetic core 30 can be relieved by annealing at a temperature which is sufficiently lower than the crystallization temperature of the glassy alloy, and the heat dissipation from the entire switching power supply 20 can be reduced.

The magnetic core 30 exhibiting low permeability does not require a gap for preventing magnetic saturation and does not generate a leakage magnetic field which adversely affects the other peripheral circuits.

Figure 22:
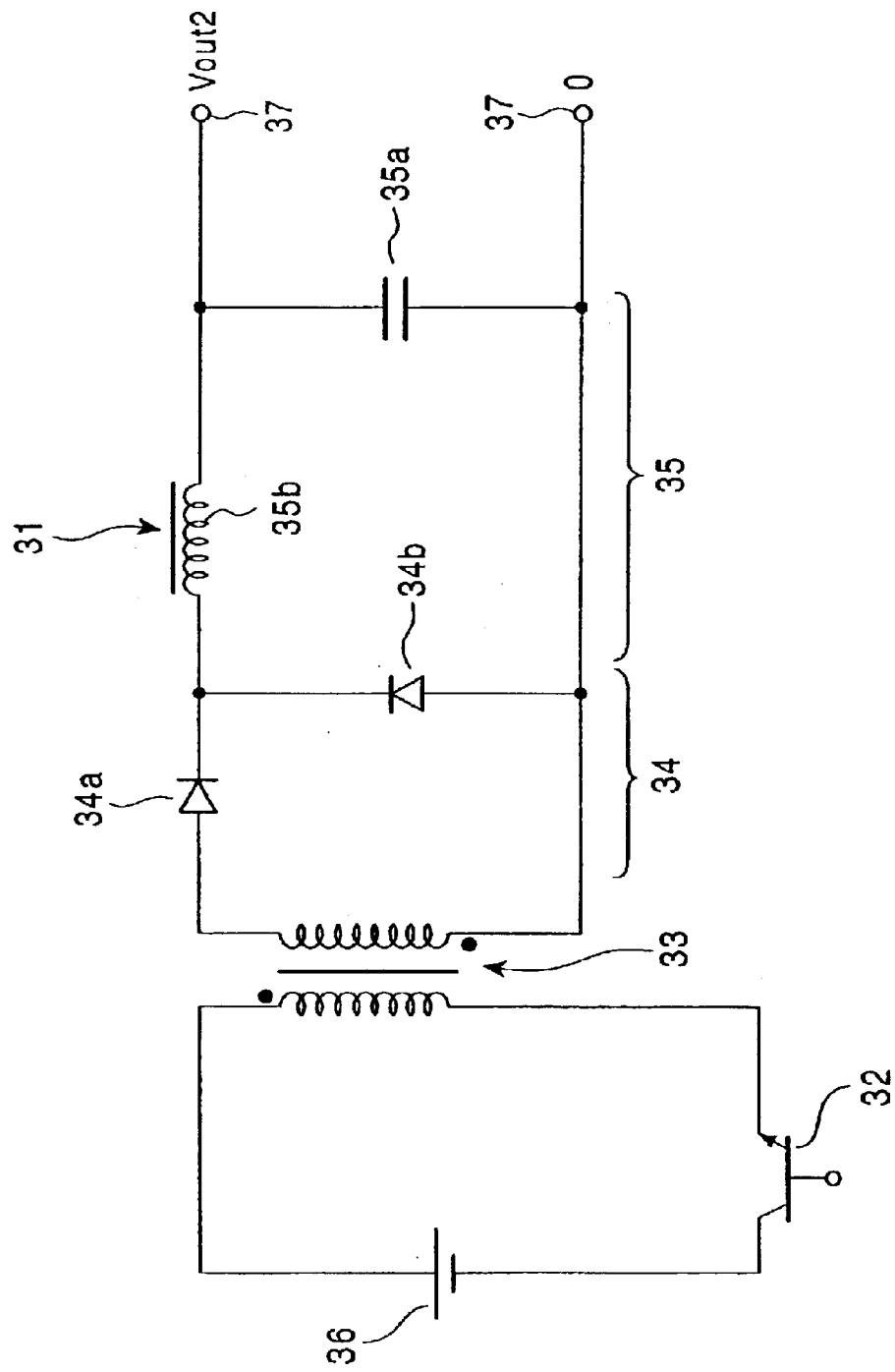
FIG. 22 is a circuit diagram of a switching power supply in accordance with an embodiment of the present invention.

FIG. 22 shows a switching power supply as an embodiment of the present invention. The switching power supply 31 includes a switching element 32, a transformer 33, a rectification circuit 34, and a smoothing circuit 35.

The switching element 32 consists of, for example, a switching transistor and converts a DC voltage from a DC power source 36 into a rectangular pulsed current in response to a drive signal input through a base terminal.

One input terminal is connected to the DC power source 36, whereas the other terminal is connected to the switching element 32. The transformer 33 transforms the rectangular pulsed voltage from the switching element 32.

The rectification circuit 34 consists of, for example, a pair of diodes 34a and is connected to the output side of the transformer 33. The diode 34a is connected in the backward direction with respect to the other diode 34b in the circuit.

The smoothing circuit 35 consists of, for example, a capacitor 35a and a coil 35b with a magnetic core and is connected to the rectification circuit 34.

The rectification circuit 34 and the smoothing circuit 35 convert the rectangular pulsed voltage, which is transformed in the transformer 33, into a DC voltage Vout2 which is output through output terminals.

As in the above embodiment, the magnetic core of the coil 35 is a molded article of a mixture of a glassy alloy powder and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

This magnetic core has low core loss and a low permeability in the range of 100 to 300 at a frequency of 100 kHz, as in the above-described magnetic core 30.

The switching power supply 31 includes the coil 35b with the magnetic core composed of the glassy alloy powder. The internal stress of the magnetic core can be relieved by annealing at a temperature which is sufficiently lower than the crystallization temperature of the glassy alloy, and the heat dissipation from the entire switching power supply 11 can be reduced.

The magnetic core exhibiting low permeability does not require a gap for preventing magnetic saturation and does not generate a leakage magnetic field which adversely affects the other peripheral circuits.

Figure 23:
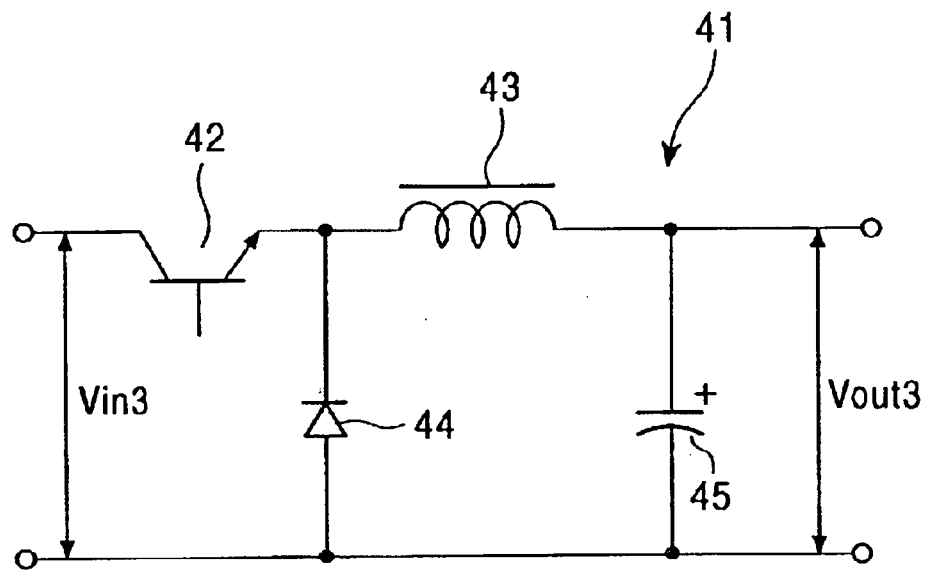
FIG. 23 is a circuit diagram of a step-down converter circuit in accordance with an embodiment of the present invention.

FIG. 23 shows a step-down converter circuit as an embodiment of the present invention. The step-down converter circuit 41 includes a switching element 42, a coil 43 with a magnetic core, a rectification element 44, and a capacitor 45.

The switching element 42 consists of, for example, a switching transistor, and intermittently interrupts the DC voltage Vin3, which is input from the input terminal side, in response to a drive signal input through a base terminal, and converts the voltage into a intermittent, rectangular pulsed current.

The coil 43 with the magnetic core is connected in series to the switching element 42. As in the above magnetic core 30, the magnetic core of the coil 43 is a molded article of a mixture of a glassy alloy powder and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Thus, this magnetic core also has low core loss and a low permeability in the range of 100 to 300 at a frequency of 100 kHz, as in the above-described magnetic core 30.

The rectification element 44 consists of, for example, a diode and is connected in the backward direction with respect to the switching element 42 and in parallel to the coil 43 with the magnetic core. The capacitor 45 is connected in parallel to an external load.

The coil 43 with the magnetic core, the rectification element 44, and the capacitor 45 form a circulating current path. Thus, the rectification element 44 functions as a circulating current diode.

When the switching element 42 is closed, a DC voltage (Vin3–Vout3) is generated in the coil 43. When the switching element 42 is opened, the coil 43 generates a counter-electromotive force which causes a circulating current flow in the capacitor 45 and the rectification element 44.

When the open-close operations of the switching element 42 are repeated, the pulsed voltage are smoothed by the coil 43 with the magnetic core and the capacitor 45 so that a DC voltage Vout3 (Vin3>Vout3) is output through the output terminals.

In the step-down converter circuit 41, the magnetic core of the coil 43 is composed of a glassy alloy powder. The internal stress of the magnetic core can be relieved by annealing at a temperature which is sufficiently lower than the crystallization temperature of the glassy alloy, and the heat dissipation from the entire step-down converter circuit 41 can be reduced.

The magnetic core exhibiting low permeability does not require a gap for preventing magnetic saturation and does not generate a leakage magnetic field which adversely affects the other peripheral circuits.

Figure 24:
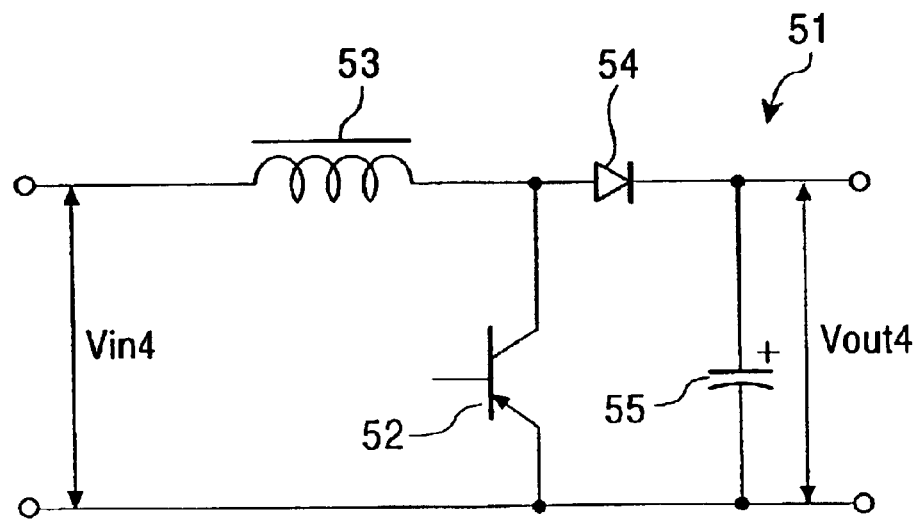
FIG. 24 is a circuit diagram of a boosting converter circuit in accordance with an embodiment of the present invention.

FIG. 24 shows a boosting converter circuit as an embodiment of the present invention. The boosting converter circuit 51 includes a switching element 52, a coil 53 with a magnetic core, a rectification element 54, and a capacitor 55.

The switching element 52 consists of, for example, a switching transistor, and intermittently interrupts the DC voltage Vin4, which is input from the input terminal side, in response to a drive signal input through a base terminal, and converts the voltage into a intermittent, rectangular pulsed current.

The coil 53 with the magnetic core is connected in series to the switching element 52. As in the above magnetic core, the magnetic core of the coil 53 is a molded article of a mixture of a glassy alloy powder and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Thus, this magnetic core also has low core loss and a low permeability in the range of 100 to 300 at a frequency of 100 kHz, as in the above-described magnetic core.

The rectification element 54 consists of, for example, a diode and is connected in series to the coil 53 with the magnetic core and in parallel to the switching element 52. The capacitor 45 is connected in parallel to an external load.

When the switching element 52 is closed, a DC voltage Vin4 is generated in the coil 53. In this mode, both input terminals are short-circuited and no currents flow in the output side.

When the switching element 52 is opened, the coil 53 generates a counterelectromotive force and a current flows in the rectification element 54.

When the open-close operations of the switching element 42 are repeated, a current due to the counterelectromotive force intermittently flows in the rectification element 54, and the intermittent current is smoothed by the capacitor 55 so that a DC voltage Vout4 (Vin4>Vout4) is output through the output terminals.

In the step-down converter circuit 51, the magnetic core of the coil 53 is composed of a glassy alloy powder. The internal stress of the magnetic core can be relieved by annealing at a temperature which is sufficiently lower than the crystallization temperature of the glassy alloy, and the heat dissipation from the entire boosting converter circuit 51 can be reduced.

The magnetic core exhibiting low permeability does not require a gap for preventing magnetic saturation and does not generate a leakage magnetic field which adversely affects the other peripheral circuits.

Figure 25:
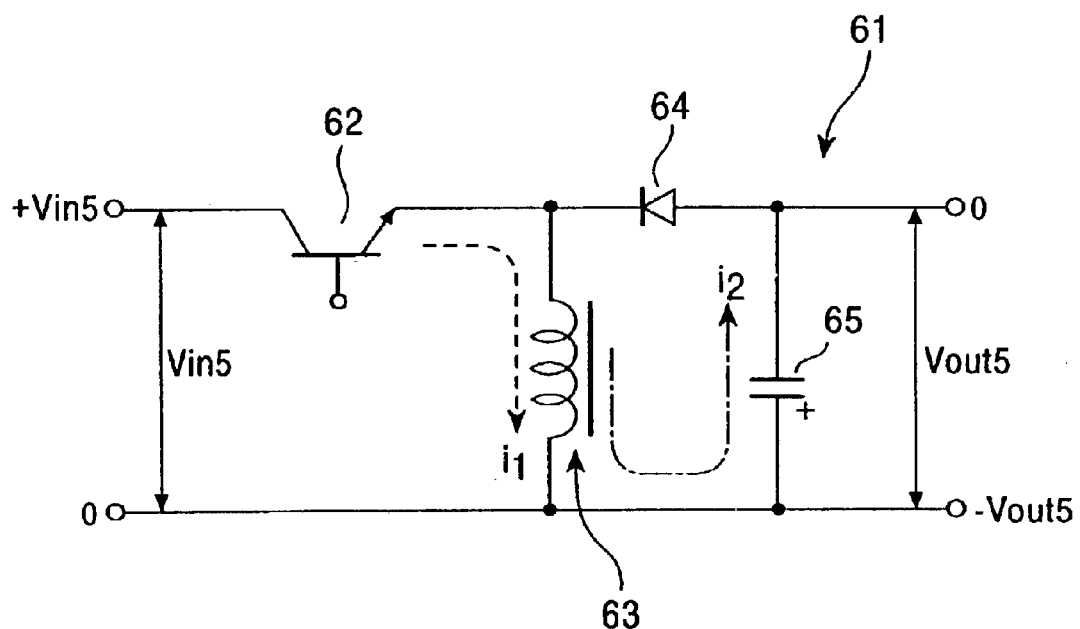
FIG. 25 is a circuit diagram of a polarity-reversing converter circuit in accordance with an embodiment of the present invention.

FIG. 25 shows a polarity-reversing converter circuit as an embodiment of the present invention. The polarity-reversing converter circuit 61 includes a switching element 62, a coil 63 with a magnetic core, a rectification element 64, and a capacitor 65.

The switching element 62 consists of, for example, a switching transistor, intermittently interrupts the DC voltage Vin5, which is input from the input terminal side, in response to a drive signal input through a base terminal, and converts the voltage into a intermittent, rectangular pulsed current.

The coil 63 with the magnetic core is connected in series to the switching element 62. The magnetic core of the coil 63 is also a molded article of a mixture of a glassy alloy powder and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Thus, this magnetic core also has low core loss and a low permeability in the range of 100 to 300 at a frequency of 100 kHz, as in the above-described magnetic core.

The rectification element 64 consists of, for example, a diode and is connected in the backward direction in series to the switching element 62. The capacitor 65 is connected in parallel to an external load.

When the switching element 62 is closed, a current i1 generated by a DC voltage Vin5 flows in the coil 63. Since the rectification element 44 is connected backward to the switching element 42, no currents flow in the output side.

When the switching element 62 is opened, the coil 63 generates a counterelectromotive force and a current i2 flows in the capacitor 65.

When the open-close operations of the switching element 62 are repeated, a current i2 due to the counterelectromotive force intermittently flows in the capacitor 65 so that a DC voltage −Vout5 is generated between the both terminals of the capacitor 65.

The DC voltage Vin5 having a positive polarity is output as a DC voltage Vout5 having a negative polarity through the output terminals.

In the step-down converter circuit 61, the magnetic core of the coil 63 is composed of a glassy alloy powder. The internal stress of the magnetic core can be relieved by annealing at a temperature which is sufficiently lower than the crystallization temperature of the glassy alloy, and the heat dissipation from the entire polarity-reversing converter circuit 61 can be reduced.

The magnetic core exhibiting low permeability does not require a gap for preventing magnetic saturation and does not generate a leakage magnetic field which adversely affects the other peripheral circuits.

Figure 26:
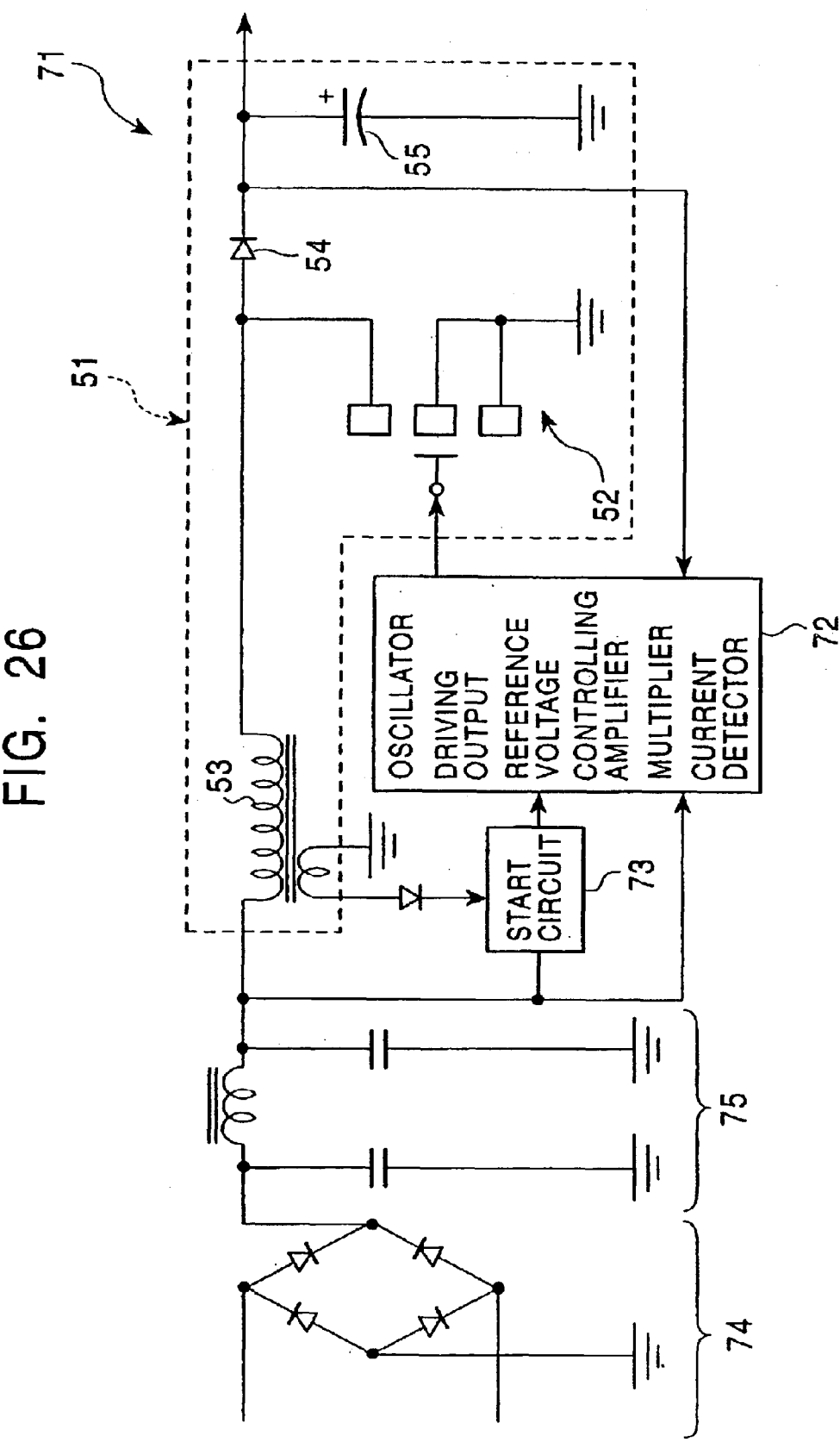
FIG. 26 is a circuit diagram of an active filter in accordance with an embodiment of the present invention.

FIG. 26 shows an active filter as an embodiment of the present invention. The active filter 71 is called a boosting PWM-type active filter, and includes a control unit 72, a start circuit 73, a rectification circuit 74, a noise filter circuit 75, and the boosting converter circuit 51 described in the former embodiment.

The control unit 72 is, for example, an active filter monolithic IC having an oscillator, a controlling amplifier, a multiplier, and a current detector, and controls the switching interval of the switching element 52 in the boosting converter circuit 51.

The start circuit 73 detects a current flowing in the coil 53 with the magnetic core and controls the switching interval of the switching element 52 in the boosting converter circuit 51 to control the rush current when a voltage is input.

The rectification circuit 74 converts the AC voltage from the input side into a pulsating flow, while the noise filter circuit 75 removes noise generated by the boosting converter circuit 51.

The boosting converter circuit 51 includes, as described above, the boosting converter circuit 51, the coil 53 with the magnetic core, the rectification element 54, and the capacitor 55.

The pulsating flow from the rectification circuit 74 is applied to the switching element 52 when the switching element 52 is closed. When the switching element 52 is opened, a counterelectromotive force is generated in the coil 53 with the magnetic core so that a current flows in the rectification element 54.

The control unit 72 controls the open-close operations of the switching element 52. When the open-close operations of the switching element 52 are repeated, a current due to the counterelectromotive force intermittently flows in the rectification circuit 34, and this current is smoothed by the capacitor 55 so that a DC voltage is output through the output terminals. Since this circuit does not require a smoothing circuit at the input side, the input current does not include harmonic distortion.

The magnetic core of the coil 53 is also a molded article of a mixture of a glassy alloy powder and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Thus, this magnetic core also has low core loss and a low permeability in the range of 100 to 300 at a frequency of 100 kHz, as in the above-described magnetic core.

In the active filter 71, the magnetic core of the coil 53 is composed of a glassy alloy powder. The internal stress of the magnetic core can be relieved by annealing at a temperature which is sufficiently lower than the crystallization temperature of the glassy alloy, and the heat dissipation from the entire active filter 71 can be reduced.

The magnetic core exhibiting low permeability does not require a gap for preventing magnetic saturation and does not generate a leakage magnetic field which adversely affects the other peripheral circuits.

The composition of the glassy alloy in accordance with the present invention will now be described in detail.

The glassy alloy used in the magnetic core is primarily composed of Fe, and contains Al and the element Q. The element Q may not include Si.

The glassy alloy is represented by, for example, the following formula:

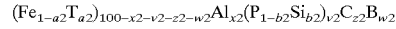

$(Fe_{1-a2}T_{a2})_{100-x2-v2-z2-w2}Al_{x2}(P_{1-b2}Si_{b2})_{v2}C_{z2}B_{w2}$ wherein T represents at least one element of Co and Ni, and the subscripts a2, b2, x2, v2, z2, and w2 satisfy the relationships, $0 \leq a2 \leq 0.15$ by atomic ratio, $0 < b2 \leq 0.8$ by atomic ratio, 0 atomic percent $< x2 \leq 20$ atomic percent, 0 atomic percent $< v2 \leq 22$ atomic percent, 0 atomic percent $< z2 \leq 12$ atomic percent, and 0 atomic percent $< w2 \leq 16$ atomic percent.

When the glassy alloy has the above composition, the temperature difference $\Delta T_x$ in a supercooled liquid is at least 20 K.

Preferably, the subscripts a2, b2, x2, v2, z2, and w2 satisfy the relationships, $0 \leq a2 \leq 0.15$ by atomic ratio, $0.1 \leq b2 \leq 0.35$ by atomic ratio, 0 atomic percent$<x2 \leq 15$ atomic percent, 8 atomic percent$\leq v2 \leq 18$ atomic percent, 0.5 atomic percent$\leq z2 \leq 7.4$ atomic percent, and 3 atomic percent$\leq w2 \leq 14$ atomic percent.

When the glassy alloy has the above preferred composition, the temperature difference $\Delta T_x$ in a supercooled liquid is 40 K or more.

More preferably, the subscripts a2, b2, x2, v2, z2, and w2 satisfy the relationships, $0 \leq a2 \leq 0.15$ by atomic ratio, $0.1 \leq b2 \leq 0.28$ by atomic ratio, 0 atomic percent$<x2 \leq 10$ atomic percent, 11.3 atomic percent$\leq v2 \leq 14$ atomic percent, 1.8 atomic percent$\leq z2 \leq 4.6$ atomic percent, and 5.3 atomic percent$\leq w2 \leq 8.6$ atomic percent.

When the glassy alloy has the above preferred composition, the temperature difference $\Delta T_x$ in a supercooled liquid is 60 K or more.

The glassy alloy of the present invention contains Fe, Al, and at least one element Q. That is, the glassy alloy of the present invention does not contain Ga, which is contained in a conventional GeAlGaPCB(Si) alloy, but does contain an increased amount of Al. Thus, this glassy alloy has a large temperature difference $\Delta T_x$ in a supercooled liquid and exhibits significantly enhanced formability of the amorphous phase.

Since the glassy alloy exhibits significantly enhanced amorphous phase formability, the entire texture can be composed of a perfect amorphous phase. Thus, the permeability and the saturation magnetization are significantly improved, resulting in superior soft magnetic characteristics.

Moreover, the internal stress of the glassy alloy can be relieved without precipitation of the crystalline phase during annealing under proper conditions due to the perfect amorphous phase, resulting in further improved soft magnetic characteristics.

Aluminum (Al) is an essential element for this glassy alloy. At an Al content x of 20 atomic percent or less, this alloy has a perfect amorphous phase due to extremely enhanced amorphous formability of Al, and the amorphous alloy has a temperature difference $\Delta T_x$ of at least 20 K in a supercooled liquid.

Since Al has a negative enthalpy of mixing with Fe and has an atomic radius which is larger than that of Fe, a combined use of Al with P, B, and Si, which have atomic radii smaller than that of Fe, inhibits crystallization, and can yield a thermally stable amorphous structure.

Moreover, Al raises the Curie temperature of the glassy alloy and improves thermal stability of various magnetic characteristics.

The Al content x2 is preferably 20 atomic percent or less, more preferably more than 0 atomic percent to 15 atomic percent, and most preferably more than 0 atomic percent to 10 atomic percent. An Al content x2 exceeding 20 atomic percent, the alloy has a decreased saturation magnetization due to a relatively low Fe content and does not have a temperature difference $\Delta T_x$ in a supercooled liquid.

Iron (Fe) is essential for the glassy alloy of the present invention as a magnetic element. In the present invention, Fe may be partially replaced with at least one element T selected from Co and Ni. A higher Fe content contributes to improved saturation magnetization of the resulting glassy alloy.

Carbon (C), phosphorus (P), silicon (Si), and boron (B) as the element Q contribute to the formation of an amorphous phase.

When both phosphorus and silicon are added in combination, the total content v2 of the phosphorus and silicon is preferably more than 0 to 22 atomic percent, more preferably 8 to 18 atomic percent, and most preferably 11.3 to 14 atomic percent. The combined use of P and S with a preferred total content v2 contributes to an improved temperature difference $\Delta T_x$ in a supercooled liquid.

The subscript b2 representing the relative Si and P contents by atomic ratio is preferably in the range of $0<b2 \leq 0.8$ when 0 atomic percent$<v2 \leq 22$ atomic percent, $0.1 \leq b \leq 0.35$ when 8 atomic percent$\leq v2 \leq 18$ atomic percent, or $0.1 \leq b2 \leq 0.28$ when 11.3 atomic percent$\leq v \leq 14$ atomic percent.

When the subscript b2 exceeds 0.8, an excess amount of Si may undesirably cause disappearance of the temperature difference $\Delta T_x$ in the supercooled liquid.

Herein, the Si content in the glassy alloy is in the range of preferably 17.6 atomic percent or less, more preferably 0.8 to 6.3 atomic percent, and most preferably 1.13 to 3.92 atomic percent.

The above-mentioned ranges of the subscripts b2 and v2 representing the P and Si contents, respectively, contribute to an increased temperature difference $\Delta T_x$ in a supercooled liquid.

The subscript z2 representing the C content is in the range of preferably more than 0 to 12 atomic percent, more preferably 0.5 to 7.4 atomic percent, and most preferably 1.8 to 4.6 atomic percent.

The subscript w2 representing the B content is in the range of preferably more than 0 to 16 atomic percent, more preferably 3 to 14 atomic percent, and most preferably 5.3 to 8.6 atomic percent.

The glassy alloy may contain 4 atomic percent or less Ge, and 0 to 7 atomic percent of at least one element selected from the group consisting of Nb, Mo, Hf, Ta, W, Zr, and Cr.

The glassy alloy of the present invention has a temperature difference $\Delta T_x$ of at least 35 K in the above-described composition or at least 50 K in an optimized composition.

The glassy alloy of the present invention may contain other incidental impurities.

This magnetic core can be produced by the above-described method.

The magnetic core composed of the above composition exhibiting low core loss and permeability suppresses heat dissipation during operation, does not require a gap for preventing magnetic saturation, and does not generate a leakage magnetic field which adversely affects the other peripheral circuits.

Since the glassy alloy used has a resistivity of at least 1.5 $\mu\Omega$.m, the resulting magnetic powder core shows further reduced core loss due to reduced eddy current loss in the glassy alloy particles in a high-frequency region. As a result, the magnetic core exhibits further reduced core loss and heat dissipation.

Moreover, the insulating material contributes to an increase in resistivity of the entire magnetic core. Thus, the magnetic core exhibits further reduced core loss due to decreased eddy current loss.

The above embodiments describe the formation of the magnetic core by discharge plasma sintering compaction molding of a mixture of a glassy alloy powder and a insulating material. The magnetic core, however, may be formed by any other process, for example, a conventional powder molding process, a hot pressing process, or an extruding process.

A filter in accordance with the present invention comprises a capacitor and an inductor of a coil wound around a magnetic core, wherein the magnetic core comprises a molded article of a mixture of a glassy alloy powder and an insulating material, the glassy alloy having a texture primarily composed of an amorphous phase and exhibiting a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

This filter is mounted at the output side of an amplifier to smooth an output current from the amplifier. An example of the amplifying device having this filter includes an amplifier for outputting a pulsed current and a filter connected to the output side of the amplifier for smoothing the pulsed current.

Figure 27:
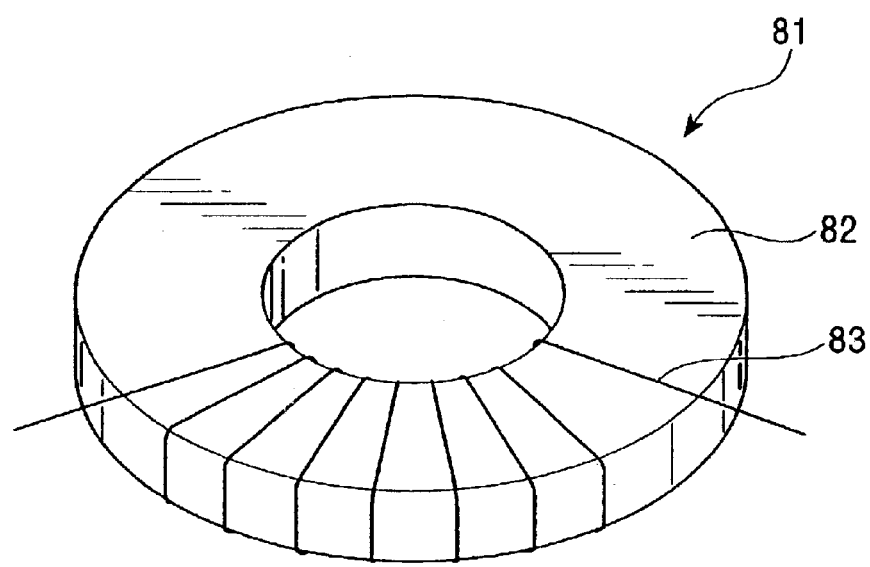
FIG. 27 is an isometric view of an inductor used in a filter in accordance with an embodiment of the present invention.
Figure 28:
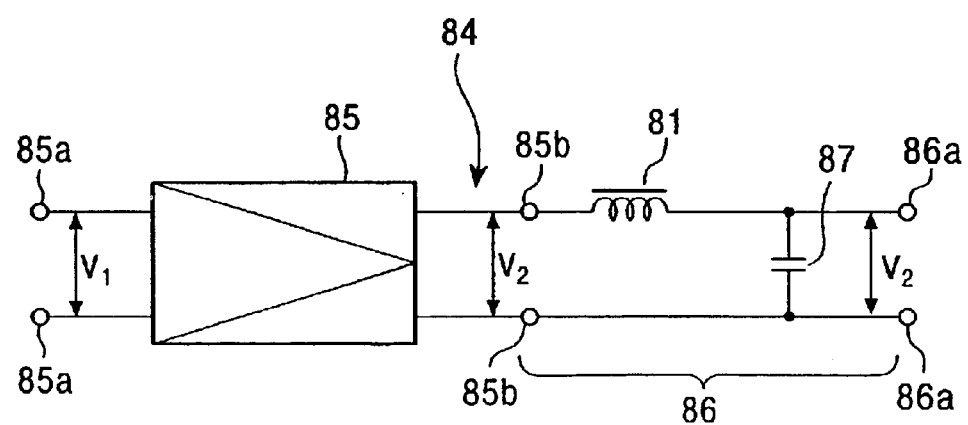
FIG. 28 is a circuit diagram of an amplifying device in accordance with an embodiment of the present invention.

FIG. 27 shows an inductor used in the filter in accordance with the present invention, and FIG. 28 is a circuit diagram of an amplifying device provided with this filter.

As shown in FIG. 27, the inductor 81 includes a magnetic core 82 and a coil 83 wound therearound. As shown in FIG. 28, the amplifying device 84 includes an amplifier 85 for outputting a pulsed current and a filter 86 in accordance with the present invention which is connected to output terminals 85b of the amplifier 85 and smoothes the pulsed current from the amplifier 85. The filter 86 consists of a capacitor 87 and the inductor 81 shown in FIG. 27.

The filter 86 is a so-called low-pass filter in which the capacitor 87 and the inductor 81 are connected to each other so as to form an L shape. Preferably, the amplifier 85 is a pulse-width modulation amplifier.

The operation of the amplifying device 84 will now be described.

Figure 29:
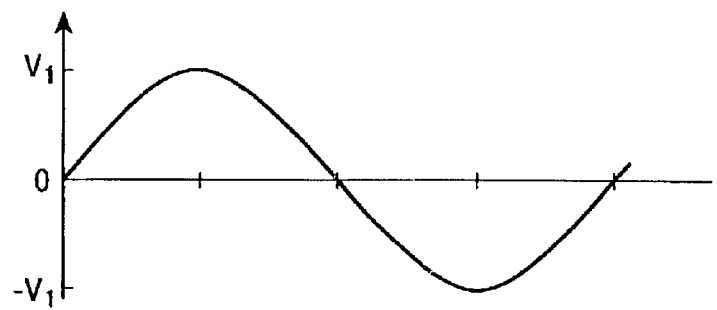
FIG. 29 is a graph illustrating a waveform of the input current to the amplifying device shown in FIG. 27.
Figure 30:
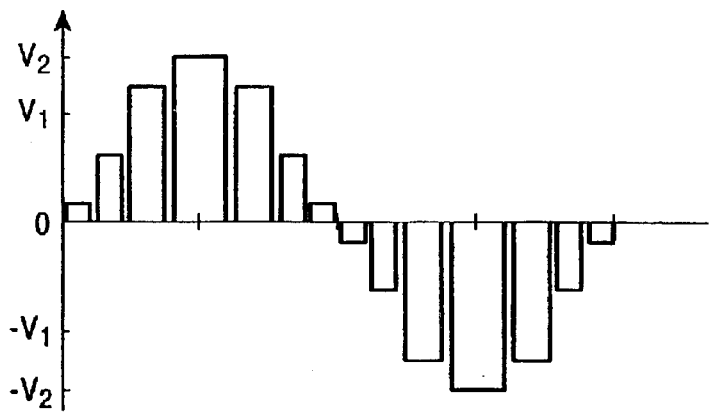
FIG. 30 is a graph illustrating waveforms of input currents to a filter provided in the amplifying device shown in FIG. 27.
Figure 31:
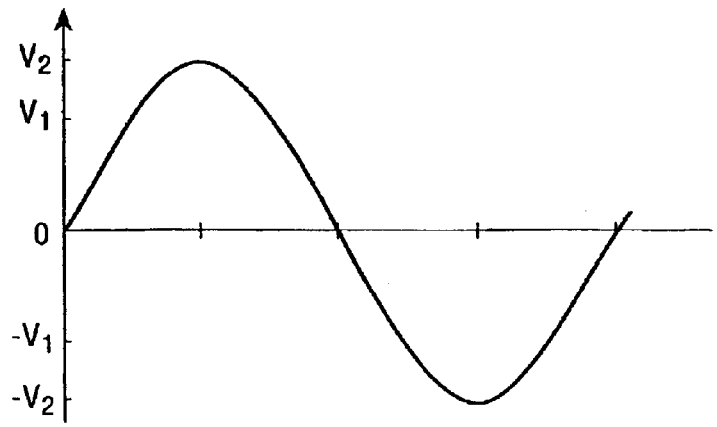
FIG. 31 is a graph illustrating a waveform of an output current from the amplifying device shown in FIG. 27.

An AC current with a voltage V1 shown in FIG. 29 is input to input terminals 85a of the amplifier 85. The amplifier 85 converts high-voltage portions of the input AC voltage into broader pulse waves and low-voltage portions into narrower pulse waves. Moreover, the amplifier 85 amplifies the voltage and outputs the pulsed current shown in FIG. 30 through the output terminals 85b. The filter 86 smoothes this pulsed current and outputs the smoothed current through output terminals 86a of the filter 86. The output current is an amplified AC current of a voltage V2 (V2>V1) as shown in FIG. 31.

As described above, a pulsed current is input to the filter 86 in accordance with the present invention. Since the width and the voltage of the pulsed current periodically vary, a high-frequency current is applied to the inductor 81.

In order to achieve an amplifying device with low loss and reduced waveform distortion, the loss of the inductor 81 must be reduced. Thus, the requirements for the magnetic core 82 constituting the inductor 81 are low core loss and substantially constant amplitude permeability with a change in magnetic field.

The magnetic core 82 constituting the filter of the present invention is a molded article of a mixture of a glassy alloy powder having resistivity of at least 1.5 $\mu\Omega$.cm and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

The magnetic core 82 shown in FIG. 27 is toroidal. The shape of the magnetic core 82, however, is not limited to this. For example, the magnetic core 82 may be ellipsoidal, oval, E-shaped, U-shaped, or I-shaped in a plan view.

The magnetic core 82 is composed of a magnetic powder core in which glassy alloy particles are bonded to each other with an insulating material and are dispersed in the texture. Thus, the glassy alloy particles are not dissolved into the matrix as a uniform texture. The individual glassy alloy particles are preferably insulated from each other in the insulating material. Accordingly, the magnetic core 82 has large resistivity due to the effects of the insulating material, low core loss due to reduced eddy current loss, less reduction in permeability in a high-frequency region and substantially constant amplitude permeability with a change in magnetic field.

When the temperature difference $\Delta T_x$ in the supercooled liquid of the glassy alloy is less than 20 K, it is difficult to adequately relieve the internal stress without crystallization at an annealing treatment after the compaction molding of the mixture of the glassy alloy powder and the insulating material. When the temperature difference $\Delta T_x$ is at least 20 K, the annealing can be performed at a lower temperature which does not cause excess decomposition of the insulating layer and increased loss.

Since the glassy alloy having a specific composition has a temperature difference $\Delta T_x$ of 60 K or more, the internal stress in the magnetic core 82 can be adequately relieved during annealing. Thus, the magnetic core 82 exhibits improved soft magnetic characteristics without loss due to deterioration of the insulating material during annealing at a reduced temperature. Moreover, the magnetic core 82 exhibits low core loss due to relaxation of the internal stress during the annealing and reduces heat dissipation.

The magnetic core 82 shows a small change in permeability with a change in operational frequency and high permeability in high-frequency ranges, contributing improved frequency characteristics of the filter 86.

Preferably, the rate of change in amplitude permeability of the magnetic core 82 in a magnetic field of 2,000 A/m is within ±10% of an amplitude permeability in a magnetic field of 200 A/m, and the permeability of the magnetic core at 100 kHz is in the range of 50 to 200.

Within the above rate of change, the output waveform from the filter 86 is less distorted. Moreover, the number of turns of the coil 83 can be reduced, thus resulting in a reduction in size of the inductor 81. Accordingly, the sizes of the filter 86 and the amplifying device 84 can be reduced. For example, the filter 86 exhibits superior characteristics when the number of turns of the coil 83 is 30.

The insulating material enhances resistivity of the magnetic core 82 and maintains the shape of the magnetic core 82 by binding the glassy alloy particles. Insulating materials which do not cause large loss in magnetic properties are preferred. Examples of such insulating materials include liquid or powdered organic compounds, e.g., epoxy resins, silicone resins, phenolic resins, urea resins, melamine resins, and polyvinyl alcohol (PVA); liquid glass, i.e., $Na_2O$—$SiO_2$; oxide glass powders, e.g., $Na_2O$—$B_2O_3$—$SiO_2$, PbO—$B_2O_3$—$SiO_2$, PbO—BaO—$SiO_2$, $Na_2O$—$B_2O_3$—ZnO, CaO—BaO—$SiO_2$, $Al_2O_3$—$B_2O_3$—$SiO_2$, and $B_2O_3$—$SiO_2$; and glassy substances formed by sol-gel processes and primarily composed of $SiO_2$, $Al_2O_3$, $ZrO_2$, and $TiO_2$.

The insulating material may be used together with a stearate salt as a lubricant. Examples of stearate salts include zinc stearate, calcium stearate, barium stearate, magnesium stearate, and aluminum stearate.

The glassy alloy powder contains a primary phase having a resistivity of at least 1.5 $\mu.\Omega$ and a temperature difference $\Delta T_x$ of at least 20 K in a supercooled liquid. The glassy alloy powder is prepared by pulverizing a glassy alloy tape, by atomizing the melt of the glassy alloy onto a cooling roller, by atomizing the melt of the glassy alloy together with a pressurized gas into the atmosphere, or by atomizing the melt of the glassy alloy into water. The resulting glassy alloy powder exhibits low core loss and superior soft magnetic characteristics.

The glassy alloy has a large temperature difference $\Delta T_x$ of 40 K or more, particularly 50 K or more, and more particularly 60 k or more, and has a large resistivity of at least 1.5 $\mu\Omega\cdot m$ under optimized compositions. These properties are not obtainable from conventional alloys. Moreover, the glassy alloy exhibits the superior soft magnetic characteristics at room temperature, unlike conventional alloys.

In the supercooled region, which correspond to the temperature difference $\Delta T_x$, the glassy alloy of the present invention maintains a liquid arrangement of atoms. The mobility of these atoms is so low that crystallization does not substantially occur, although atomic vibration occurs.

In the glassy alloy having a large temperature difference $\Delta T_x$, the atomic mobility is low during cooling the melt, and the supercooled liquid state is maintained over a broad temperature range. Since the glassy alloy of the present invention has a large temperature difference $\Delta T_x$ in a supercooled liquid, the alloy is readily supercooled to a temperature below a glass transition temperature $T_g$ without being crystallized during a cooling step of the melt, readily forming an amorphous phase.

Thus, the amorphous phase can be formed at a relatively low cooling rate. For example, a glassy alloy powder primarily composed of an amorphous phase is obtainable by pulverizing a bulk glassy alloy, which is prepared by a casting process, in addition to liquid quenching processes having relatively high cooling rates, such as a single-roller process.

The glassy alloy used in the magnetic core 82 is primarily composed of Fe, and contains Al and the element Q. The element Q may not include Si.

The glassy alloy is represented by, for example, the following formula:

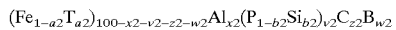

$$(Fe_{1-a2}T_{a2})_{100-x2-v2-z2-w2}Al_{x2}(P_{1-b2}Si_{b2})_{v2}C_{z2}B_{w2}$$

wherein T represents at least one element of Co and Ni, and the subscripts a2, b2, x2, v2, z2, and w2 satisfy the relationships, $0 \leq a2 \leq 0.15$ by atomic ratio, $0 < b2 \leq 0.8$ by atomic ratio, 0 atomic percent$<x2 \leq 20$ atomic percent, 0 atomic percent$<v2 \leq 22$ atomic percent, 0 atomic percent$<z2 \leq 12$ atomic percent, and 0 atomic percent$<w2 \leq 16$ atomic percent.

When the glassy alloy has the above composition, the temperature difference $\Delta T_x$ in a supercooled liquid is at least 20 K.

Preferably, the subscripts a2, b2, x2, v2, z2, and w2 satisfy the relationships, $0 \leq a2 \leq 0.15$ by atomic ratio, $0.1 \leq b2 \leq 0.35$ by atomic ratio, 0 atomic percent$<x2 \leq 15$ atomic percent, 8 atomic percent$\leq v2 \leq 18$ atomic percent, 0.5 atomic percent$\leq z2 \leq 7.4$ atomic percent, and 3 atomic percent$\leq w2 \leq 14$ atomic percent.

When the glassy alloy has the above preferred composition, the temperature difference $\Delta T_x$ in the supercooled liquid is 40 K or more.

More preferably, the subscripts a2, b2, x2, v2, z2, and w2 satisfy the relationships, $0 \leq a2 \leq 0.15$ by atomic ratio, $0.1 \leq b2 \leq 0.28$ by atomic ratio, 0 atomic percent$<x2 \leq 10$ atomic percent, 11.3 atomic percent$\leq v2 \leq 14$ atomic percent, 1.8 atomic percent$\leq z2 \leq 4.6$ atomic percent, and 5.3 atomic percent$\leq w2 \leq 8.6$ atomic percent.

When the glassy alloy has the above preferred composition, the temperature difference $\Delta T_x$ in the supercooled liquid is 60 K or more.

The glassy alloy of the present invention contains Fe, Al, P, C, B, and Si. That is, the glassy alloy of the present invention does not contain Ga, which is contained in a conventional GeAlGaPCB(Si) alloy, but does contain an increased amount of Al. Thus, this glassy alloy has a large temperature difference $\Delta T_x$ in a supercooled liquid and exhibits significantly enhanced formability of the amorphous phase.

Since the glassy alloy exhibits significantly enhanced amorphous phase formability, the entire texture can be composed of a perfect amorphous phase. Thus, the permeability and the saturation magnetization are significantly improved, resulting in superior soft magnetic characteristics.

Aluminum (Al) is an essential element for this glassy alloy. At an Al content x of 20 atomic percent or less, this alloy has a perfect amorphous phase due to extremely enhanced amorphous formability of Al, and the amorphous alloy has a temperature difference $\Delta T_x$ of at least 20 K in a supercooled liquid.

Since Al has a negative enthalpy of mixing with Fe and has an atomic radius which is larger than that of Fe, a combined use of Al with P, B, and Si, which have atomic radii smaller than that of Fe, inhibits crystallization and can yield a thermally stable amorphous structure.

Moreover, Al raises the Curie temperature of the glassy alloy and improves thermal stability of various magnetic characteristics.

The Al content x2 is preferably 20 atomic percent or less, more preferably more than 0 atomic percent to 15 atomic percent, and most preferably more than 0 atomic percent to 10 atomic percent. An Al content x2 exceeding 20 atomic percent, the alloy has a decreased saturation magnetization due to a relatively low Fe content and does not have a temperature difference $\Delta T_x$ in a supercooled liquid.

Iron (Fe) is essential for the glassy alloy of the present invention as a magnetic element. In the present invention, Fe may be partially replaced with at least one element T selected from Co and Ni. A higher Fe content contributes to improved saturation magnetization of the resulting glassy alloy.

Carbon (C), phosphorus (P), silicon (Si), and boron (B) as the element Q contribute to the formation of an amorphous phase.

When both phosphorus and silicon are added in combination, the total content v2 of the phosphorus and silicon is preferably more than 0 to 22 atomic percent, more preferably 8 to 18 atomic percent, and most preferably 11.3 to 14 atomic percent. The combined use of P and S with a preferred total content v2 contributes to an improved temperature difference $\Delta T_x$ in a supercooled liquid.

The subscript b2 representing the relative Si and P contents by atomic ratio is preferably in the range of $0<b2 \leq 0.8$ when 0 atomic percent$<v2 \leq 22$ atomic percent, $0.1 \leq b \leq 0.35$ when 8 atomic percent$<v2 \leq 18$ atomic percent, or $0.1 \leq b2 \leq 0.28$ when 11.3 atomic percent$\leq v \leq 14$ atomic percent.

When the subscript b2 exceeds 0.8, an excess amount of Si may undesirably cause disappearance of the temperature difference $\Delta T_x$ in the supercooled liquid.

Herein, the Si content in the glassy alloy is in the range of preferably 17.6 atomic percent or less, more preferably 0.8 to 6.3 atomic percent, and most preferably 1.13 to 3.92 atomic percent.

The above-mentioned ranges of the subscripts b2 and v2 representing the P and Si contents, respectively, contribute to an increased temperature difference $\Delta T_x$ in a supercooled liquid.

The subscript z2 representing the C content is in the range of preferably more than 0 to 12 atomic percent, more preferably 0.5 to 7.4 atomic percent, and most preferably 1.8 to 4.6 atomic percent.

The subscript w2 representing the B content is in the range of preferably more than 0 to 16 atomic percent, more preferably 3 to 14 atomic percent, and most preferably 5.3 to 8.6 atomic percent.

The glassy alloy may contain 4 atomic percent or less Ge, and 0 to 7 atomic percent of at least one element selected from the group consisting of Nb, Mo, Hf, Ta, W, Zr, and Cr.

The glassy alloy of the present invention has a temperature difference $\Delta T_x$ of at least 35 K in the above-described composition or at least 50 K in an optimized composition.

The glassy alloy of the present invention may contain other incidental impurities.

This magnetic core can also be produced by the above-described method.

The resulting magnetic core 82 containing the glassy alloy exhibits superior soft magnetic characteristics at room temperature and the soft magnetic characteristics are further improved by annealing. This magnetic core 82 exhibits reduced core loss compared to that of conventional materials and substantially constant permeability with a change in magnetic field, and is preferably used in the filter 86 which requires superior soft magnetic characteristics.

In addition to the above-described compaction molding in the discharge plasma sintering apparatus, the magnetic core 82 may be formed by other compaction molding processes, such as conventional powder molding, hot pressing, and extruding.

The filter 86 includes the magnetic core 82, which is formed of a mixture of the above-mentioned glassy alloy powder and the above-mentioned insulating material. The insulating material contributes to increased resistivity of the entire magnetic powder core and reduced core loss due to decreased eddy current loss in the magnetic core 82. The resulting filter 86 exhibits low loss and less heat dissipation. Moreover, the magnetic core 82 composed of the glassy alloy powder exhibits a small reduction in permeability in a high-frequency region, thus resulting in improved frequency characteristics of the filter 86.

Since the magnetic core 82 contains the glassy alloy having a resistivity of at least 1.5 $\mu\Omega$.m, the resulting magnetic core shows further reduced core loss due to reduced eddy current loss in the glassy alloy particles in a high-frequency region. The resulting filter 86 exhibits low loss and less heat dissipation.

Since the rate of change in amplitude permeability of the magnetic core 82 in a magnetic field of 2,000 A/m is within ±10% of an amplitude permeability in a magnetic field of 200 A/m, the pulsed AC current can be smoothed without waveform distortion, the filter 86 outputting waveforms with less distortion.

Moreover, the magnetic core 82 has a permeability of the magnetic core in the range of 50 to 200 at 100 kHz. Thus, the size of the inductor 81 can be reduced by decreasing the number of turns of the coil 83, thus reduction in size of the filter 86 or the amplifying device 84.

The amplifying device 84 including the filter 86 with low loss and reduced waveform distortion exhibits reduced heat dissipation and outputs a current with reduced distortion.

The composition of the glassy alloy in accordance with the present invention will now be described in more detail.

The amorphous soft-magnetic alloy of the present invention comprises Fe, Al, P, C, Si, and B and has a texture primarily composed of an amorphous phase. In addition, this amorphous alloy has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature.

Since the amorphous soft-magnetic alloy of the present invention contains Fe as a magnetic component and Al, P, C, Si, and B having amorphous formability, the amorphous alloy exhibits superior soft magnetic characteristics.

In particular, an amorphous soft-magnetic alloy exhibiting a temperature difference $\Delta T_x$ of at least 20 K in a supercooled liquid is called a glassy alloy. The glassy alloy can has a temperature difference $\Delta T_x$ of at least 40 K and particularly at least 60 K in an optimized composition, which is not anticipated from conventional knowledge. The glassy alloy also exhibits superior soft magnetic characteristics at room temperature.

The amorphous soft-magnetic alloy primarily composed of an amorphous phase has small coercive force and thus exhibits superior soft magnetic characteristics.

Since the amorphous soft-magnetic alloy of the present invention has a large temperature difference $\Delta T_x$ in a supercooled liquid, the alloy is readily supercooled to a temperature below a glass transition temperature $T_g$ without being crystallized during a cooling step of the melt, readily forming an amorphous phase. Thus, the amorphous phase can be formed at a relatively low cooling rate. For example, a glassy alloy powder primarily composed of an amorphous phase is obtainable by pulverizing a bulk glassy alloy, which is prepared by a casting or injection process, in addition to liquid quenching processes having relatively high cooling rates, such as a single-roller process.

Moreover, the amorphous soft-magnetic alloy of the present invention exhibits a high Curie temperature and superior thermal stability.

The glassy alloy may be represented by the following formula:

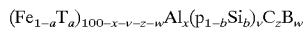

$(Fe_{1-a}T_a)_{100-x-v-z-w}Al_x(P_{1-b}Si_b)_vC_zB_w$ wherein T represents at least one element of Co and Ni, and the subscripts a, b, x, v, z, and w satisfy the relationships, $0 \leq a \leq 0.15$ by atomic ratio, $0 < b \leq 0.8$ by atomic ratio, 0 atomic percent $< x \leq 20$ atomic percent, 0 atomic percent $< v \leq 22$ atomic percent, 0 atomic percent $< z \leq 12$ atomic percent, and 0 atomic percent $< w \leq 16$ atomic percent. This amorphous soft-magnetic alloy has a temperature difference $\Delta T_x$ of at least 20 K in a supercooled liquid.

Preferably, the subscripts a, b, x, v, z, and w satisfy the relationships, $0 \leq a \leq 0.15$ by atomic ratio, 0.1 by atomic ratio $\leq b \leq 0.35$ by atomic ratio, 0 atomic percent $< x \leq 15$ atomic percent, 8 atomic percent $< v \leq 18$ atomic percent, 0.5 atomic percent $\leq z \leq 7.4$ atomic percent, and 3 atomic percent $\leq w \leq 14$ atomic percent. This amorphous soft-magnetic alloy has a temperature difference $\Delta T_x$ of at least 40 K in a supercooled liquid.

More preferably, the subscripts a, b, x, v, z, and w satisfy the relationships, $0 \leq a \leq 0.15$ by atomic ratio, 0.1 by atomic ratio $\leq b \leq 0.28$ by atomic ratio, 0 atomic percent $< x \leq 10$ atomic percent, 11.3 atomic percent $< v \leq 14$ atomic percent, 1.8 atomic percent $\leq z \leq 4.6$ atomic percent, and 5.3 atomic percent $\leq w \leq 8.6$ atomic percent. This amorphous soft-magnetic alloy has a temperature difference $\Delta T_x$ of at least 60 K in a supercooled liquid.

Fe—Al—Ga—C—P—Si—B glassy alloys are known. This glassy alloy contains iron (Fe) and other elements which facilitate the formation of an amorphous phase, such as aluminum (Al), gallium (Ga), carbon (C), phosphorus (P), silicon (Si), and boron (B).

On the other hand, the glassy alloy of the present invention contains Fe, Al, C, P, Si, and B. That is, the glassy alloy of the present invention does not contain Ga, but does contain an increased amount of Al. Thus, it is confirmed that the glassy alloy of the present invention can contain an amorphous phase regardless of the omission of Ga, which has been considered to be an essential element for the formation of the amorphous layer, and that this glassy alloy has a large temperature difference $\Delta T_x$ in a supercooled liquid.

The amorphous soft-magnetic alloy of the present invention exhibits high amorphous formability compared to the conventional Fe—Al—Ga—C—P—Si—B alloy. Since a perfect amorphous phase can be formed at a decreased cooling rate, a bulk alloy having a relatively large size and containing an amorphous phase can be produced by a casting process.

Since the entire texture is composed of a complete amorphous phase, the amorphous soft-magnetic alloy of the present invention exhibits significantly improved permeability and saturation magnetization compared to conventional glassy alloys, resulting in superior soft magnetic characteristics.

The internal stress in the amorphous soft-magnetic alloy can be relieved under an appropriate condition without precipitation of a crystalline phase, and the soft magnetic characteristics are further improved.

Aluminum (Al) is an essential element for the amorphous soft-magnetic alloy of the present invention. At an Al content x of 20 atomic percent or less, this alloy has a perfect amorphous phase due to extremely enhanced amorphous formability of Al, and the amorphous soft-magnetic alloy has a temperature difference $\Delta T_x$ of 20 K or more in a supercooled liquid.

Since Al has a negative enthalpy of mixing with Fe and has an atomic radius which is larger than that of Fe, a combined use of Al with P, B, and Si, which have atomic radii smaller than that of Fe, inhibits crystallization and can yield a thermally stable amorphous structure.

Moreover, Al raises the Curie temperature of the amorphous soft-magnetic alloy and improves thermal stability of various magnetic characteristics.

The Al content x2 is preferably 20 atomic percent or less, more preferably more than 0 atomic percent to 15 atomic percent, and most preferably more than 0 atomic percent to 10 atomic percent. An Al content x2 exceeding 20 atomic percent, the alloy has a decreased saturation magnetization due to a relatively low Fe content and does not have a temperature difference $\Delta T_x$ in a supercooled liquid.

Iron (Fe) is essential for the amorphous soft-magnetic alloy of the present invention as a magnetic element. The iron (Fe) may be partially replaced with at least one element T selected from Co and Ni. A higher Fe content contributes to improved saturation magnetization of the resulting amorphous soft-magnetic alloy.

Carbon (C), phosphorus (P), silicon (Si), and boron (B) are elements having amorphous formability. A multicomponent composition including these elements, in addition to Fe and Al, facilitates the formation of a stable amorphous phase, compared to an Fe—Al binary composition.

In particular, phosphorus (P) having high amorphous formability facilitates the formation of an amorphous phase over the entire texture and the occurrence in a temperature difference $\Delta T_x$ in a supercooled liquid.

Combined use of P and Si further increases the temperature difference $\Delta T_x$ in the supercooled liquid and facilitates the formation of a large bulk alloy composed of a single amorphous phase.

When both phosphorus and silicon are added in combination, the total content v of the phosphorus and silicon is preferably more than 0 to 22 atomic percent, more preferably 8 to 18 atomic percent, and most preferably 11.3 to 14 atomic percent. The combined use of P and S with a preferred total content v contributes to an improved temperature difference $\Delta T_x$ in a supercooled liquid and an increased size in a bulk alloy composed of a single amorphous phase.

The subscript b representing the relative Si and P contents by atomic ratio is preferably in the range of $0 \leq b \leq 0.8$ when 0 atomic percent<$v \leq 22$ atomic percent, $0.1 \leq b \leq 0.35$ when 8 atomic percent$\leq v \leq 18$ atomic percent, or $0.1 \leq b \leq 0.28$ when 11.3 atomic percent$\leq v \leq 14$ atomic percent.

When the subscript b exceeds 0.8, an excess amount of Si may undesirably cause disappearance of the temperature difference $\Delta T_x$ in the supercooled liquid.

Herein, the Si content in the amorphous soft-magnetic alloy is in the range of preferably 17.6 atomic percent or less, more preferably 0.8 to 6.3 atomic percent, and most preferably 1.13 to 3.92 atomic percent.

The above-mentioned ranges for the subscripts b and v representing the P and Si contents, respectively, contribute to an increased temperature difference $\Delta T_x$ in a supercooled liquid and an increase in size of a bulk alloy having a single amorphous phase.

The subscript z representing the C content is in the range of preferably more than 0 to 12 atomic percent, more preferably 0.5 to 7.4 atomic percent, and most preferably 1.8 to 4.6 atomic percent.

The subscript w representing the B content is in the range of preferably more than 0 to 16 atomic percent, more preferably 3 to 14 atomic percent, and most preferably 5.3 to 8.6 atomic percent.

The amorphous soft-magnetic alloy may contain 4 atomic percent or less Ge, and 0 to 7 atomic percent of at least one element selected from the group consisting of Nb, Mo, Hf, Ta, W, Zr, and Cr.

The amorphous soft-magnetic alloy of the present invention has a temperature difference $\Delta T_x$ of at least 35 K in the above composition or at least 50 K in an optimized composition.

The amorphous soft-magnetic alloy of the present invention may contain other incidental impurities.

The amorphous soft-magnetic alloy of the present invention may be formed by a casting process, a single- or twin-roller quenching process, a spinning-in-liquid process, an atomizing process in high-pressure gas, or a casting process of a melt into various shapes, e.g., a bulk, a tape, a wire, or a powder. In particular, an amorphous soft-magnetic alloy having a thickness and a diameter which are ten or more times those of conventional amorphous soft-magnetic alloys can be formed by a single-roller quenching process, a casting process, or an injection process.

The resulting amorphous soft-magnetic alloy exhibits magnetism at room temperature and improved magnetism after annealing. This amorphous soft-magnetic alloy is applicable to various magnetic articles.

The preferred cooling rate depends on the composition of the alloy, the type of the cooling process, and the size and shape of the article, and is generally in the range of 1 to $10^4$ K/s. The cooling rate is determined so that the glass phase does not contain precipitated crystalline phases, such as $Fe_3B$, $Fe_2B$, and $Fe_3P$ phases.

As an exemplary process for making the amorphous soft-magnetic alloy, an injection process using an injection mold will now be described. In this injection process, a melt of an amorphous soft-magnetic alloy having the above composition is injected into a toroidal cavity of a mold through a nozzle so that the melt is cooled and solidified in the cavity to form a toroidal article. The melt is injected into the mold along a tangent line of the outer mold surface.

Figure 32:
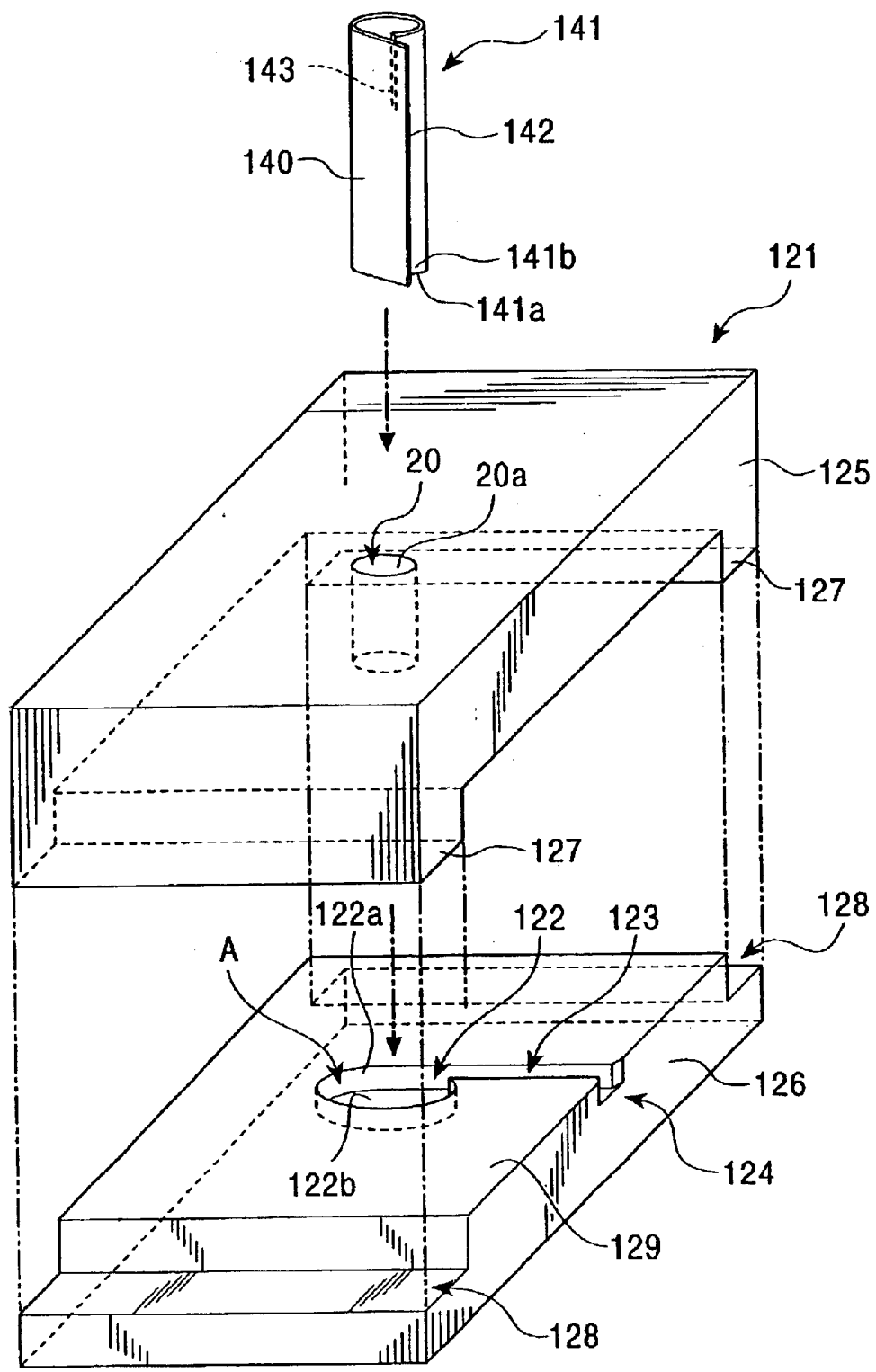
FIG. 32 is an isometric view of a mold used in the production of injection-molding articles.
Figure 33A:
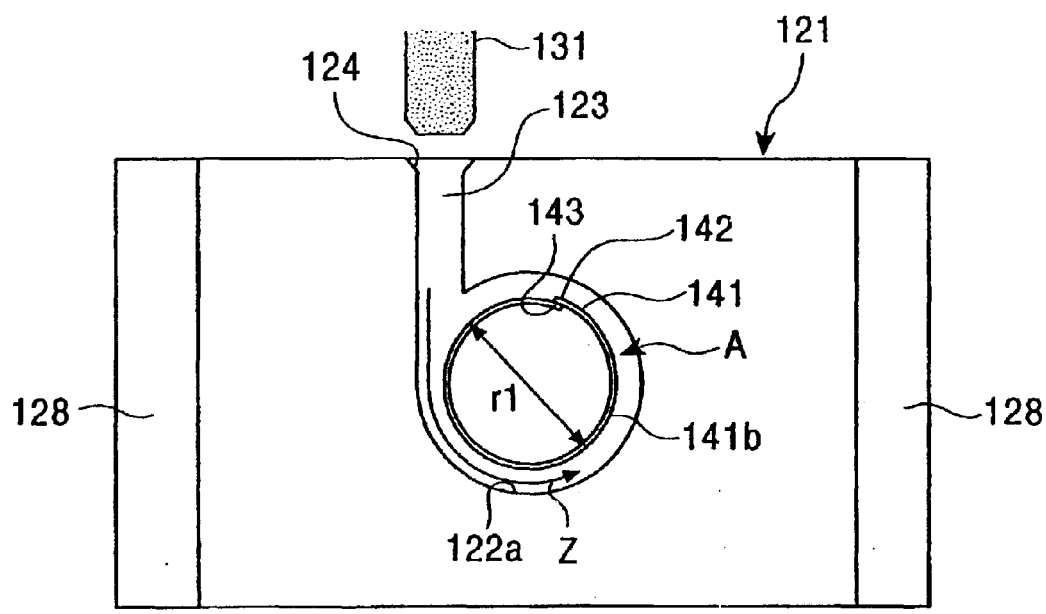
FIGS. 33A and 33B are schematic views illustrating a method for making an injection-molding article of an amorphous soft-magnetic alloy of the present invention using the mold shown in FIG. 32.
Figure 33B:
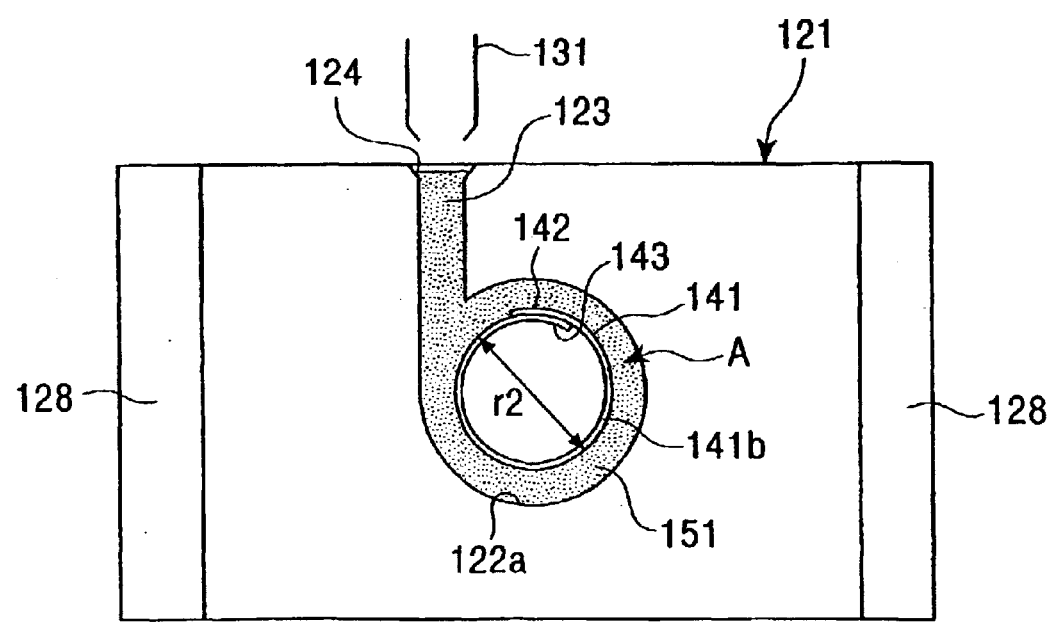

FIGS. 32, 33A and 33B show an injection mold. This mold 121 includes a hollow cylinder 141 formed of a rolled sheet 140, an upper mold 125, and a lower mold 126. The upper mold 125 comes into contact with a parting plane 129, while protuberances 127 of the upper mold 125 engages with recesses 128 of the lower mold 126 so that the relative position between the upper mold 125 and the lower mold 126 is secured and the hollow cylinder 141 is inserted into a hole 120 passing through the upper mold 125.

The parting plane 129 of the lower mold 126 is provided with a shallow circular recess 122 in the substantial center thereof. The parting plane 129 is provided with a sprue 123 and a gate 124 thereon. The sprue 123 communicates with the recess 122 and extends along a tangent line of the peripheral wall 122a of the recess 122, the tangent line being parallel to the recesses 128 of the lower mold 126. The recess 122 and the sprue 123 have substantially the same depth. The gate 124 communicates with a side wall of the lower mold 126.

The hollow cylinder 141 is inserted into the hole 120 so that the bottom end 141a of the hollow cylinder 141 comes into contact with the surface 122b of the recess 122. The peripheral face 141b of the hollow cylinder 141 and the peripheral wall 122a of the recess 122 are thereby concentrically arranged so as to form a toroidal cavity A, as shown in FIG. 33A. Thus, the peripheral wall 122a of the recess 122 defines the outer diameter of the cavity A, whereas the peripheral face 141b of the hollow cylinder 141 defines the inner diameter of the cavity A.

As shown in FIG. 32, the hollow cylinder 141 is formed by rolling a rectangular sheet 140 so that both ends 142 and 143 thereof overlap. The rolled sheet 140 is inserted into the hole 120 in the upper mold 125 and is supported as the hollow cylinder 141 by the inner wall 120a of the hole 120. Since, these ends 142 and 143 are not affixed to each other, the diameter of the hollow cylinder 141 is appropriately changeable. Thus, the inner diameter of the cavity A is also changeable.

The rectangular sheet 140 may be formed of any material which is not reactive with the melt of the amorphous soft-magnetic alloy, has a melting point above the temperature (1,000 to 1,400° C.) of the melt, and exhibits high thermal conductivity. Examples of such materials include metal foils of copper (Cu), aluminum (Al), gold (Au), silver (Ag), and platinum (Pt), and carbon sheets. A copper foil is preferred.

It is preferable that the thermal expansion coefficient of the hollow cylinder 141 be the same as that of the amorphous soft-magnetic alloy, since the hollow cylinder 141 similarly expands or shrinks by the heat of melt of the amorphous soft-magnetic alloy injected into the mold.

As shown in FIG. 33A, the peripheral wall 122a of the cavity A is partly cut out and communicates with the sprue 123. One side wall of the sprue 123 extends along a tangent line of the peripheral wall 122a of the recess 122, the tangent line being parallel to the recesses 128.

The peripheral wall 122a is also connected to the other side wall of the sprue 123. The other side wall extends along a tangent line of the peripheral face 141b of the hollow cylinder 141. These two side walls of the sprue 123 are parallel to each other.

It is preferable that the sprue 123 extends along the tangent line of the peripheral wall 122a of the cavity A. In the present invention, the sprue 123 may slightly shift from the tangent line as long as the sprue 123 communicates with the cavity A.

In injection molding using the mold 121, as shown in FIGS. 32 and 33A, the upper mold 125 is engaged with the lower mold 126 and the hollow cylinder 141 is inserted into the hole 120 of the upper mold 125 to form the cavity A. A nozzle 131 for supplying a melt for an amorphous soft-magnetic alloy is put into contact with the gate 124. The melt is ejected from the nozzle 131 by pressure of an inert gas which is supplied from a gas supply source not shown in the drawings. The ejected melt enters the cavity A through the gate 124 and the sprue 123.

Since the sprue 123 extends along the tangent line of the peripheral wall 122a of the cavity A in a direction parallel to the recesses 128, the ejected melt enters the cavity A along the peripheral wall 122a in the Z direction in FIG. 33A without diversion.

Figure 34:
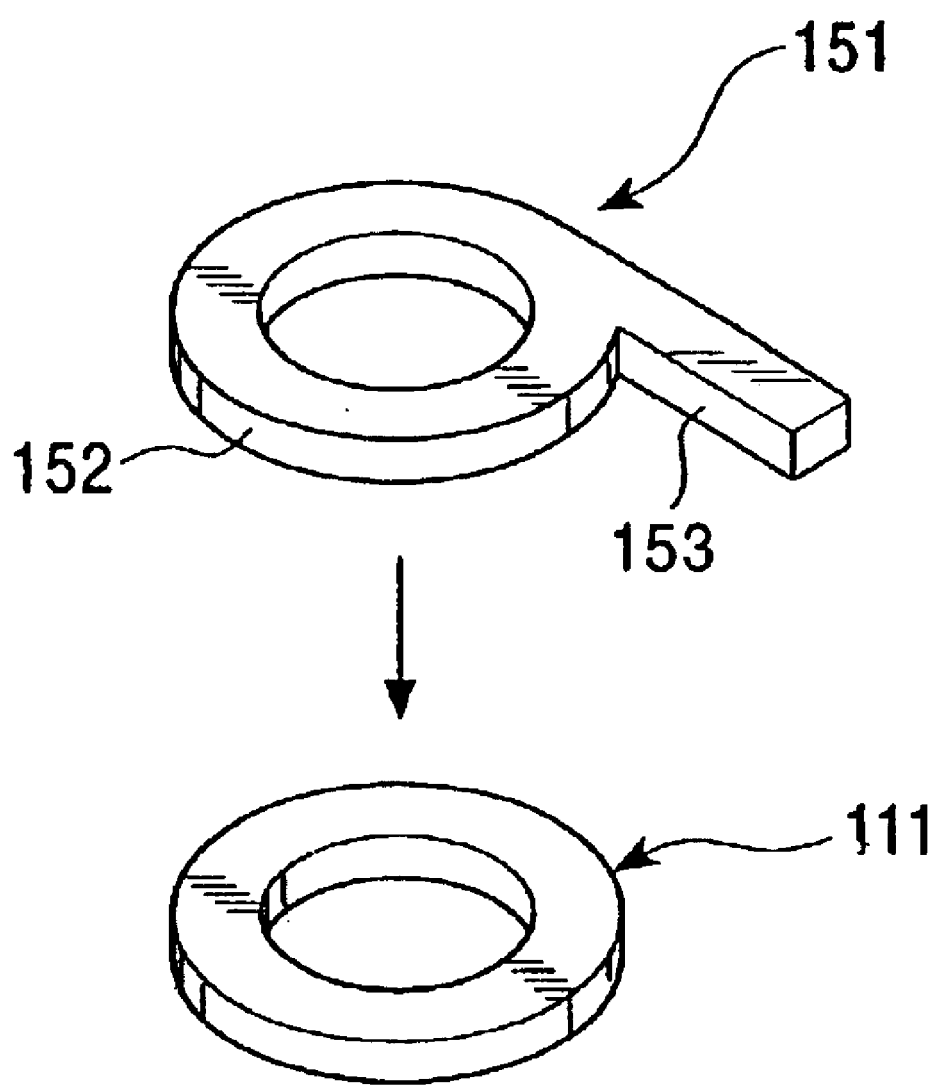
FIG. 34 is an isometric view illustrating an injection-molding article and an injection-molding precursor of an amorphous soft-magnetic alloy of the present invention using the mold shown in FIG. 32.

The melt is cooled in the sprue 123 and the cavity A and is solidified in the cavity A to form a ring. The diameter of the hollow cylinder 141 is $r_1$ before the injection of the melt into the cavity A as shown in FIG. 33A, and decreases to $r_2$ by the deformation of the hollow cylinder 141 due to a reduction in volume during solidification of the melt. An injection-molding precursor 151 primarily composed of an amorphous phase is formed in such a manner, as shown in FIG. 34.

The injection-molding precursor 151 consists of a ring portion 152 and a sprue portion 153. The sprue portion 153 is removed to form a ring injection-molding article 111 of the amorphous soft-magnetic alloy.

In order to prevent clogging in the nozzle 131 due to oxidation of the melt, the injection of the melt into the mold 121 is preferably performed in a low-oxygen atmosphere, such as an inert gas or vacuum atmosphere.

The temperature of the melt is in the range of preferably $(T_m-100)$ K to $(T_m+300)$ K and more preferably $T_m$ K to $(T_m+100)$ K, wherein $T_m$ indicates the melting point of the amorphous soft-magnetic alloy. At a temperature of less than $(T_m-100)$ K, clogging and crystallization of the melt may in the nozzle 131 occur due to an unstable supercooled state. At a temperature exceeding $(T_m+300)$ K, no particular effects reflecting this temperature are found.

For example, an amorphous soft-magnetic alloy having a composition of $Fe_{70}Al_7P_{9.65}C_{3.45}B_{6.9}Si_3$ has a melting point of 1,317 K. Thus, the temperature of this melt is preferably in the range of 1,217 to 1,617 K and more preferably 1,317 to 1,417 K.

The injection pressure of the melt is in the range of preferably 29 to 490 kPa and more preferably 98 to 294 kPa. At an injection pressure of less than 29 kPa, the entire cavity is not filled with the melt. At an injection pressure exceeding 490 kPa, the melt may leak from the junction between the upper mold 125 and the lower mold 126 of the mold 121, and stress may remain in the molded article.

Since the amorphous soft-magnetic alloy of the present invention contains Fe as a magnetic component and Al, P, C, Si, and B having amorphous formability, the amorphous alloy exhibits superior soft magnetic characteristics. Since Al has high amorphous formability, the entire texture is amorphous.

Since this amorphous soft-magnetic alloy has a large temperature difference $\Delta T_x$ of at least 20 K in a supercooled liquid, an amorphous phase can be formed from a melt at a relatively low cooling rate. Thus, a bulk alloy which is thicker than a tape can be produced. In particular, a bulk cast or injection molding article can be formed by a casting or injection process using a melt of an alloy. The above described switching power supply, filter, and amplifying device using this molded article exhibits superior characteristics.

This amorphous soft-magnetic alloy exhibits high amorphous formability compared to the conventional Fe—Al—Ga—C—P—Si—B alloy. Since a perfect amorphous phase can be formed at a decreased cooling rate, a bulk alloy having a relatively large size and containing an amorphous phase can be produced by a casting process. This homogeneous bulk alloy may be pulverized in order to produce magnetic powder cores.

Since the entire texture is composed of a complete amorphous phase, the amorphous soft-magnetic alloy exhibits significantly improved permeability and saturation magnetization, resulting in superior soft magnetic characteristics.

The internal stress in the amorphous soft-magnetic alloy can be relieved under an appropriate condition without precipitation of a crystalline phase due to the complete amorphous phase, and the soft magnetic characteristics are further improved.

EXAMPLES

Example 1
Properties of Magnetic Powder Core Composed of Glassy Alloy Prepared by Single-Roller Process Predetermined amounts of Fe, Al, an Fe—C alloy, an Fe—P alloy, B, and Si were melt in a high-frequency induction heating apparatus in a reduced-pressure Ar atmosphere to prepare an ingot having a composition $Fe_{70}Al_7P_{9.65}C_{2.3}B_{8.05}Si_3$. This ingot was melted in a crucible and was jetted onto a rotating roller through a nozzle in a reduced-pressure Ar atmosphere by a single-roller process to quench the melt and to form a glassy alloy tape with a width of 15 mm and a thickness of 20 μm of an amorphous texture. The tape was pulverized in air using a rotor mill and the trituration was classified to select particles with diameters of 45 to 150 μm as a glassy alloy powder.

A mixture of 97 parts by weight of glassy alloy powder, 1 part by weight of calcium stearate as an insulating material, and 2 parts by weight of liquid glass was dried at 473 K (200° C.) for 1 hour in air and was disintegrated. The mixture was loaded into a tungsten carbide mold shown in FIG. 2 and was heated from room temperature (298 K or 25° C.) to a molding temperature $T_s$ of 573 K (300° C.) or 623 K (350° C.) by a pulsed current from an energizing unit under a pressure $P_s$ of 600 MPa or 900 MPa using the upper and lower punches 12 and 13, respectively, in the discharge plasma sintering apparatus of a reduced pressure atmosphere of $6.6\times10^{-3}$ Pa. The mixture was held at the molding temperature $T_s$ for approximately 8 minutes while maintaining the above molding pressure $P_s$ to complete the compression molding.

The molded article was annealed at an annealing temperature $T_a$ of 573 (300° C.) to 723 K (450° C.) for 3,600 seconds to produce a required number of toroidal magnetic powder cores with an outer diameter of 12 mm, an inner diameter of 6 mm, and a thickness of 2 mm.

Properties of Glassy Alloy Powder

Figure 4:
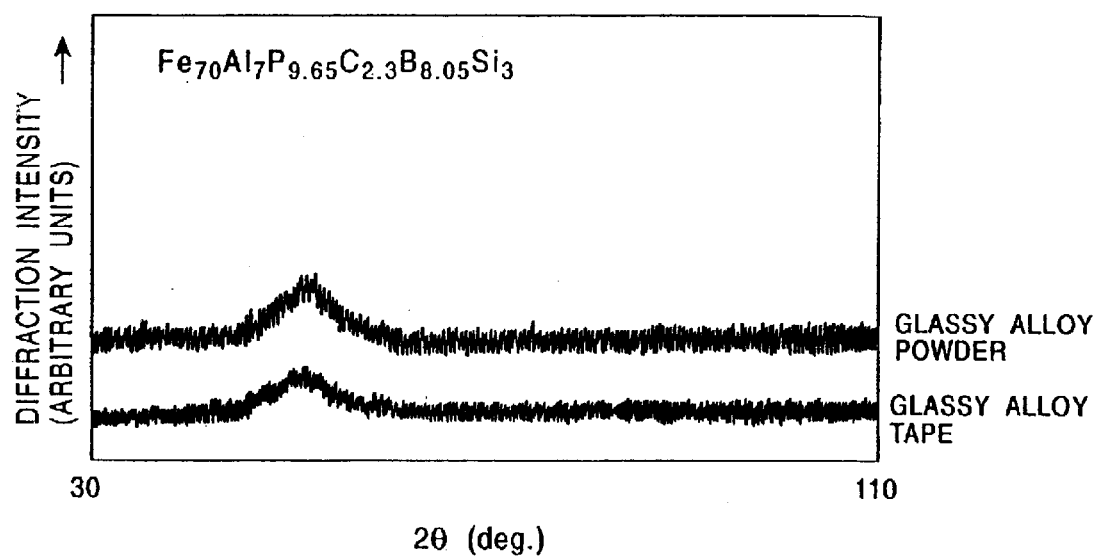
FIG. 4 is a graph illustrating X-ray diffraction patterns of a tape and a powder of a glassy alloy having a composition of $Fe_{70}Al_7P_{9.65}C_{2.3}B_{8.05}Si_3$.

FIG. 4 shows the X-ray diffraction patterns of the powder and the tape of the glassy alloy having the composition $Fe_{70}Al_7P_{9.65}C_{2.3}B_{8.05}Si_3$. As shown in FIG. 4, both the powder and the tape have broad X-ray diffraction patterns which are inherent in amorphous textures. The amorphous phase is maintained after pulverization of the glassy alloy tape.

Figure 5:
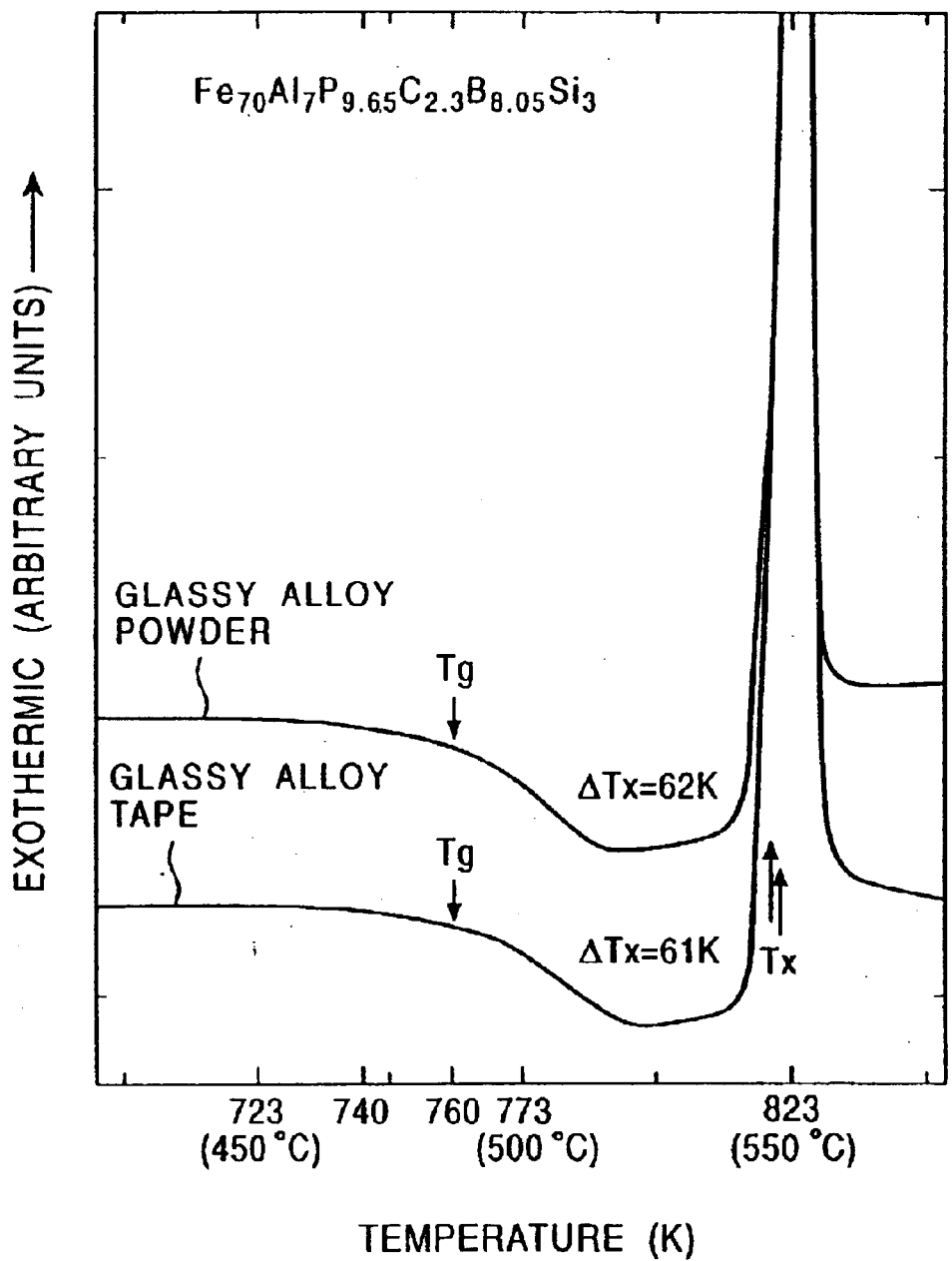
FIG. 5 is a DSC thermogram of a tape and a powder of a glassy alloy having a composition of $Fe_{70}Al_7P_{9.65}C_{2.3}B_{8.05}Si_3$.

FIG. 5 shows differential scanning calorimetric (DSC) thermograms of the powder and the tape of the above glassy alloy at a heating rate of 40 K/min (=0.67 K/sec). According to these DSC thermograms, the glassy alloy tape has a glass transition temperature $T_g$ at 760 K and a crystallization temperature $T_x$ at 821 K, thus the temperature difference $\Delta T_x$ (=$T_x$-$T_g$) in the supercooled liquid being 61 K. The glassy alloy powder has a glass transition temperature $T_g$ at 760 K and a crystallization temperature $T_x$ at 822 K, thus the temperature difference $\Delta T_x$ being 62 K.

Accordingly, the glassy alloy powder and tape of $Fe_{70}Al_7P_{9.65}C_{2.3}B_{8.05}Si_3$ has a broad supercooled-liquid region below the crystallization temperature $T_x$, exhibits a large temperature difference $\Delta T_x$, and thus has high amorphous formability and thermal stability.

Dependence of Magnetic Characteristics on Annealing Temperature (Ta)

Figure 6:
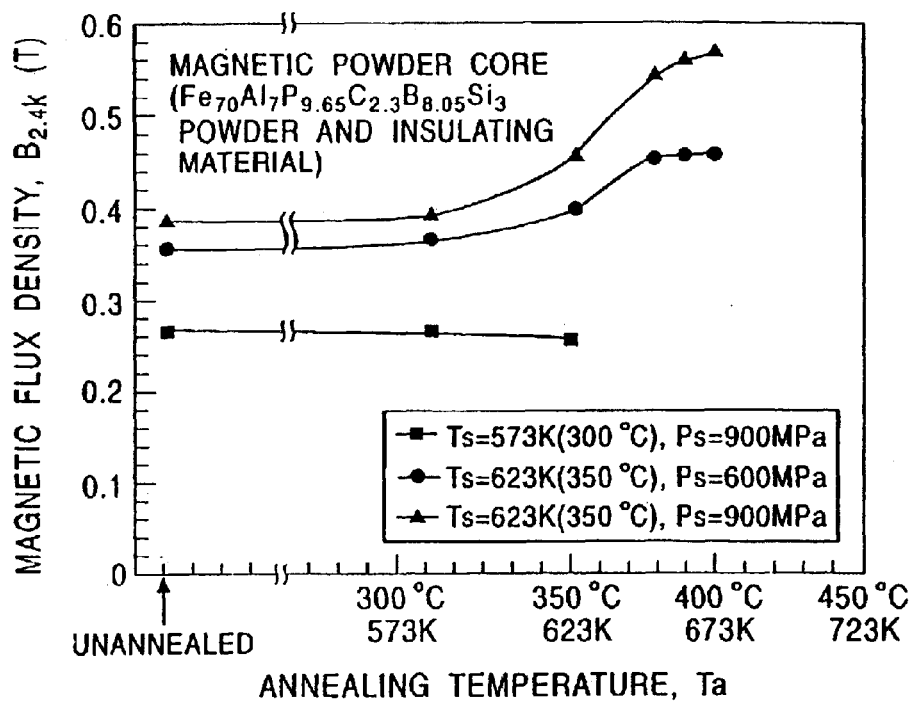
FIG. 6 is a graph illustrating the dependence of the magnetic flux density on the annealing temperature of a magnetic powder core containing a glassy alloy having a composition of $Fe_{70}Al_7P_{9.65}C_{2.3}B_{8.05}Si_3$ and an insulating layer in accordance with the present invention.
Figure 7:
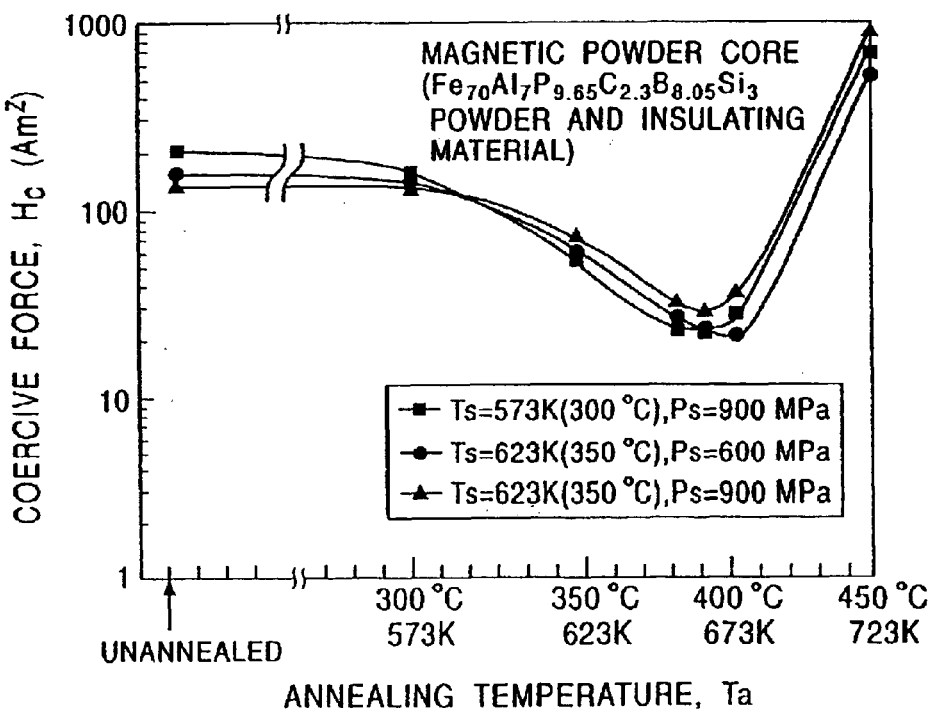
FIG. 7 is a graph illustrating the dependence of the coercive force on the annealing temperature of a magnetic powder core containing a glassy alloy having a composition of $Fe_{70}Al_7P_{9.65}C_{2.3}B_{8.05}Si_3$ and an insulating layer in accordance with the present invention.

FIGS. 6 and 7 show the dependence of magnetic flux density ($B_{2.4k}$) and the coercive force ($H_c$) on the annealing temperature ($T_a$) of the magnetic powder cores which are composed of the $Fe_{70}Al_7P_{9.65}C_{2.3}B_{8.05}Si_3$ glassy alloy powder and the insulating material. In FIGS. 6 and 7, the plot (■) illustrates the results at a molding temperature $T_s$ of 573 K (300° C.) and a molding pressure $P_s$ of 900 MPa, the plot (●) illustrates the results at a molding temperature $T_s$ of 623 K (350° C.) and a molding pressure $P_s$ of 600 MPa, and the plot (▼) illustrates the results at a molding temperature $T_s$ of 623 K (350° C.) and a molding pressure $P_s$ of 900 MPa. In all the cases, the holding time at the annealing temperature $T_a$ was 3,600 seconds. The magnetic flux density ($B_{2.4k}$) in FIG. 6 represents the density when a magnetic field of 2.4 kA/m is applied.

Magnetic powder cores for comparison were prepared as in EXAMPLE 1, except that carbonyl iron powder was used instead of the $Fe_{70}Al_7P_{9.65}C_{2.3}B_{8.05}Si_3$ glassy alloy powder.

Figure 8:
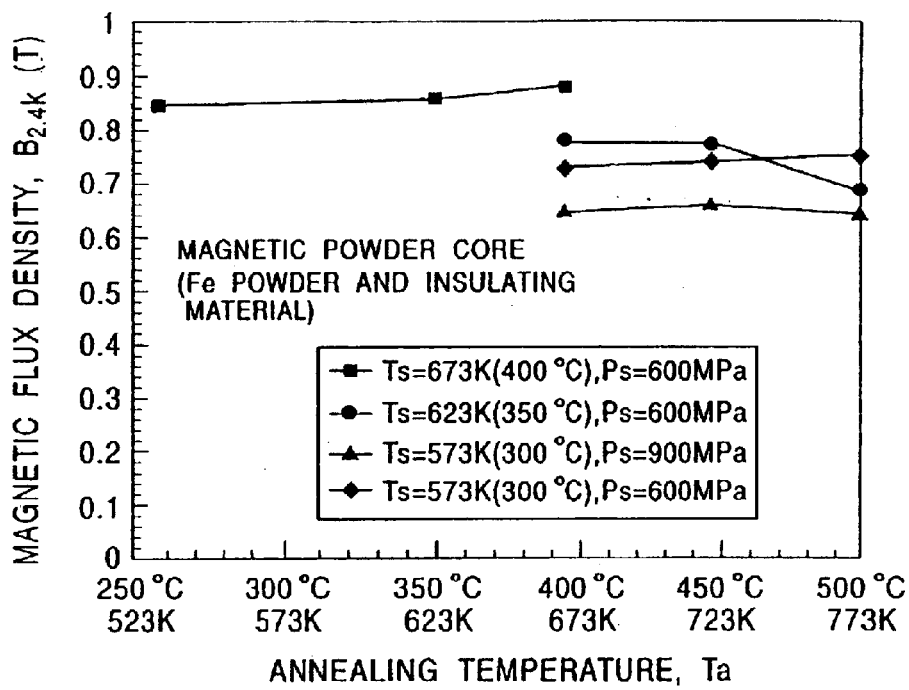
FIG. 8 is a graph illustrating the dependence of the magnetic flux density on the annealing temperature of a magnetic powder core for comparison containing powdered iron and an insulating layer.
Figure 9:
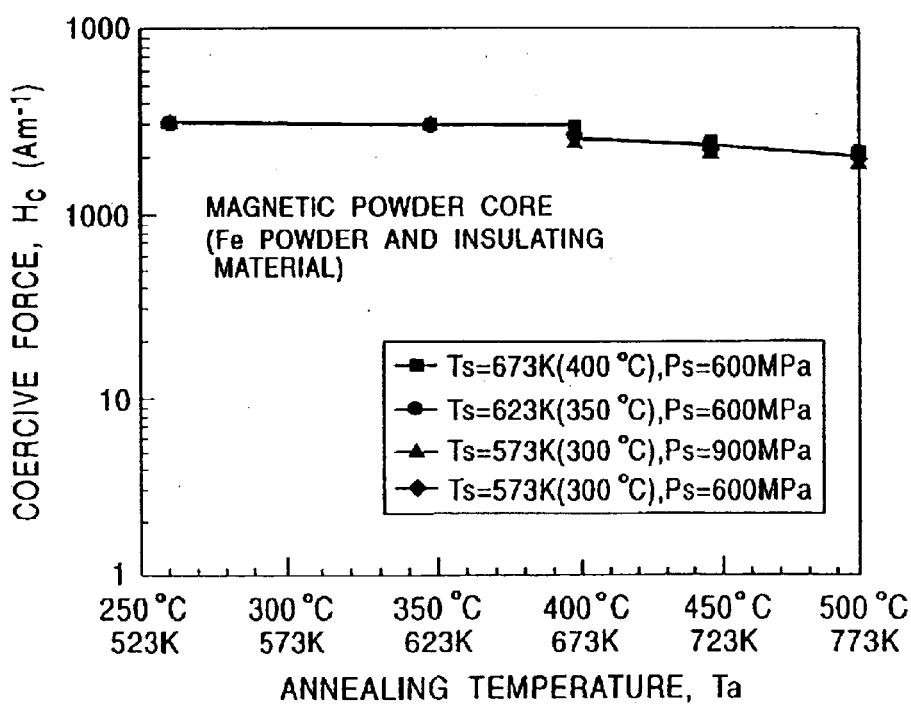
FIG. 9 is a graph illustrating the dependence of the coercive force on the annealing temperature of a magnetic powder core for comparison containing powdered iron and an insulating layer.

FIGS. 8 and 9 show the dependence of magnetic flux density ($B_{2.4k}$) and the coercive force ($H_c$) on the annealing temperature ($T_a$) of the magnetic powder cores which are composed of the Fe powder and the insulating material. In FIGS. 8 and 9, the plot (■) illustrates the results at a molding temperature $T_s$ of 673 K (400° C.) and a molding pressure $P_s$ of 600 MPa, the plot (●) illustrates the results at a molding temperature $T_s$ of 623 K (350° C.) and a molding pressure $P_s$ of 600 MPa, the plot (▼) illustrates the results at a molding temperature $T_s$ of 573 K (300° C.) and a molding pressure $P_s$ of 900 MPa, and the plot (◆) illustrates the results at a molding temperature $T_s$ of 573 K (300° C.) and a molding pressure $P_s$ of 600 MPa. In all the cases, the holding time at the annealing temperature $T_a$ was 3,600 seconds. The magnetic flux density ($B_{2.4k}$) in FIG. 8 represents the density when a magnetic field of 2.4 kA/m is applied.

FIG. 6 illustrates that the magnetic powder core using the $Fe_{70}Al_7P_{9.65}C_{2.3}B_{8.05}Si_3$ glassy alloy powder of the present invention exhibits an increased magnetic flux density ($B_{2.4k}$) after annealing regardless of the molding conditions, such as the molding temperature $T_s$ and the molding pressure $P_s$. The magnetic flux density ($B_{2.4k}$) of the annealed magnetic powder core significantly increases at an annealing temperature $T_a$ above 623 K (350° C.). On the other hand, the magnetic flux density ($B_{2.4k}$) does not substantially vary up to an annealing temperature $T_a$ of 623 K (350° C.) under the conditions of $T_s$=673 K (400° C.) and $P_s$=600 MPa.

FIG. 7 demonstrates that the magnetic powder core using the $Fe_{70}Al_7P_{9.65}C_{2.3}B_{8.05}Si_3$ glassy alloy powder of the present invention exhibits a decreased coercive force (Hc) after annealing regardless of the molding conditions. The coercive force (Hc) is 100 A/m or less by annealing at an annealing temperature $T_a$ in the range of approximately 603 K to 713 K, 80 A/m or less at an annealing temperature $T_a$ in the range of approximately 623 K to 703 K, 40 A/m or less at an annealing temperature $T_a$ in the range of approximately 653 K to 703 K, and is the minimum of approximately 15 A/m at 693 K (420° C.) and around.

In contrast, as shown in FIG. 8, the magnetic flux density ($B_{2.4k}$) of the magnetic powder core for comparison does not substantially vary by annealing regardless of the molding conditions including the molding temperature $T_s$ and the molding pressure $P_s$.

As shown in FIG. 9, the coercive force (Hc) of this magnetic powder core for comparison does also not substantially vary by annealing regardless of the molding conditions.

Frequency (f) Characteristics of Permeability and Core Loss

Figure 10:
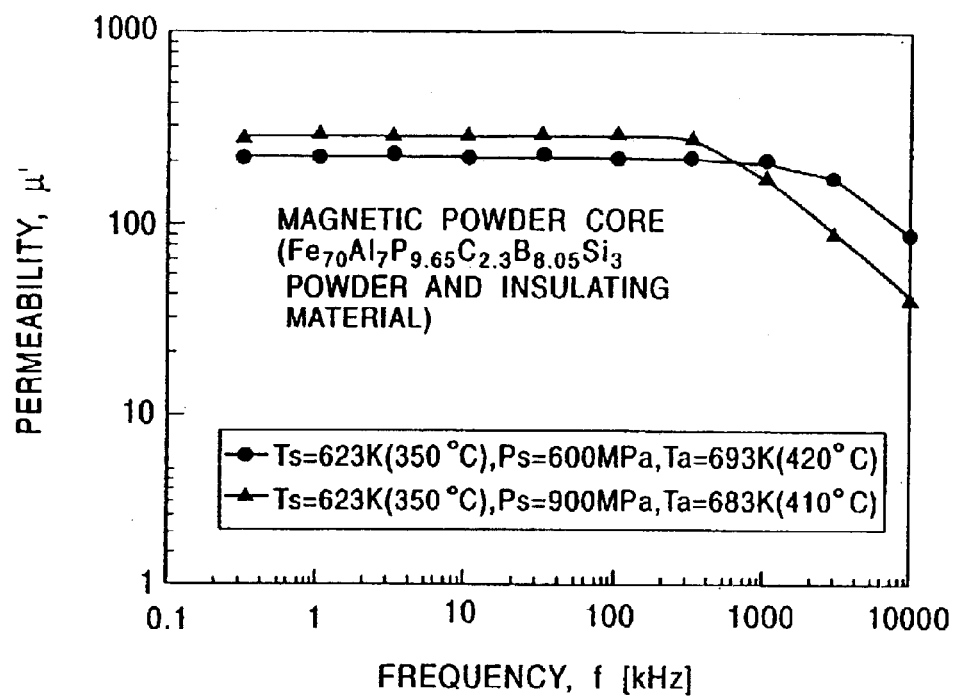
FIG. 10 is a graph illustrating the dependence of the permeability ($\mu'$) on the frequency (f) of a magnetic powder core containing a glassy alloy having a composition of $Fe_{70}Al_7P_{9.65}C_{2.3}B_{8.05}Si_3$ and an insulating layer in accordance with the present invention.
Figure 11:
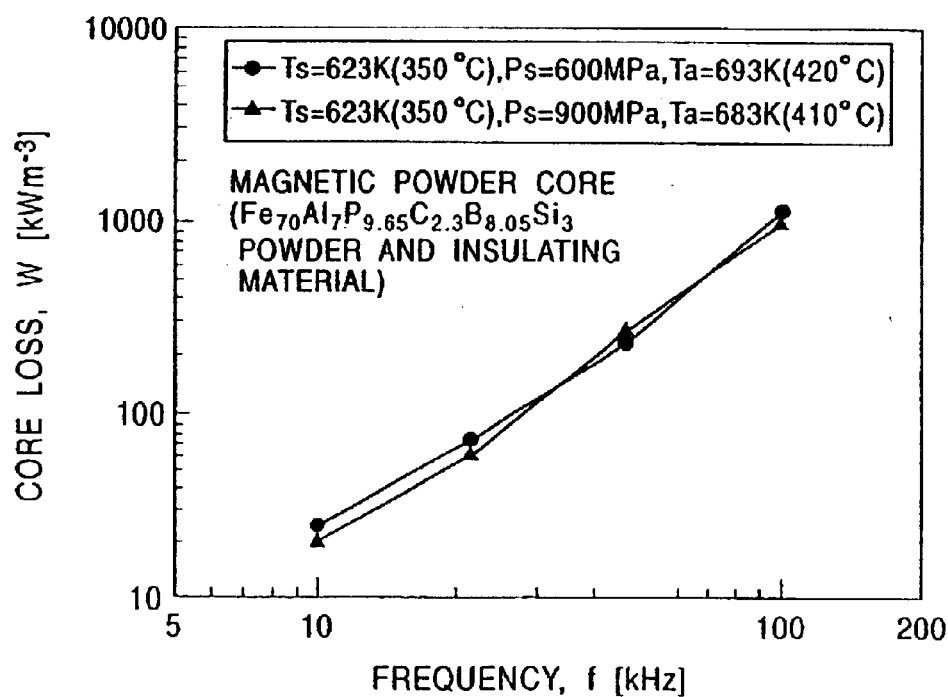
FIG. 11 is a graph illustrating the dependence of the core loss (W) on the frequency (f) of a magnetic powder core containing a glassy alloy having a composition of $Fe_{70}Al_7P_{9.65}C_{2.3}B_{8.05}Si_3$ and an insulating layer in accordance with the present invention.

FIG. 10 shows the frequency (f) characteristics of the permeability ($\mu'$) of the magnetic powder cores which are composed of the $Fe_{70}Al_7P_{9.65}C_{2.3}B_{8.05}Si_3$ glassy alloy powder and the insulating material. FIG. 11 shows the frequency (f) characteristics of the core loss (W) of these magnetic powder cores in which the core loss was measured at a frequency in the range of 10 kHz to 100 kHz and a magnetic flux density (Bm) of 0.1 T. In FIGS. 10 and 11, the plot (●) illustrates the results at a molding temperature $T_s$ of 623 K (350° C.), a molding pressure $P_s$ of 600 MPa, and an annealing temperature $T_a$ of 693 K (420° C.), and the plot (▼) illustrates the results at a molding temperature $T_s$ of 623 K (350° C.), a molding pressure $P_s$ of 900 MPa, and an annealing temperature $T_a$ of 683 K (410° C.). In all the cases, the holding time at the annealing temperature $T_a$ was 3,600 seconds.

Figure 12:
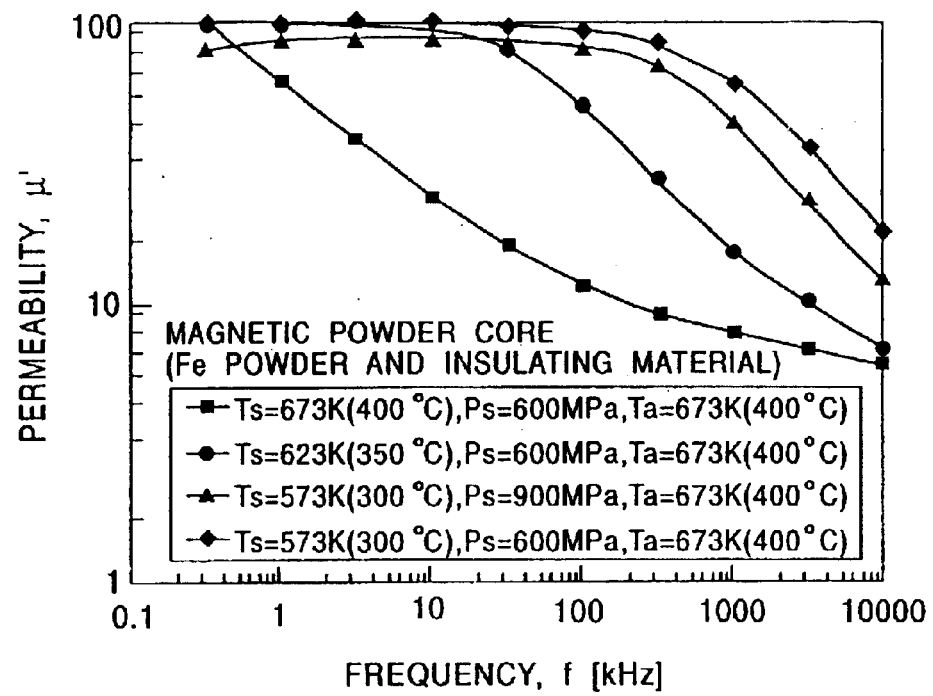
FIG. 12 is a graph illustrating the dependence of the permeability ($\mu'$) on the frequency (f) of a magnetic powder core containing powdered iron and an insulating layer.
Figure 13:
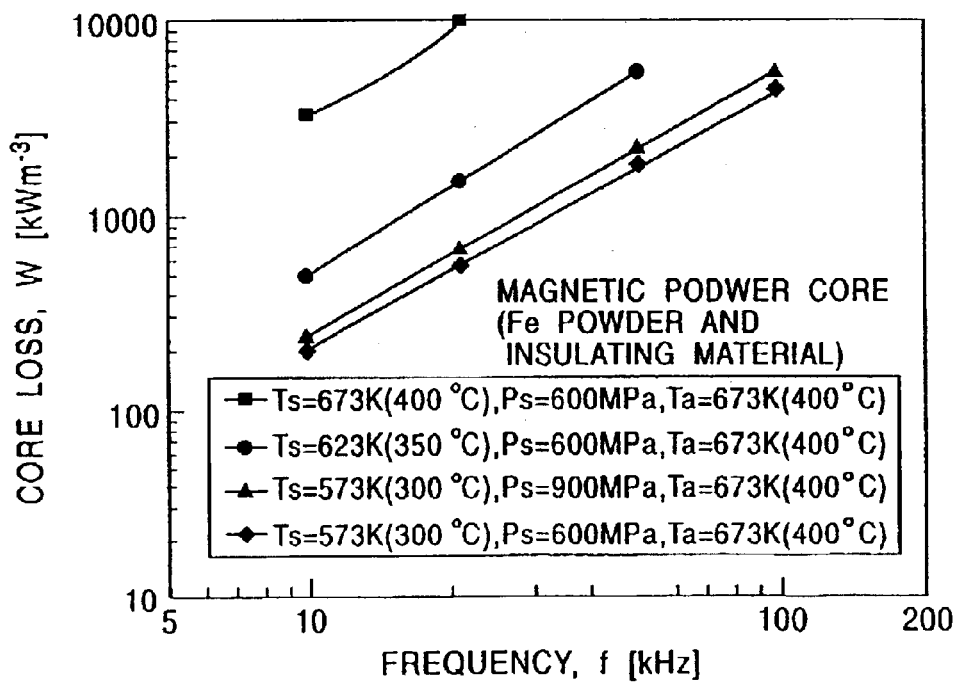
FIG. 13 is a graph illustrating the dependence of the core loss (W) on the frequency (f) of a magnetic powder core containing powdered iron and an insulating layer.

FIGS. 12 and 13 show the frequency (f) characteristics of the permeability ($\mu'$) and the core loss (W) of magnetic powder cores which were prepared using a carbonyl iron powder and an insulating material for comparison in which the core loss was measured at a frequency in the range of 10 kHz to 100 kHz and a magnetic flux density (Bm) of 0.1 T. In FIGS. 12 and 13, the plot (■) illustrates the results at a molding temperature $T_s$ of 673 K (400° C.), a molding pressure $P_s$ of 600 MPa, and an annealing temperature $T_a$ of 673 K (400° C.), the plot (●) illustrates the results at a molding temperature $T_s$ of 623 K (350° C.), a molding pressure $P_s$ of 600 MPa, and an annealing temperature $T_a$ of 673 K (400° C.), the plot (▼) illustrates the results at a molding temperature $T_s$ of 573 K (300° C.), a molding pressure $P_s$ of 900 MPa, and an annealing temperature $T_a$ of 673 K (400° C.), and the plot (♦) illustrates the results at a molding temperature $T_s$ of 573 K (300° C.), a molding pressure $P_s$ of 600 MPa, and an annealing temperature $T_a$ of 673 K (400° C.). In all the cases, the holding time at the annealing temperature $T_a$ was 3,600 seconds.

FIG. 10 illustrates that the magnetic powder core using the $Fe_{70}Al_7P_{9.65}C_{2.3}B_{8.05}Si_3$ glassy alloy powder of the present invention exhibits a constant permeability ($\mu'$) over a broad frequency range and a relatively small decrease in the permeability ($\mu'$) in a high-frequency region above 1,000 kHz. Thus, this magnetic powder core exhibits superior frequency (f) characteristics on the permeability ($\mu'$) regardless of the molding conditions, such as the molding temperature $T_s$ and the molding pressure $P_s$. The magnetic powder core ● ($T_s$=623 K, $P_s$=600 MPa, and $T_a$=693 K) exhibits a constant permeability over the broad frequency range of 0.3 to 10,000 kHz, and the magnetic powder core ♦ ($T_s$=623 K, $P_s$=900 MPa, and $T_a$=683 K) exhibits a constant permeability over the broad frequency range of 0.3 to 1,000 kHz. Thus, these magnetic powder cores are preferably applicable to magnetic core components requiring a constant permeability up to a high frequency region, such as transformer cores for switching power supplies and smoothing choke cores.

In contrast, as shown in FIG. 12, the magnetic powder cores for comparison have a narrower constant permeability region compared to the magnetic powder cores of EXAMPLE 1. In the magnetic powder core ■ ($T_s$=673 K, $P_s$=600 MPa, and $T_a$=673 K), the permeability significantly decreases as the frequency increases. In the magnetic powder core ● ($T_s$=623 K, $P_s$=600 MPa, and $T_a$=673 K), the permeability significantly decreases at a frequency above 10 kHz. In the magnetic powder cores ▼ ($T_s$=573 K, $P_s$=900 MPa, and $T_a$=673 K) and ♦ ($T_s$=573 K, $P_s$=600 MPa, and $T_a$=673 K), the permeability significantly decreases at a frequency region above 200 kHz. These magnetic powder cores exhibit permeabilities which are lower than those of the magnetic powder cores of EXAMPLE 1 in a high-frequency region of 1,000 kHz or more.

FIGS. 11 and 13 show that the magnetic powder cores using the $Fe_{70}Al_7P_{9.65}C_{2.3}B_{8.05}Si_3$ glassy alloy powder of the present invention exhibit lower core loss compared to the magnetic powder cores in the frequency region of 10 kHz to 100 kHz. The core loss of the magnetic powder cores of the present invention is one order of magnitude smaller than the core loss of the magnetic powder cores for comparison in the frequency region of 10 kHz to 20 kHz. Accordingly, the magnetic powder core of the present invention exhibits low core loss from a low-frequency region to a high-frequency region.

Dependence of Physical Properties on C, P, Si, and B Contents in Glassy Alloy

Predetermined amounts of Fe, Al, an Fe—C alloy, an Fe—P alloy, B, and Si were melt in a high-frequency induction heating apparatus in a reduced-pressure Ar atmosphere to prepare ingots represented the formula $Fe_{70}Al_7(P_{0.76}Si_{0.24})_xC_zB_w$. Each ingot was melted in a crucible and was jetted onto a rotating roller through a nozzle in a reduced-pressure Ar atmosphere by a single-roller process to quench the melt and to form a glassy alloy tape with a width of 1 mm and a thickness of 20 μm of an amorphous texture. The resulting glassy alloys had the following compositions:

$Fe_{70}Al_7(P_{0.76}Si_{0.24})_{12.65}C_{5.75}B_{4.6}$, $Fe_{70}Al_7(P_{0.76}Si_{0.24})_{10.35}C_{8.05}B_{4.6}$, $Fe_{70}Al_7(P_{0.76}Si_{0.24})_{10.35}C_{5.75}B_{6.9}$, $Fe_{70}Al_7(P_{0.76}Si_{0.24})_{12.65}C_{3.45}B_{6.9}$, $Fe_{70}Al_7(P_{0.76}Si_{0.24})_{14.95}C_{3.45}B_{4.6}$, $Fe_{70}Al_7(P_{0.76}Si_{0.24})_{14.95}C_{5.75}B_{2.3}$, $Fe_{70}Al_7(P_{0.76}Si_{0.24})_{12.65}C_{8.05}B_{2.3}$, $Fe_{70}Al_7(P_{0.76}Si_{0.24})_{10.35}C_{3.45}B9.2$, $Fe_{70}Al_7(P_{0.76}Si_{0.24})_{12.65}C_{1.15}B_{9.2}$, $Fe_{70}Al_7(P_{0.76}Si_{0.24})_{14.95}C_{1.15}B_{6.9}$, $Fe_{70}Al_7(P_{0.76}Si_{0.24})_{12.65}C_{4.6}B_{5.75}$, $Fe_{70}Al_7(P_{0.76}Si_{0.24})_{11.5}C_{4.6}B_{6.9}$, $Fe_{70}Al_7(P_{0.76}Si_{0.24})_{11.5}C_{3.45}B_{8.05}$, and $Fe_{70}Al_7(P_{0.76}Si_{0.24})_{12.65}C_{2.3}B_{0.05}$, Each glassy alloy tape was subjected to DSC at a heating rate of 0.67 K/sec to determine the glass transition temperature $T_g$, the crystallization temperature $T_x$, and thus the temperature difference $\Delta T_x$ in the supercooled liquid.

Figure 14:
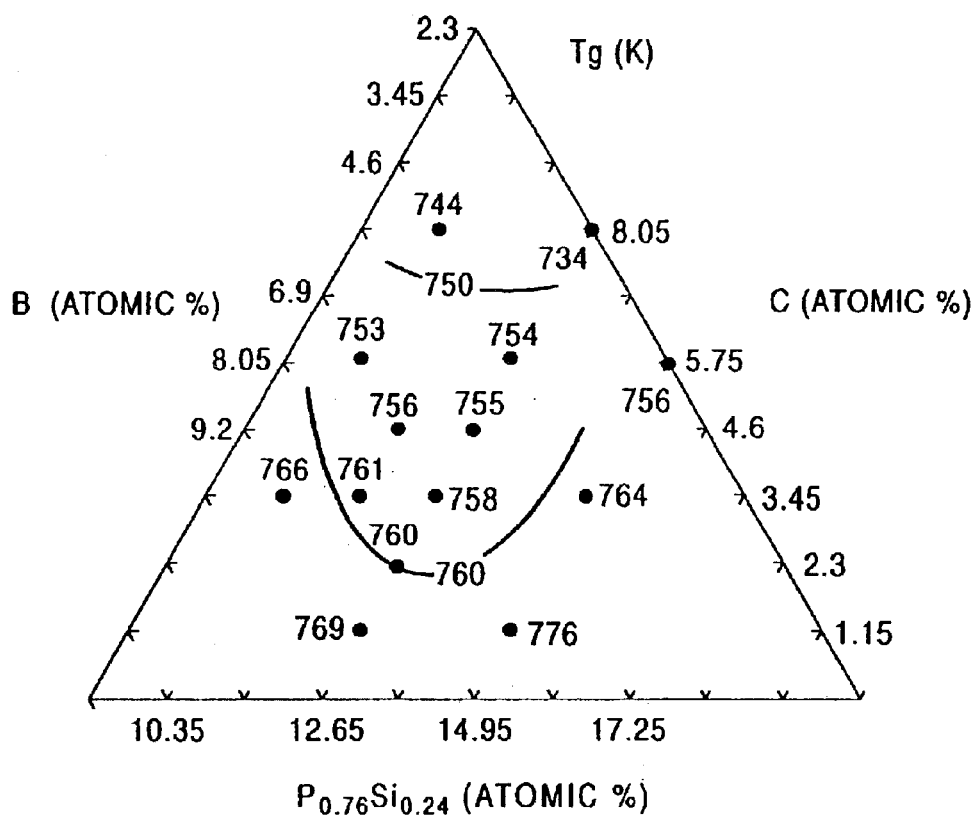
FIG. 14 is a ternary diagram illustrating the dependence of the glass transition temperature $T_g$ on the composition $Fe_{70}Al_7(P_{0.76}Si_{0.24})_vC_zB_w$ of a glassy alloy tape.
Figure 15:
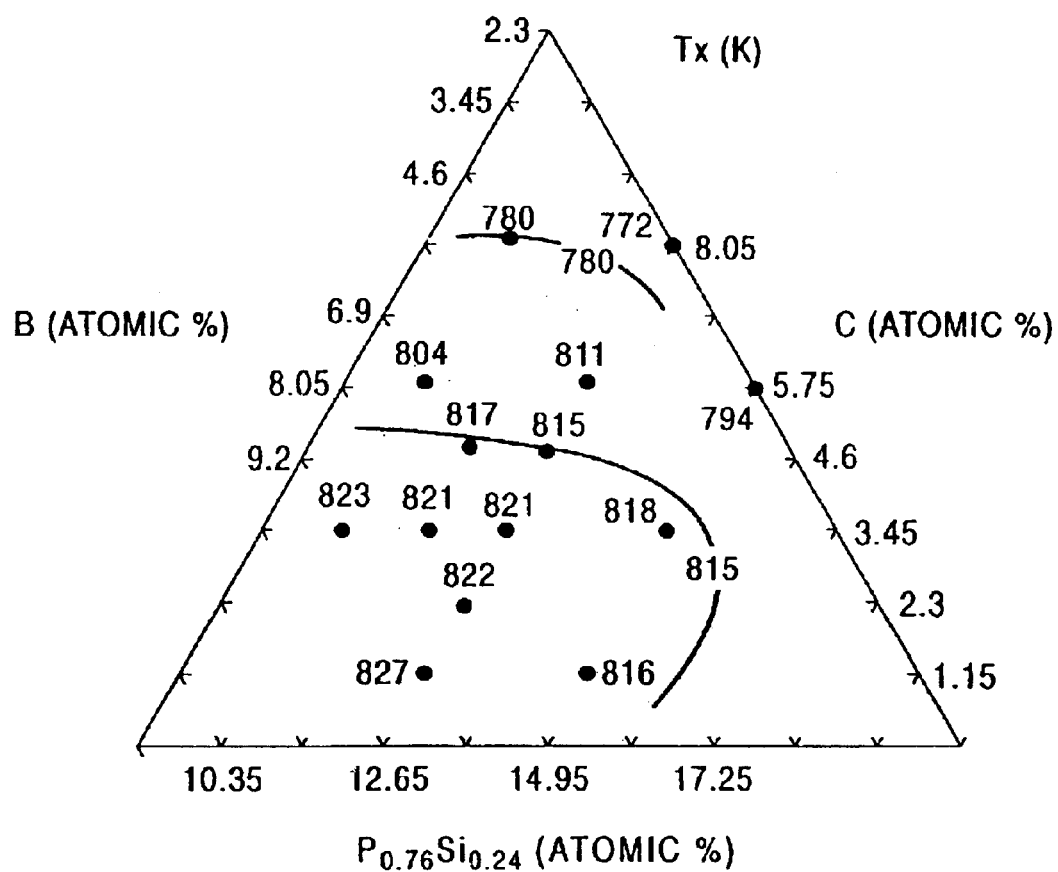
FIG. 15 is a ternary diagram illustrating the dependence of the crystallization temperature $T_x$ on the composition $Fe_{70}Al_7(P_{0.76}Si_{0.24})_vC_zB_w$ of a glassy alloy tape.
Figure 16:
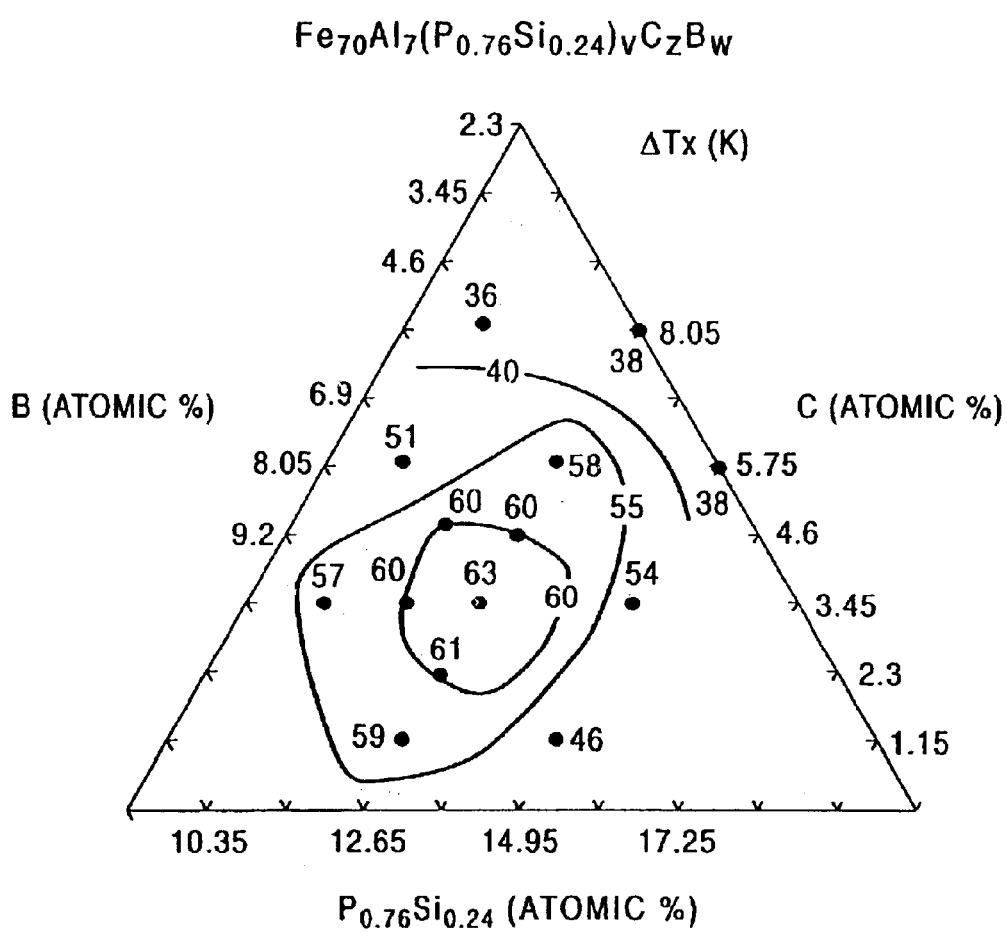
FIG. 16 is a ternary diagram illustrating the dependence of the temperature difference $\Delta T_x$ on the composition $Fe_{70}Al_7(P_{0.76}Si_{0.24})_vC_zB_w$ in a supercooled liquid of a glassy alloy tape.

FIGS. 14, 15, and 16 show the dependence of the glass transition temperature $T_g$, the crystallization temperature $T_x$, and the temperature difference $\Delta T_x$ in the supercooled liquid, respectively, on the composition of the glassy alloy.

Numbers near the corresponding plots in the ternary diagrams shown in FIGS. 14, 15, and 16 indicate the glass transition temperature $T_g$, the crystallization temperature $T_x$, and the temperature difference $\Delta T_x$ in the supercooled liquid, respectively. Numbers on isothermal lines in FIGS. 14 to 16 indicate the temperatures of the isothermal lines.

FIG. 14 shows that the glass transition temperature $T_g$ increases with an increased B content or a decreased C content. The isothermal line at $T_g$=760 K lies in the range of a B content w of 4.1 to 8.05 atomic percent and a C content z of 2.3 to 5.1 atomic percent.

FIG. 15 shows that the crystallization temperature $T_x$ also increases with an increased B content or a decreased C content. The isothermal line at $T_x$=815 K lies in the range of a B content w of 4 to 8.4 atomic percent and a C content z of 0.3 to 5 atomic percent.

FIG. 16 shows that the region surrounded by the isothermal line at Tg=760 K shown in FIG. 14 and the isothermal line at $T_x$=815 K shown in FIG. 15 corresponds to the region surrounded by the isothermal line at $\Delta T_x$=60 K. The temperature difference $\Delta T_x$ in the supercooled liquid exceeds 60 K within this range. In particular, the temperature difference $\Delta T_x$ of the $Fe_{70}Al_7(P_{0.76}Si_{0.24})_{12.65}C_{3.45}B_{6.9}$ glassy alloy is 63 K.

Example 2
Properties of Magnetic Powder Core Composed of Glassy Alloy Prepared by Gas Atomizing Process Predetermined amounts of Fe, Al, an Fe—C alloy, an Fe—P alloy, B, and Si were melt in a high-frequency induction heating apparatus in a reduced-pressure Ar atmosphere to prepare an ingot having a composition $Fe_{77}Al_1P_{9.23}C_{2.2}B_{7.7}Si_{2.87}$. This ingot was melted in a crucible provided with an atomizing nozzle at 1,350° C. (which was at least 140° C. higher than the melting point of the glassy alloy). The melt was atomized together with gaseous argon with a pressure of 8.6 MPa through the atomizing nozzle to prepare an alloy powder. The alloy powder was classified into several powders having various particle size ranges.

A mixture of 97 parts by weight of each glassy alloy powder, 1 parts by weight of calcium stearate as an insulating material, and 2 parts by weight of liquid glass was prepared. The mixture was dried in an atmosphere at 473 K (200° C.) for 1 hour and was disintegrated. The mixture was loaded into a tungsten carbide mold shown in FIG. 2 and was heated from room temperature (298 K or 25° C.) to a molding temperature $T_s$ of 623 K (350° C.) by a pulsed current from an energizing unit under a pressure $P_s$ of 1,000 MPa using the upper and lower punches 12 and 13, respectively, in the discharge plasma sintering apparatus of a reduced pressure atmosphere of 6.6×10$^{-3}$ Pa. The mixture was held at the molding temperature $T_s$ for approximately 8 minutes while maintaining the above molding pressure $P_s$ to complete the compression molding.

The molded article was annealed at an annealing temperature $T_a$ of 683 (410° C.) for 3,600 seconds to produce a required number of toroidal magnetic powder cores with an outer diameter of 12 mm, an inner diameter of 6 mm, and a thickness of 2 mm.

Permeability and DC Superposition Characteristic of Magnetic Powder Core

The permeability and the DC superposition characteristics of magnetic powders cores were measured. In each magnetic powder core, the amorphous volume fraction Vamo in the texture was 93% or 98% and the particle size was 38 µm or less. The amorphous volume fraction Vamo was determined by DSC.

Figure 17A:
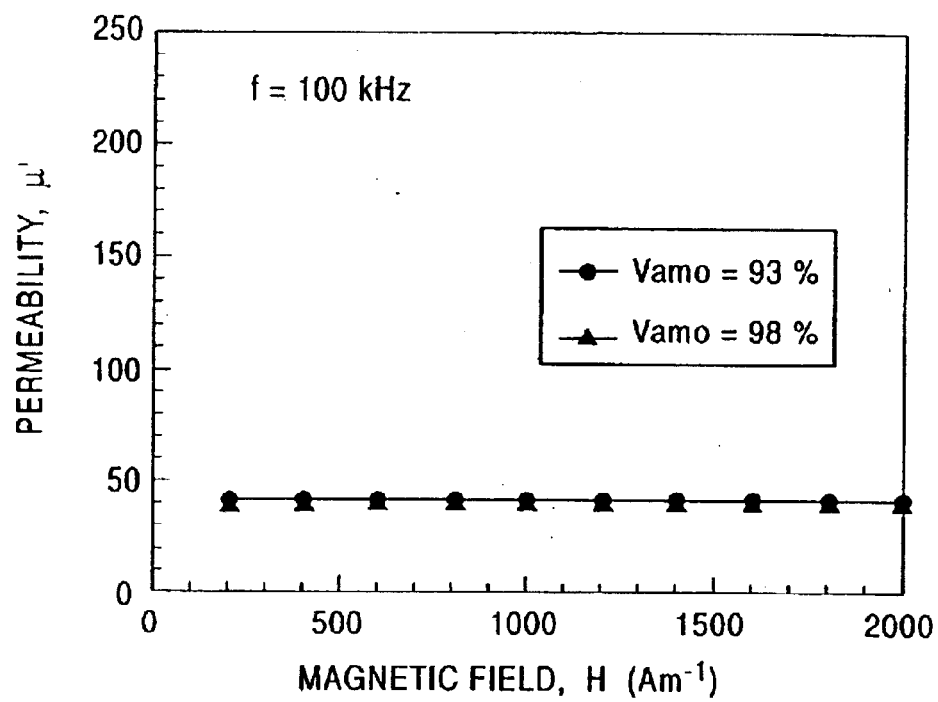
FIGS. 17A and 17B are graphs illustrating the dependence of the permeability $\mu'$ and the rate of change therein $\Delta\mu'$, respectively, on the DC magnetic field H of a magnetic powder core.
Figure 17B:
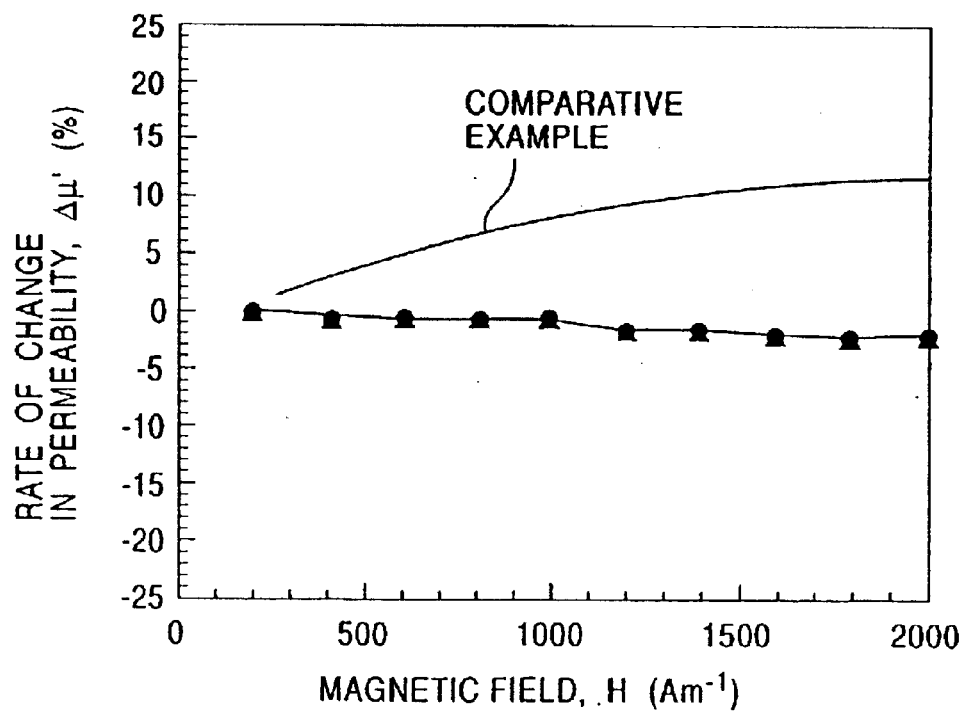

FIGS. 17A and 17B show the dependence of the effective permeability ($\lambda'$) and the rate ($\Delta\mu'$) of change in permeability, respectively, of these magnetic powder cores on the magnetic field. In these drawings, the plot (●) indicates an amorphous volume fraction of 93%, and the plot (▼) indicates an amorphous volume fraction of 98%. FIG. 17B also shows the rate ($\Delta\mu'$) of change in permeability of a magnetic powder core using carbonyl iron powder (COMPARATIVE EXAMPLE).

FIGS. 17A and 17B illustrate that the permeability and the rate of change in permeability of the magnetic powder cores according to the present invention do not substantially depend on the magnetic field. Thus, the magnetic powder cores of the present invention exhibit stable soft magnetic characteristics. Moreover, the soft magnetic characteristics are not affected by the amorphous volume fraction.

Thus, these magnetic powder cores are preferably applicable to magnetic core components requiring a constant permeability, such as transformer cores for switching power supplies and smoothing choke cores.

In contrast, in the magnetic powder core of COMPARATIVE EXAMPLE, the rate ($\Delta\mu'$) of change in permeability increases as the magnetic field increases. Since this magnetic powder core exhibits large variations in soft magnetic characteristics, magnetic components, such as transformers, using this magnetic powder core will exhibit inferior characteristics.

Figure 18A:
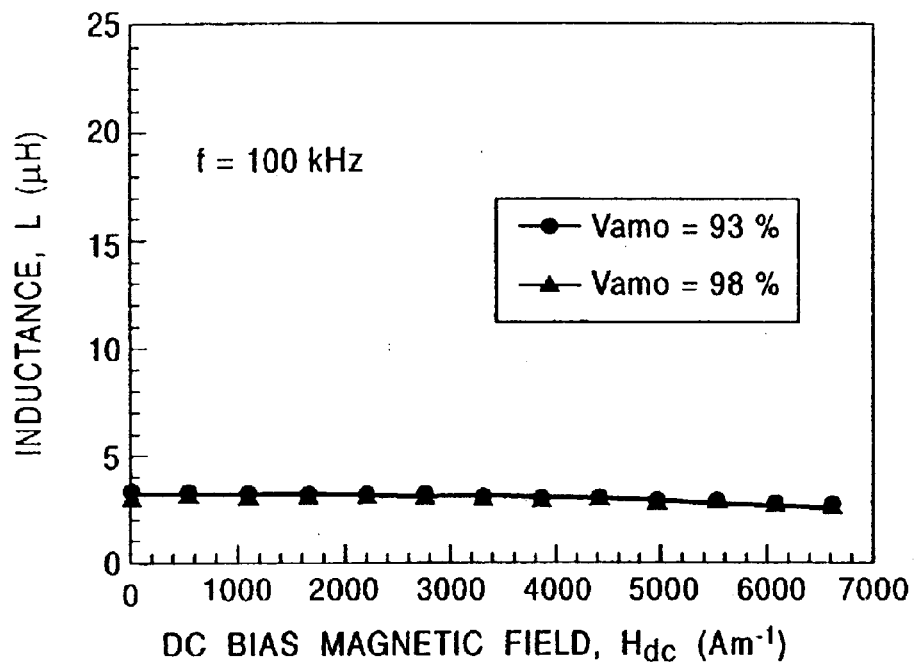
FIGS. 18A and 18B are graphs illustrating the dependence of the inductance L and the rate of change therein $\Delta L$, respectively, on the DC bias magnetic field $H_{dc}$ of a magnetic powder core.
Figure 18B:
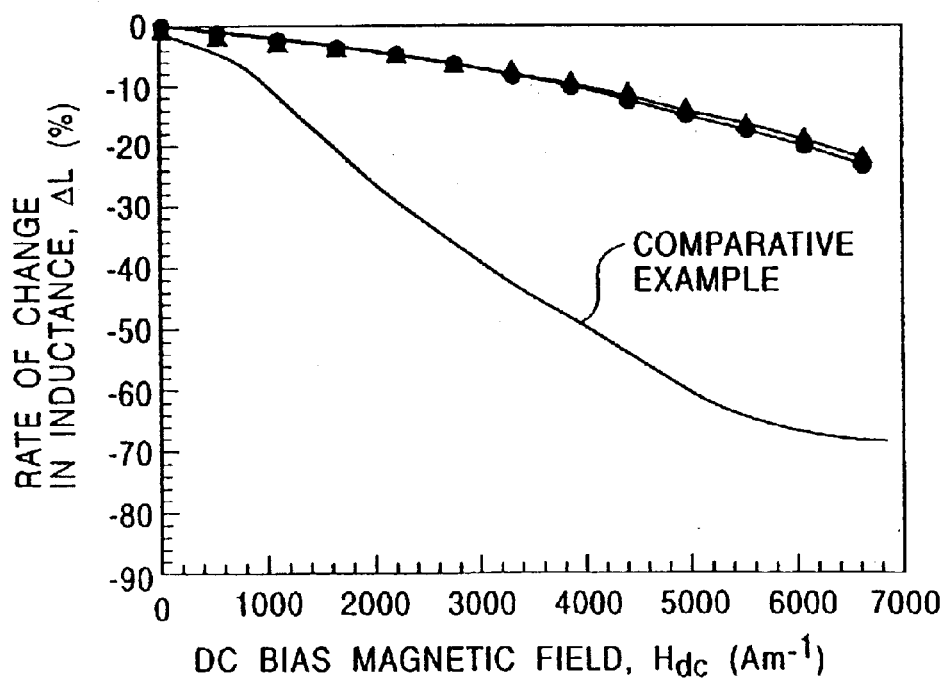

FIGS. 18A and 18B illustrate the dependence of the inductance (L) and the rate of change therein ($\Delta L$) (so-called DC superposition characteristic), respectively, on the DC bias magnetic field ($H_{dc}$) of each magnetic powder core. In these drawings, the plot (●) indicates an amorphous volume fraction of 93%, and the plot (▼) indicates an amorphous volume fraction of 98%. FIG. 18B also shows the rate ($\Delta L$) of change in inductance of a magnetic powder core using an FeAlSi amorphous alloy powder (COMPARATIVE EXAMPLE).

FIGS. 18A and 18B illustrate that the inductance (L) and the rate ($\Delta L$) of change in inductance of the magnetic powder cores according to the present invention show small changes when the DC bias magnetic field is varied. Thus, the magnetic powder cores of the present invention exhibit stable soft magnetic characteristics. Moreover, the rate ($\Delta L$) of change decreases only to approximately −25% in a DC bias magnetic field of 6,800 A/m, showing a superior soft magnetic characteristic.

Thus, these magnetic powder cores are preferably applicable to magnetic core components requiring a constant permeability, such as transformer cores for switching power supplies and smoothing choke cores.

In contrast, in the magnetic powder core of COMPARATIVE EXAMPLE, the rate ($\Delta L$) of change in inductance decreases to approximately −70% when the DC bias magnetic field is 6,800 A/m, showing a large variation in magnetic characteristics. Thus, magnetic components, such as transformers, using this magnetic powder core will exhibit inferior characteristics.

Permeability and Core Loss of Magnetic Powder Core

The permeability and the core loss of three magnetic powders cores were measured. These magnetic powder cores were composed of glassy alloy powders having different particle sizes in the range of 38 µm or less, the range of more than 38 µm to 60 µm, and the range of more than 60 µm to 100 µm. The amorphous volume fraction Vamo of each glassy alloy was determined by DSC.

Figure 19A:
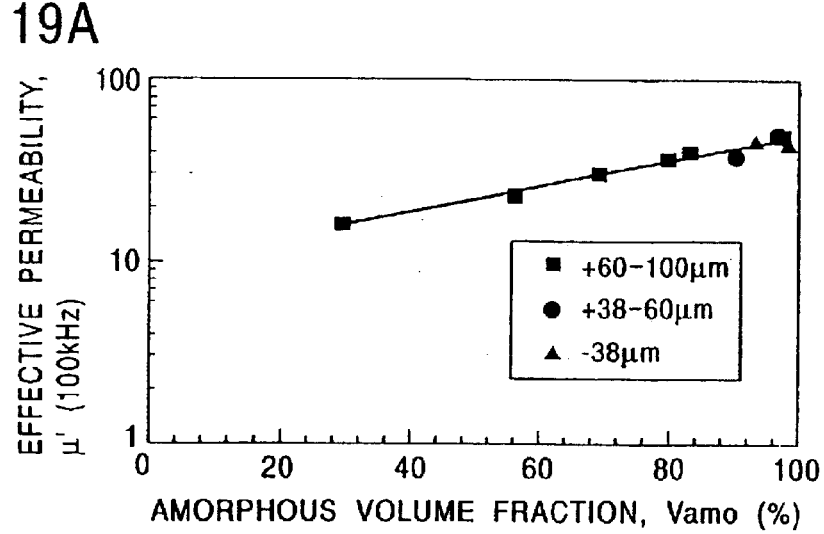
FIGS. 19A, 19B, and 19C are graphs illustrating the dependence of the permeability $\mu'$, the core loss $W_{0.5/200k}$ and the core loss $W_{1/100k}$, respectively, on the DC magnetic field H of a magnetic powder core.
Figure 19B:
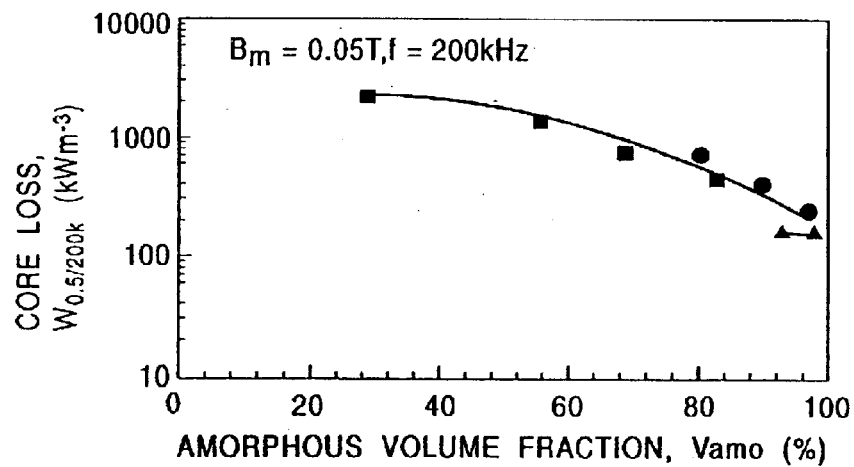
Figure 19C:
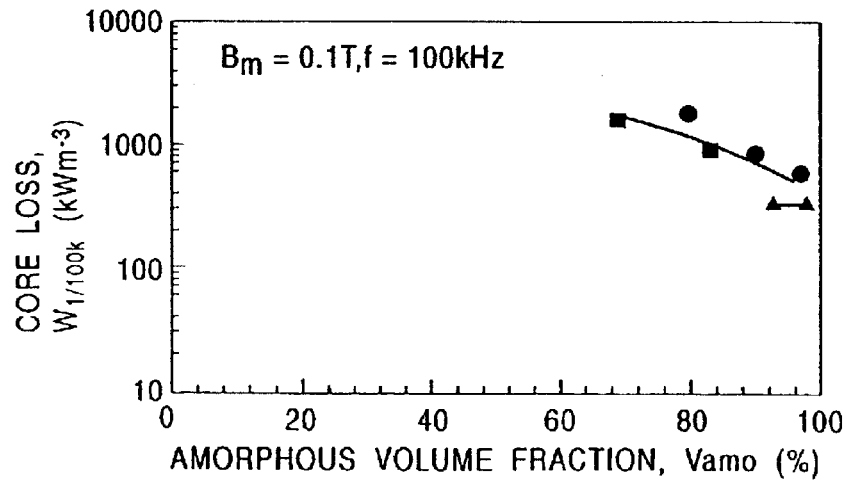

FIGS. 19A, 19B, and 19C illustrate the dependence of the permeability ($\mu'$), the core loss ($W_{0.5/200k}$) and the core loss ($W_{1/100k}$), respectively, on the amorphous volume fraction of magnetic powder cores composed of glassy alloy powders, each having a particle size in the range of more than 60 µm to 100 µm (points ■), more than 38 µm to 60 µm (points ●), and 38 µm or less (points ▼).

FIG. 19A illustrates that the effective permeability of the magnetic powder core tends to increase as the amorphous volume fraction increases and that the amorphous volume fraction increases as the particle size of the glassy alloy powder decreases.

FIG. 19B shows the core loss ($W_{0.5/200k}$) which was measured at a frequency of 200 kHz and a saturation magnetic flux density of 0.05 T, and FIG. 19C shows the core loss ($W_{1/100k}$) which was measured at a frequency of 100 kHz and a saturation magnetic flux density of 0.1 T.

As shown in FIGS. 19B and 19C, the core losses ($W_{0.5/200k}$, $W_{1/100k}$) of the magnetic powder core tends to increase with an increase in the amorphous volume fraction, as in the effective permeability. Some magnetic powder cores having an amorphous volume fraction exceeding 85% exhibit a core loss ($W_{1/100k}$) of 700 kW/m³ or less.

Accordingly, it is preferable to use a glassy alloy powder having a particle size of 38 µm or less in order to obtain a magnetic powder core exhibiting superior effective permeability and core loss when the glassy alloy powder is prepared by a gas atomizing process. If a glassy alloy powder having a particle size exceeding 38 µm is used, it is preferable that the particle size be smaller and the amorphous volume fraction be larger.

In particular, a core loss ($W_{1/100k}$) of the magnetic powder core of 700 kW/m³ or less is achieved by an amorphous volume fraction of 85% or more in the glassy alloy powder, and a core loss ($W_{1/100k}$) of 400 kW/m³ or less is achieved by a particle size of 38 µm or less in the glassy alloy powder.

Example 3
Properties of Magnetic Powder Core Containing Silicone Rubber as Insulating Material Predetermined amounts of Fe, Al, an Fe—C alloy, an Fe—P alloy, B, and Si were melt in a high-frequency induction heating apparatus in a reduced-pressure Ar atmosphere to prepare an ingot having a composition $Fe_{77}Al_1P_{9.23}C_{2.2}B_{7.7}Si_{2.87}$. This ingot was melted in a crucible provided with an atomizing nozzle at 1,350° C. (which was at least 140° C. higher than the melting point of the glassy alloy). The melt was atomized together with gaseous argon with a pressure of 8.6 MPa through the atomizing nozzle to prepare an alloy powder. The alloy powder was classified to prepare a glassy alloy powder having a particle size of 62 µm or less.

Next, the glassy alloy powder was compounded with 0.67 to 4 weight % silicone rubber as an insulating material. The mixture was compressed to a molding pressure $P_s$ of 1,500 MPa at room temperature (298 K (25° C.)) in a reduced pressure atmosphere of 6.6×10⁻³ Pa. The compressed mixture was annealed at 683 K (410° C.) for approximately 60 minutes under this molding pressure $P_s$. Magnetic powder cores (EXAMPLES 3-1 to 3-5) were prepared in such a manner. These magnetic powder cores were toroidal with an outer diameter of 12 mm, an inner diameter of 6 mm, and a thickness of 2 mm.

Also, magnetic powder cores for comparison (COMPARATIVE EXAMPLES 3-1 and 3-2) were prepared as in the above process but epoxy resin and polyimide resin were used as insulating materials, instead of the silicone rubber.

The core loss ($W_{1/100k}$) of each magnetic powder core was measured at a frequency of 100 kHz and a saturation magnetic flux density of 0.01 T. Table 1 shows these results.

TABLE 1

| | Insulating Material | | Core Loss |
| | Type | Content (weight %) | ($W_{1/100k}$) (kW/m³) |
|---|---|---|---|
| EXAMPLE 3-1 | Silicone Rubber | 0.67 | 310 |
| EXAMPLE 3-2 | Silicone Rubber | 1.33 | 290 |
| EXAMPLE 3-3 | Silicone Rubber | 2.0 | 230 |
| EXAMPLE 3-4 | Silicone Rubber | 3.0 | ≦200 |
| EXAMPLE 3-5 | Silicone Rubber | 4.0 | 300 |
| COMPARATIVE EXAMPLE 3-1 | Epoxy Resin | 2.0 | 620 |
| COMPARATIVE EXAMPLE 3-2 | Polyimide Resin | 2.0 | ≧2,000 |

Table 1 shows that all the magnetic powder cores of EXAMPLES 3-1 to 3-5 using the silicone rubber as the insulating material exhibit a core loss ($W_{1/100k}$) of 310 kW/m³ or less, which is significantly lower than that of a conventional magnetic powder core. In particular, the magnetic powder core containing 3 weight % silicone rubber exhibits a significantly low core loss of 200 kW/m³ or less.

The observed magnetostriction constants of the glassy alloys of EXAMPLES 3-1 to 3-5 are in the range of 2×10⁻⁵ to 3×10⁻⁵, demonstrating extremely reduced internal stress in the magnetic powder cores.

In the magnetic powder cores of COMPARATIVE EXAMPLES 3-1 and 3-2, the core loss ($W_{1/100k}$) is higher than that of EXAMPLES 3-1 to 3-5. In particular, the magnetic powder core of COMPARATIVE EXAMPLE 3-2 using the polyimide insulating material exhibits a core loss ($W_{1/100k}$) of 2,000 kW/m³ or more.

It is considered that the small core loss ($W_{1/100k}$) in the magnetic powder cores of EXAMPLES 3-1 to 3-5 is caused by small residual stress in the glassy alloy powder due to small hardening stress of the silicone rubber. In contrast, the large core loss ($W_{1/100k}$) of the magnetic powder cores of COMPARATIVE EXAMPLES 3-1 and 3-2 is considered to be caused by large internal stress due to large hardening stress, since these insulating materials are less elastic. In COMPARATIVE EXAMPLE 3-2, it is considered that the extremely large core loss is caused by the accumulated internal stress due to significantly large hardening stress of the polyimide resin.

Accordingly, a magnetic powder core having extremely small core loss is obtainable by compaction molding of a glassy alloy powder, which is prepared by a gas atomizing process, and a silicone rubber at room temperature and annealing of the molded article.

As described above, the magnetic powder core of the present invention is a molded article of a mixture of a glassy alloy powder and an insulating material, and the glassy alloy powder has a texture primarily composed of an amorphous phase and has a temperature difference $\Delta T_x$, which is represented by the equation $\Delta T_x = T_x - T_g$, of at least 20 K in a supercooled liquid, wherein $T_x$ indicates the crystallization temperature and $T_g$ indicates the glass transition temperature. The insulating material enhances the resistivity of the entire magnetic powder core and reduces core loss of the magnetic powder core due to reduced eddy current loss. Thus, a reduction in permeability can be moderated in a high-frequency region.

A magnetic powder core using a glassy alloy having a resistivity of at least 1.5 µΩ.m exhibits lower core loss in a high-frequency region due to reduced eddy current loss in the glassy alloy particles.

In the method for making the magnetic powder core of the present invention, a magnetic core precursor is annealed at a temperature in the range between $(T_g-170)$ K and $T_g$ K. Thus, the internal stress of the magnetic core precursor is relieved without crystallization of the glassy alloy. Accordingly, a magnetic powder core having low coercive force can be produced by the method in accordance with the present invention.

Example 4
Heat Dissipation of Step-down Converter Circuit

A toroidal magnetic powder core composed of a glassy alloy having a composition $Fe_{70}Al_7P_{9.65}C_{2.3}B_{8.05}Si_3$ was prepared as in Example 1, except that the molding pressure was 1,500 MPa and the molding temperature was room temperature (25° C. (298 K)). The magnetic powder core had an outer diameter of 18 mm, an inner diameter of 12 mm, and a thickness of 5 mm.

A coil was wound by seven turns around the magnetic powder core to prepare a choking coil having an inductance of 2.9 μH.

This choking coil was used as a coil with a magnetic core to mount into a step-down converter circuit shown in FIG. 24 (EXAMPLE 4). This converter circuit had a transistor switching element, a diode rectification element, and an electrolytic capacitor with an electrostatic capacitance of 33 μF. The input was a DC of 12 V, the output was a DC of 5 V and 25 A, and the switching frequency of the switching element was 100 kHz. The heat dissipation of the choking coil was measured. Table 2 shows the results.

Also, step-down converter circuits were assembled using a choking coils including a magnetic powder core of carbonyl iron powder (COMPARATIVE EXAMPLE 4-1) and a magnetic powder core of an FeAlSi alloy (COMPARATIVE EXAMPLE 4-2) as in EXAMPLE 4 to measure the heat dissipation of the choking coil. Table 2 also shows the result.

TABLE 2

|  | Heat Dissipation (W) |
| --- | --- |
| EXAMPLE 4 | 0.5 |
| COMPARATIVE EXAMPLE 4-1 | 3.9 |
| COMPARATIVE EXAMPLE 4-2 | 1.1 |

As shown in Table 2, the choking coil of EXAMPLE 4 exhibits lower heat dissipation compared to the choking coils of COMPARATIVE EXAMPLES 4-1 and 4-2. Accordingly, the step-down converter circuit using this choking coil exhibits high conversion efficiency due to reduced heat dissipation and low loss. Also, the magnetic core of EXAMPLE 2 will show substantially the same effect when it is used in the step-down converter circuit.

As described above, the switching power supply of the present invention includes a transformer having a magnetic core composed of a glassy alloy powder. The internal stress of the magnetic core can be relieved by annealing at a temperature which is sufficiently lower than the crystallization temperature of the glassy alloy, and the heat dissipation from the entire switching power supply can be reduced due to reduced core loss.

The switching power supply of the present invention includes a coil with a magnetic core composed of a glassy alloy powder. The internal stress of the magnetic core can be relieved by annealing at a temperature which is sufficiently lower than the crystallization temperature of the glassy alloy, and the heat dissipation from the entire switching power supply can be reduced due to reduced core loss.

Each of the step-down converter circuit, boosting converter circuit, and polarity-reversing converter circuit of the present invention uses a coil with a magnetic core composed of a glassy alloy powder. The internal stress of the magnetic core can be relieved by annealing at a temperature which is sufficiently lower than the crystallization temperature of the glassy alloy, and the heat dissipation from the entire converter circuit can be reduced due to reduced core loss.

The active filter of the present invention uses a coil with a magnetic core composed of a glassy alloy powder in the converter circuit therein. Since this magnetic core exhibits low loss, the heat dissipation from the entire active filter can be reduced.

The magnetic core exhibiting low permeability does not require a gap for preventing magnetic saturation, and does not generate a leakage magnetic field which adversely affects other peripheral circuits.

Example 5
Magnetic Characteristics of Glassy Alloy

Figure 35:
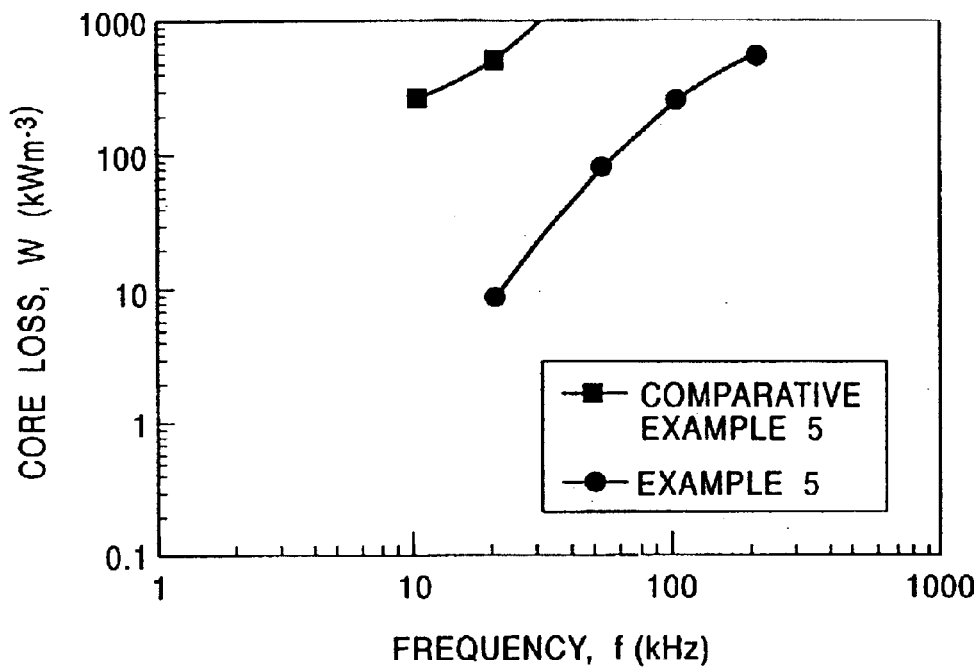
FIG. 35 is a graph illustrating the dependence of the core loss (W) on the frequency of a magnetic powder core of the present invention and a magnetic powder core for comparison.

A glassy alloy powder having a composition $Fe_{77}Al_1P_{9.23}C_{2.2}B_{7.7}Si_{2.87}$ was prepared as in EXAMPLE 4. A mixture of 97 parts by weight of glassy alloy powder and 3 part by weight of silicone elastomer as an insulating material was dried at 473 K (200° C.) for 1 hour in air and was disintegrated. The mixture was loaded into a tungsten carbide mold and was heated to a temperature of 683 K under a pressure of 1,500 MPa in the discharge plasma sintering apparatus of a reduced pressure atmosphere of $6.6 \times 10^{-3}$ Pa. A toroidal magnetic powder core with an outer diameter of 12 mm, an inner diameter of 6 mm, and a thickness of 2 mm was thereby prepared. The rate of change in amplitude permeability $(\Delta\mu')$ and the core loss (W) of the magnetic powder core were measured (EXAMPLE 5). The results are shown in FIGS. 35 and 36.

The rate of change in amplitude permeability $(\Delta\mu')$ and the core loss (W) of a magnetic powder core of carbonyl iron powder were also measured (COMPARATIVE EXAMPLE 5). The results are shown in FIGS. 35 and 36.

Figure 36:
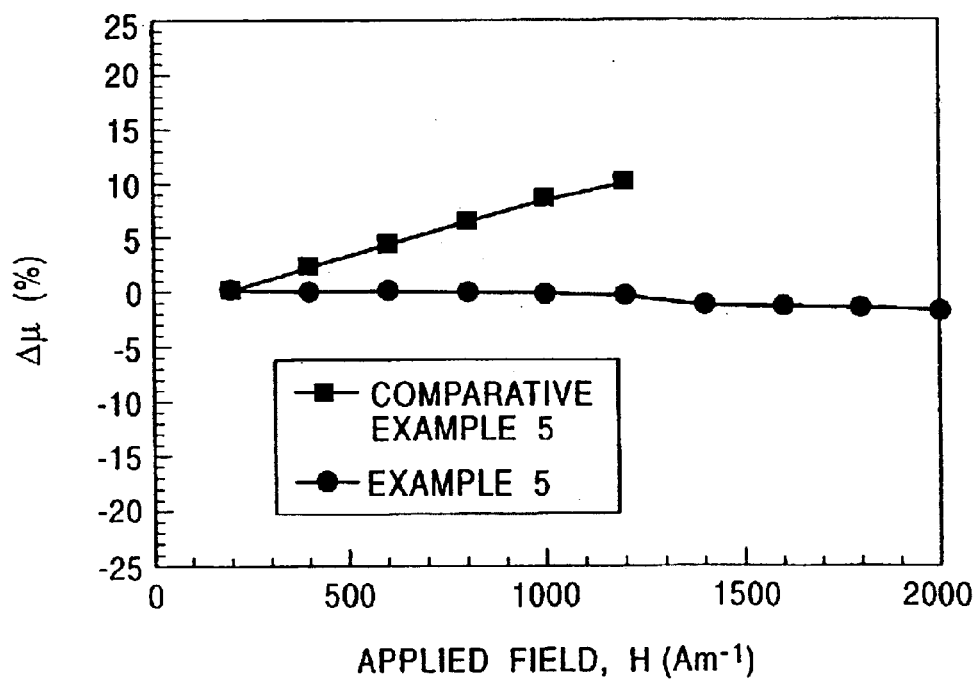
FIG. 36 is a graph illustrating the dependence of the rate of change $\Delta\mu'$ in the amplitude permeability on the magnetic field of a magnetic powder core of the present invention and a magnetic powder core for comparison.

FIG. 36 shows the relationship between the rate of change in amplitude permeability $(\Delta\mu')$ relative to the amplitude permeability in a magnetic field of 200 A/m and the magnetic field. The magnetic core of EXAMPLE 5 exhibits a rate of change in amplitude permeability of approximately −5% in a magnetic field of 2,000 A/m, that is, exhibits substantially the same amplitude permeability regardless of the magnetic field.

In contrast, the magnetic core of COMPARATIVE EXAMPLE 5 exhibits a rate of change in amplitude permeability exceeding +5% in a magnetic field of 2,000 A/m, that is, exhibits a significant change in amplitude permeability with a change in magnetic field.

FIG. 35 shows the dependence of the core loss (W) measured at a magnetic flux density Bm of 0.1 T on the frequency. The magnetic core of present invention exhibits a relatively small core loss (W) of approximately 10 kWm$^{-3}$ at a frequency of 10 kHz, and a core loss (W) of approximately 250 kWm$^{-3}$.

In contrast, the magnetic core of COMPARATIVE EXAMPLE 5 exhibits a considerably high core loss (W) of 250 kWm$^{-3}$ at a frequency of 10 kHz, 520 kWm$^{-3}$ at a frequency of 20 kHz, and 2,000 kWm$^{-3}$ at a frequency of 100 kHz (not shown in the drawing).

The magnetic core composed of the glassy alloy according to the present invention exhibits smaller core loss compared to the conventional carbonyl iron powder magnetic core and exhibits constant amplitude permeability over a wide range of magnetic field.

When the magnetic core of the present invention is used as a magnetic core of a filter, the filter exhibits reduced loss and reduced heat dissipation, and outputs smoothed waveforms with less distortion.

As described above, the filter of the present invention includes a capacitor and an inductor of a coil wound around a magnetic core. The magnetic core is composed of a glassy alloy powder having a temperature difference $\Delta T_x$ in a supercooled liquid and an insulating material. The internal stress of the glassy alloy can be relieved by annealing at a temperature which is sufficiently lower than the crystallization temperature of the glassy alloy, and the magnetic core exhibits low core loss and a substantially constant amplitude permeability over a wide intensity range of magnetic field. Thus, the filter exhibits reduced heat dissipation and outputs less distorted waveforms.

Since a glassy alloy having a resistivity of at least 1.5 $\mu\Omega \cdot m$ is used, the resulting magnetic core shows further reduced core loss due to reduced eddy current loss in the glassy alloy particles in a high-frequency region. Accordingly, the filter exhibits further decreased loss.

Moreover, the insulating material increases the resistivity of the magnetic core, resulting in decreased core loss due to reduced eddy current loss. Moreover, a reduction in permeability in a high-frequency region is suppressed. Thus, the filter exhibits improved high-frequency characteristics.

Since the rate of change in amplitude permeability of the magnetic core in a magnetic field of 2,000 A/m is within ±10% of an amplitude permeability in a magnetic field of 200 A/m, the filter outputs less distorted waveforms. Thus, the filter is preferably applicable to a smoothing circuit of a pulse width modulating amplifier.

Since the permeability of the magnetic core at 100 kHz is in the range of 50 to 200, the number of turns of the coil can be reduced, resulting in miniaturization of the inductor and thus the filter.

The magnetic core of the filter of the present invention is composed of a glassy alloy having a predetermined composition, exhibits smaller core loss compared with a conventional carbonyl iron powder magnetic core, and exhibits constant amplitude permeability over a wide intensity range of magnetic field. Thus, the filter exhibits reduced heat dissipation due to reduced loss and outputs smoothed waveforms with less distortion.

The amplifying device of the present invention includes an amplifier for outputting a pulsed current and a filter, for smoothing the pulsed current, in connection with the output side of the amplifier. The filter includes a capacitor and an inductor of coil wound around the magnetic core. Thus, the amplifying device exhibits reduced heat dissipation due to low loss and outputs waveforms with less distortion.

Example 6
Dependence of Physical and Magnetic Properties on P, Si, C, and B Contents Predetermined amounts of Fe, Al, an Fe—C alloy, an Fe—P alloy, B, and Si were melt in a high-frequency induction heating apparatus in a reduced-pressure Ar atmosphere to prepare ingots having different compositions. Each ingot was melted in a crucible and was jetted onto a rotating roller through a nozzle in a reduced-pressure Ar atmosphere by a single-roller process to quench the melt and to form a glassy alloy tape, of an amorphous texture, with a width of 1 mm and a thickness of 20 $\mu m$. Amorphous soft-magnetic alloy tapes of EXAMPLES 6-1 to 6-14 were prepared in such a manner.

A Ga-containing amorphous soft-magnetic alloy tape represented by $Fe_{70}Al_5Ga_2P_{9.65}C_{5.75}B_{4.6}Si_3$ was prepared for comparison (COMPARATIVE EXAMPLE 6).

Table 3 shows the compositions of the resulting amorphous soft-magnetic alloy tapes of the present invention. The compositions are represented by $Fe_{70}Al_7(P_{0.76}Si_{0.24})_vC_zB_w$, wherein v is in the range of 10.35 to 14.95 atomic percent, Z is in the range of 1.15 to 8.05 atomic percent, and w is in the range of 2.3 to 9.2 atomic percent.

Figure 37:
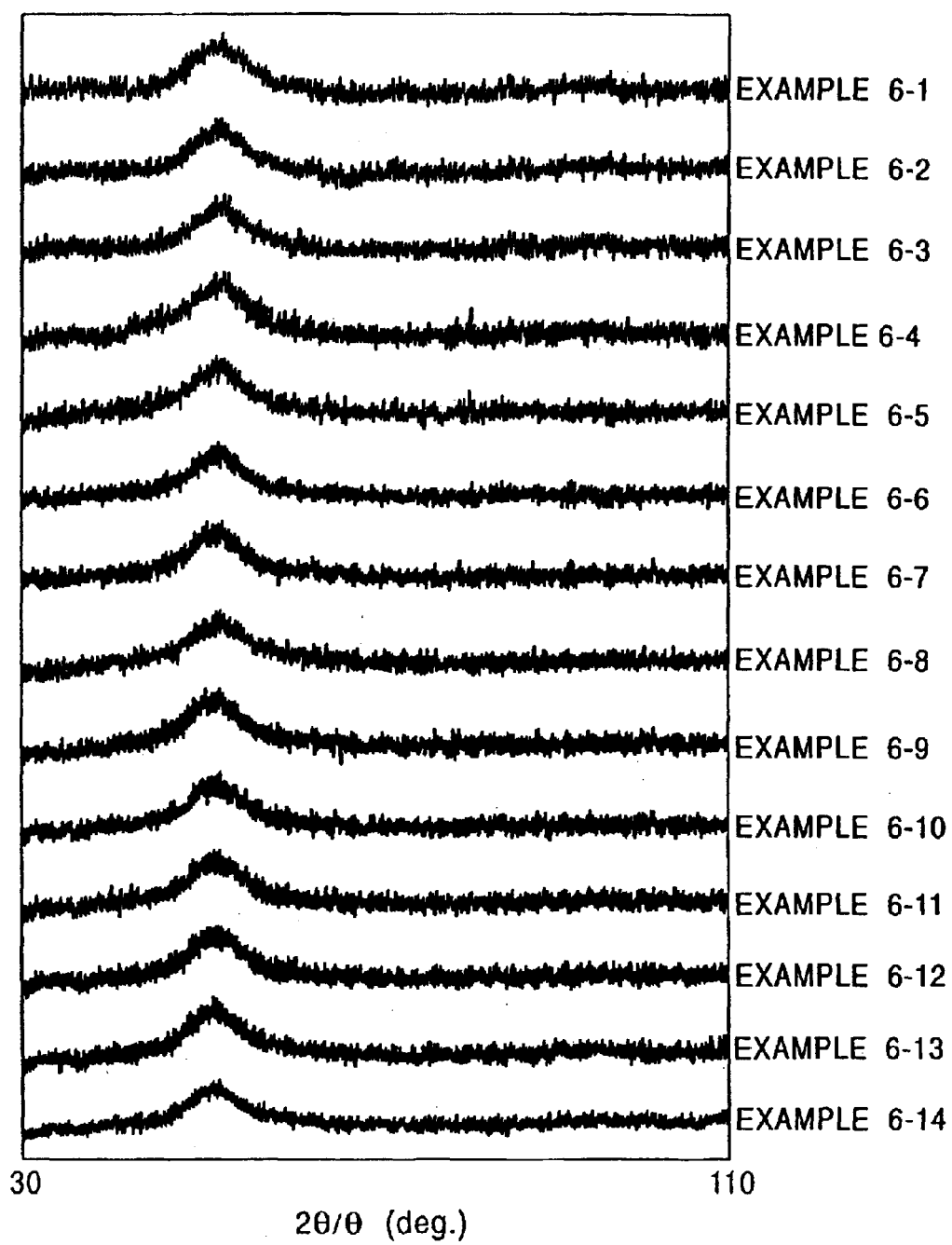
FIG. 37 is a graph illustrating X-ray diffraction patterns of amorphous soft-magnetic alloy tapes in accordance with EXAMPLES 6-1 to 6-14.

The amorphous soft-magnetic alloys of EXAMPLES 6-1 to 6-14 were subjected to crystallographic analysis by X-ray diffractometry. FIG. 37 shows the results.

Figure 38:
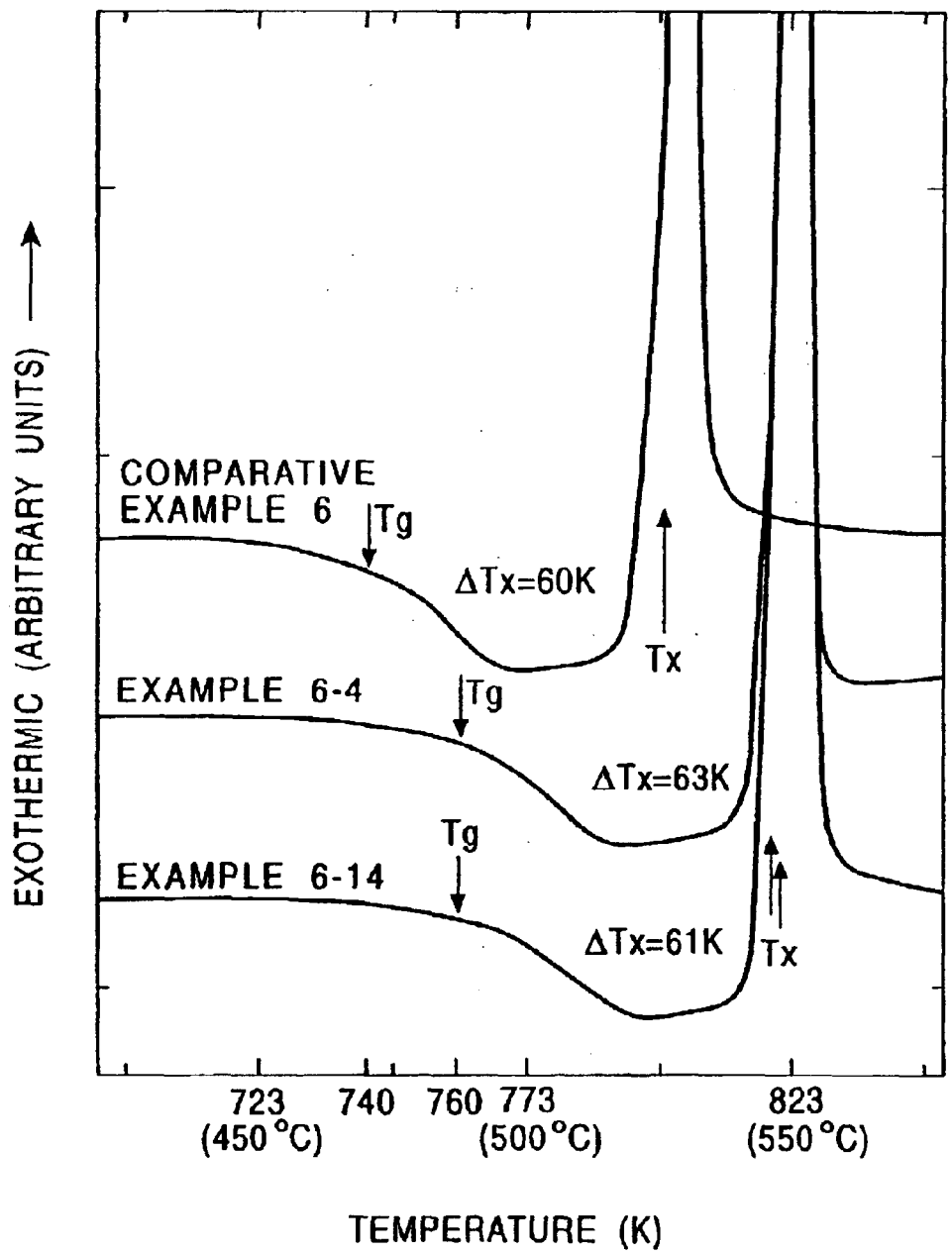
FIG. 38 is a graph illustrating DSC thermograms of amorphous soft-magnetic alloy tapes of EXAMPLES 6-4 and 6-14 and COMPARATIVE EXAMPLE 6.

The amorphous soft-magnetic alloys of EXAMPLES 6-4 and 6-14 and COMPARATIVE EXAMPLE 6 were subjected to DSC at a heating rate of 0.67 K/sec. FIG. 38 and Table 4 show the DSC results.

TABLE 3

| | Alloy Composition |
|---|---|
| EXAMPLE 6-1 | $Fe_{70}Al_7(P_{0.76}Si_{0.24})_{12.65}C_{5.75}B_{4.6}$ |
| EXAMPLE 6-2 | $Fe_{70}Al_7(P_{0.76}Si_{0.24})_{10.35}C_{8.05}B_{4.6}$ |
| EXAMPLE 6-3 | $Fe_{70}Al_7(P_{0.76}Si_{0.24})_{10.35}C_{5.75}B_{6.9}$ |
| EXAMPLE 6-4 | $Fe_{70}Al_7(P_{0.76}Si_{0.24})_{12.65}C_{3.45}B_{6.9}$ |
| EXAMPLE 6-5 | $Fe_{70}Al_7(P_{0.76}Si_{0.24})_{14.95}C_{3.45}B_{4.6}$ |
| EXAMPLE 6-6 | $Fe_{70}Al_7(P_{0.76}Si_{0.24})_{14.95}C_{5.75}B_{2.3}$ |
| EXAMPLE 6-7 | $Fe_{70}Al_7(P_{0.76}Si_{0.24})_{12.65}C_{8.05}B_{2.3}$ |
| EXAMPLE 6-8 | $Fe_{70}Al_7(P_{0.76}Si_{0.24})_{10.35}C_{3.45}B_{9.2}$ |
| EXAMPLE 6-9 | $Fe_{70}Al_7(P_{0.76}Si_{0.24})_{12.65}C_{1.15}B_{9.2}$ |
| EXAMPLE 6-10 | $Fe_{70}Al_7(P_{0.76}Si_{0.24})_{14.95}C_{1.15}B_{6.9}$ |
| EXAMPLE 6-11 | $Fe_{70}Al_7(P_{0.76}Si_{0.24})_{12.65}C_{4.6}B_{5.75}$ |
| EXAMPLE 6-12 | $Fe_{70}Al_7(P_{0.76}Si_{0.24})_{11.5}C_{4.6}B_{6.9}$ |
| EXAMPLE 6-13 | $Fe_{70}Al_7(P_{0.76}Si_{0.24})_{11.5}C_{3.45}B_{8.05}$ |
| EXAMPLE 6-14 | $Fe_{70}Al_7(P_{0.76}Si_{0.24})_{12.65}C_{2.3}B_{8.05}$ |

TABLE 4

| | $T_g$ (K) | $T_x$ (K) | $\Delta T_x$ (K) |
|---|---|---|---|
| EXAMPLE 6-4 | 758 | 821 | 63 |
| EXAMPLE 6-14 | 760 | 821 | 61 |
| COMPARATIVE EXAMPLE 6 | 740 | 800 | 60 |

FIG. 37 demonstrates that the amorphous soft-magnetic alloy tapes of EXAMPLES 6-1 to 6-14 exhibit broad X-ray diffraction patterns which are assigned to amorphous textures.

FIG. 38 and Table 4 demonstrate that the amorphous soft-magnetic alloy of EXAMPLE 6-4 has a glass transition temperature $T_g$ at 758 K and a crystallization temperature $T_x$ at 821 K, thus the temperature difference $\Delta T_x$, represented by $\Delta T_x = T_x - T_g$, in the supercooled liquid being 63 K. The amorphous soft-magnetic alloy of EXAMPLE 6-14 has a glass transition temperature $T_g$ of 760 K and a crystallization temperature $T_x$ of 821° C., thus the temperature difference $\Delta T_x$, represented by $\Delta T_x = T_x - T_g$, in the supercooled liquid being 60 K.

The amorphous soft-magnetic alloy of COMPARATIVE EXAMPLE 6 has a glass transition temperature $T_g$ at 740 K and a crystallization temperature $T_x$ at 800 K, thus the temperature difference $\Delta T_x$, represented by $\Delta T_x = T_x - T_g$, in the supercooled liquid being 60 K.

The amorphous soft-magnetic alloys of EXAMPLES 6-4 and 6-14 have each a wide supercooled liquid region below the crystallization temperature $T_x$ regardless of the Ga-free composition and a large $\Delta T_x (= T_x - T_g)$ as a glassy alloy. Thus, the alloy consisting of Fe, Al, P, C, B, and Si has a large temperature difference $\Delta T_x$ of at least 20 K in a supercooled liquid.

The amorphous soft-magnetic alloy tapes of EXAMPLES 6-1 to 6-14 were subjected to DSC at a heating rate of 0.67 K/sec to measure the glass transition temperature $T_g$, the crystallization temperature $T_x$, the Curie temperature $T_c$, and the melting point $T_m$ and to determine the temperature difference $\Delta T_x$ in a supercooled liquid and the ratio $T_g/T_m$.

Figure 39:
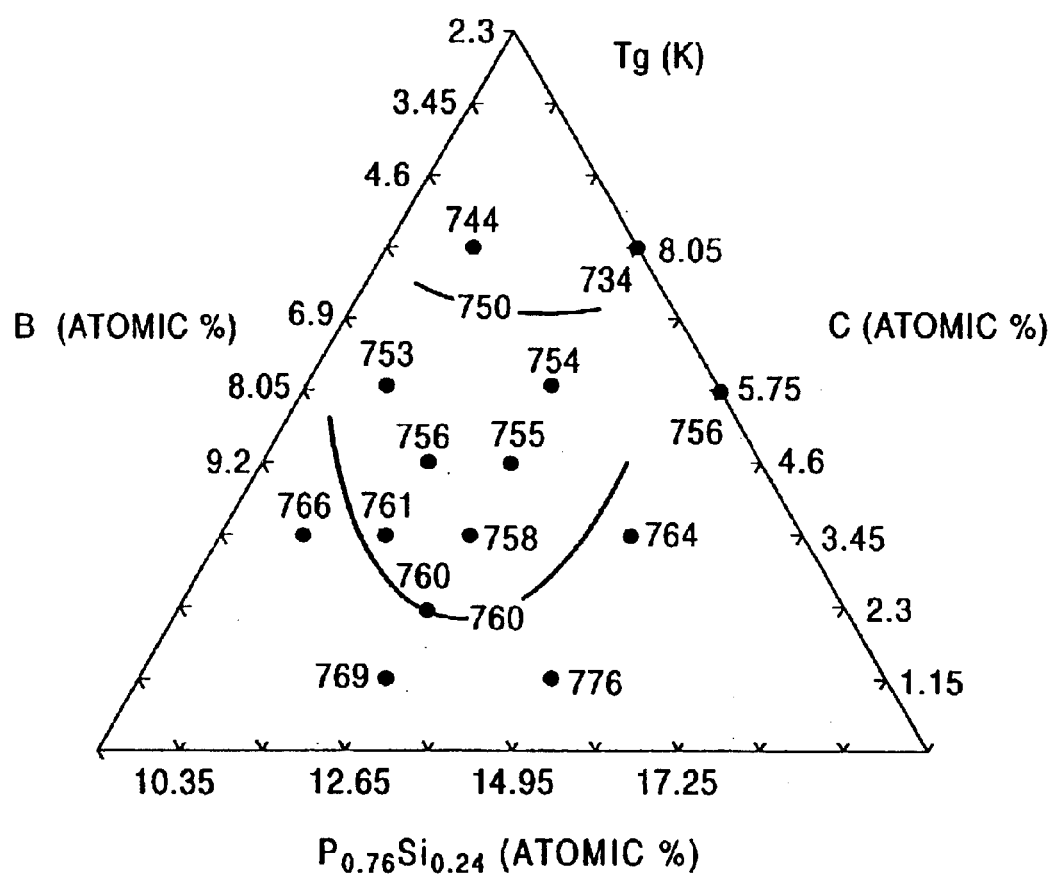
FIG. 39 is a ternary diagram illustrating the dependence of the glass transition temperature $T_g$ on the P, C, and B contents in amorphous soft-magnetic alloy tapes represented by $Fe_{70}Al_7(P_{0.76}Si_{0.24})_vC_zB_w$.
Figure 40:
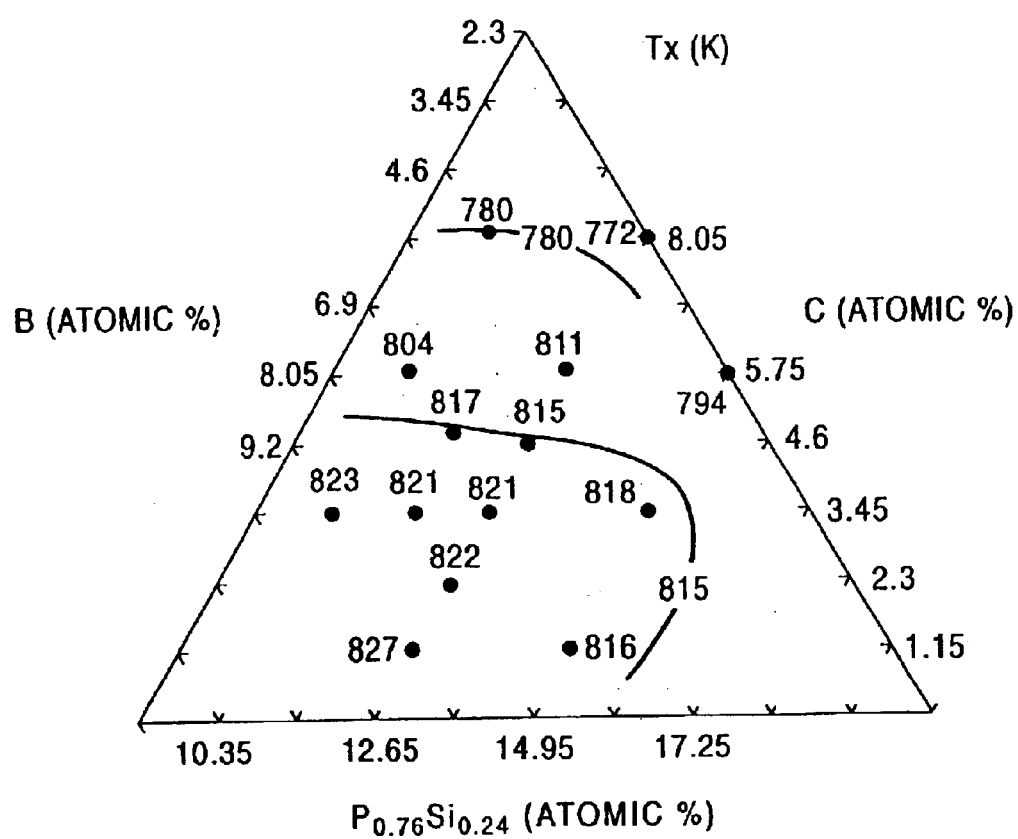
FIG. 40 is a ternary diagram illustrating the dependence of the crystallization temperature $T_x$ on the P, C, and B contents in amorphous soft-magnetic alloy tapes represented by $Fe_{70}Al_7(P_{0.76}Si_{0.24})_vC_zB_w$.
Figure 41:
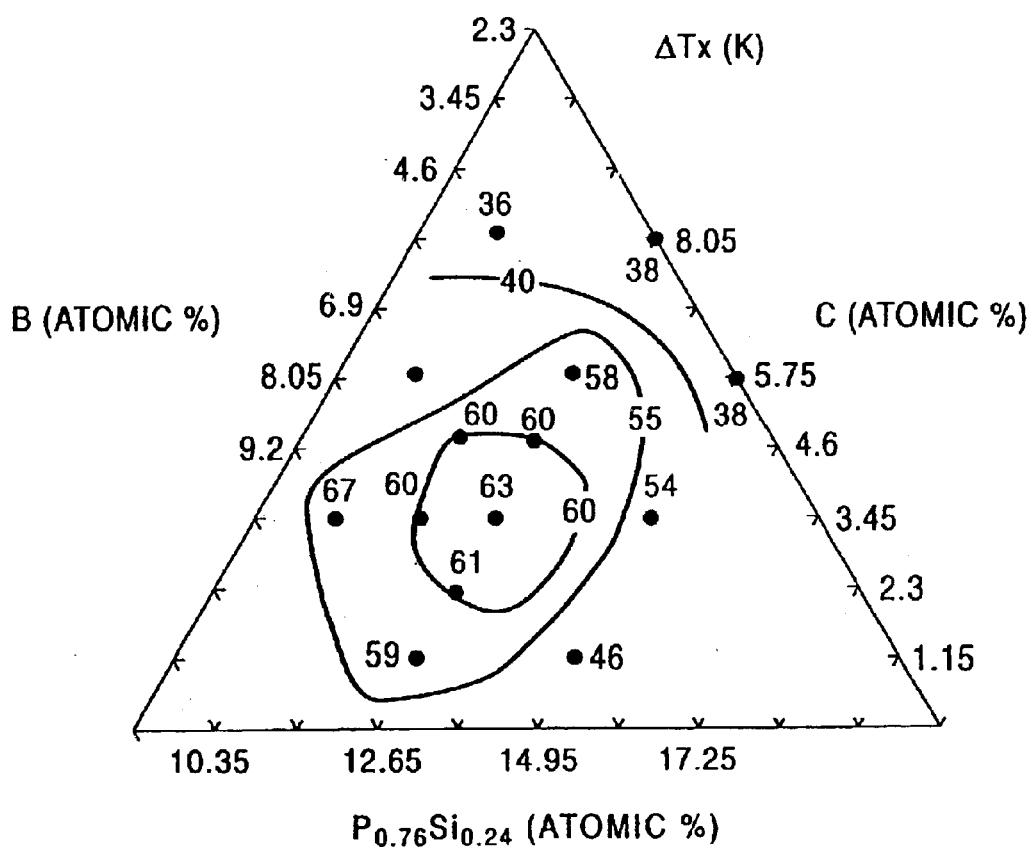
FIG. 41 is a ternary diagram illustrating the dependence of the temperature difference $\Delta T_x$ on the P, C, and B contents in supercooled liquids of amorphous soft-magnetic alloy tapes represented by $Fe_{70}Al_7(P_{0.76}Si_{0.24})_vC_zB_w$.
Figure 42:
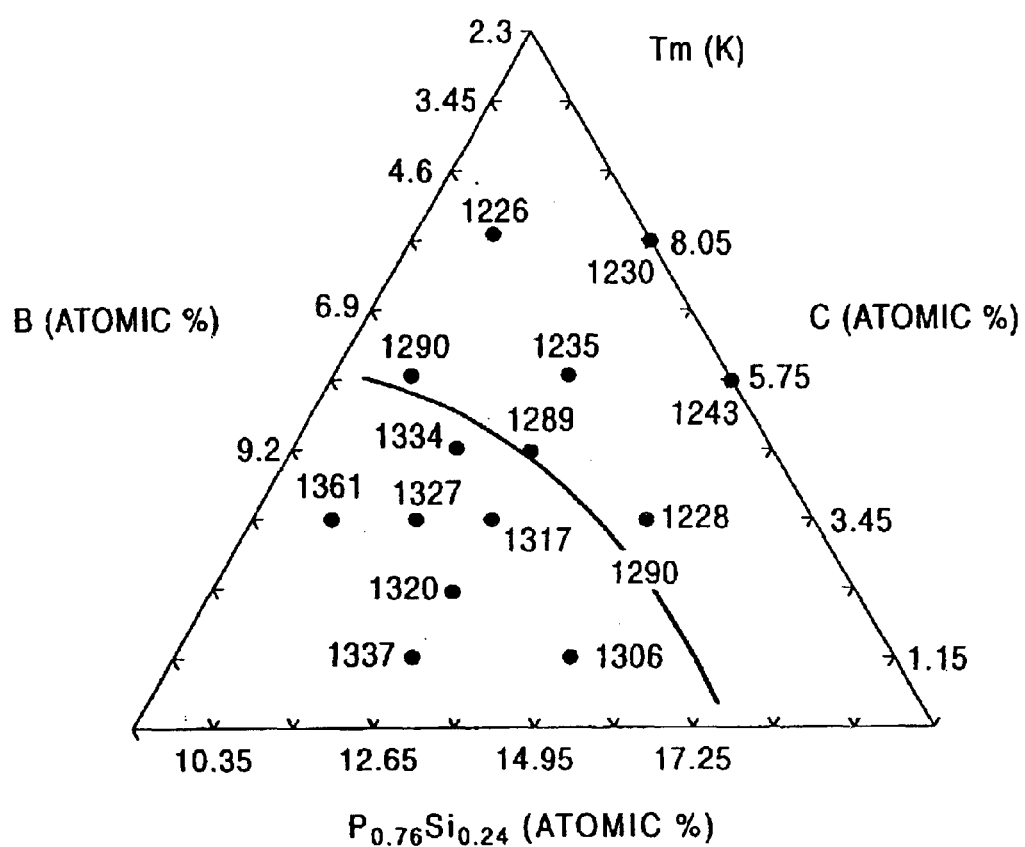
FIG. 42 is a ternary diagram illustrating the dependence of the melting point $T_m$ on the P, C, and B contents in amorphous soft-magnetic alloy tapes represented by $Fe_{70}Al_7(P_{0.76}Si_{0.24})_vC_zB_w$.
Figure 43:
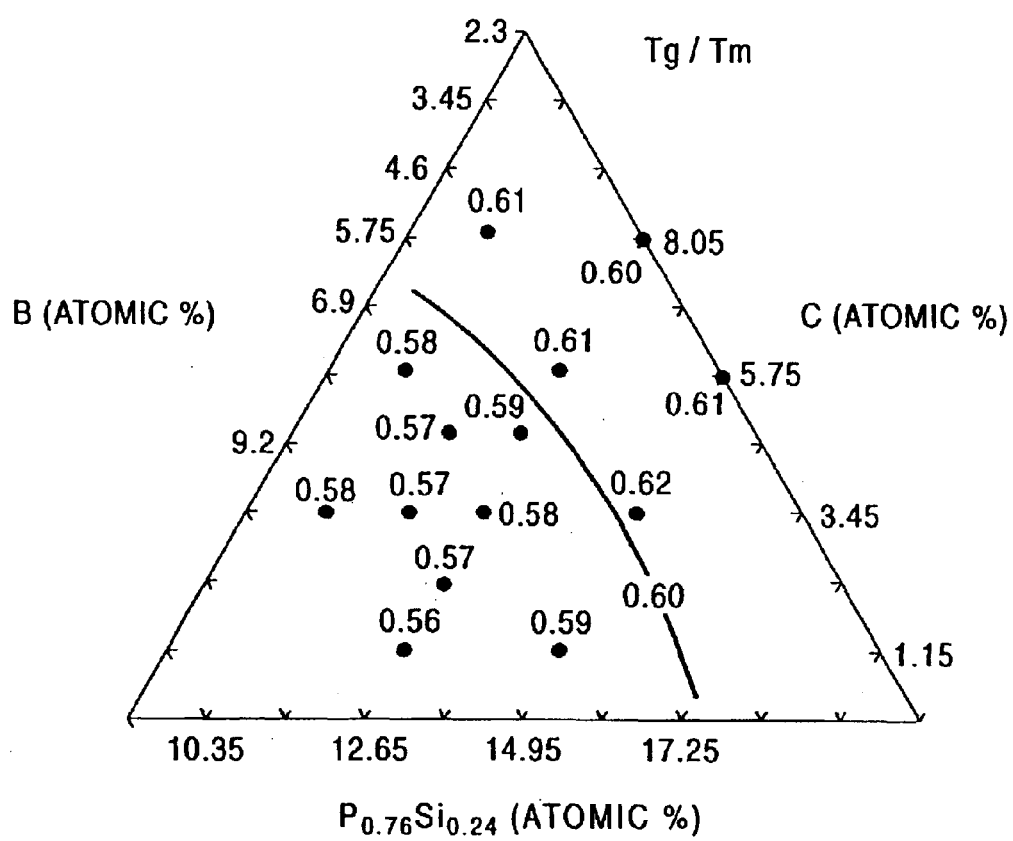
FIG. 43 is a ternary diagram illustrating the dependence of the ratio $T_g/T_m$ on the P, C, and B contents in amorphous soft-magnetic alloy tapes represented by $Fe_{70}Al_7(P_{0.76}Si_{0.24})_vC_zB_w$.
Figure 44:
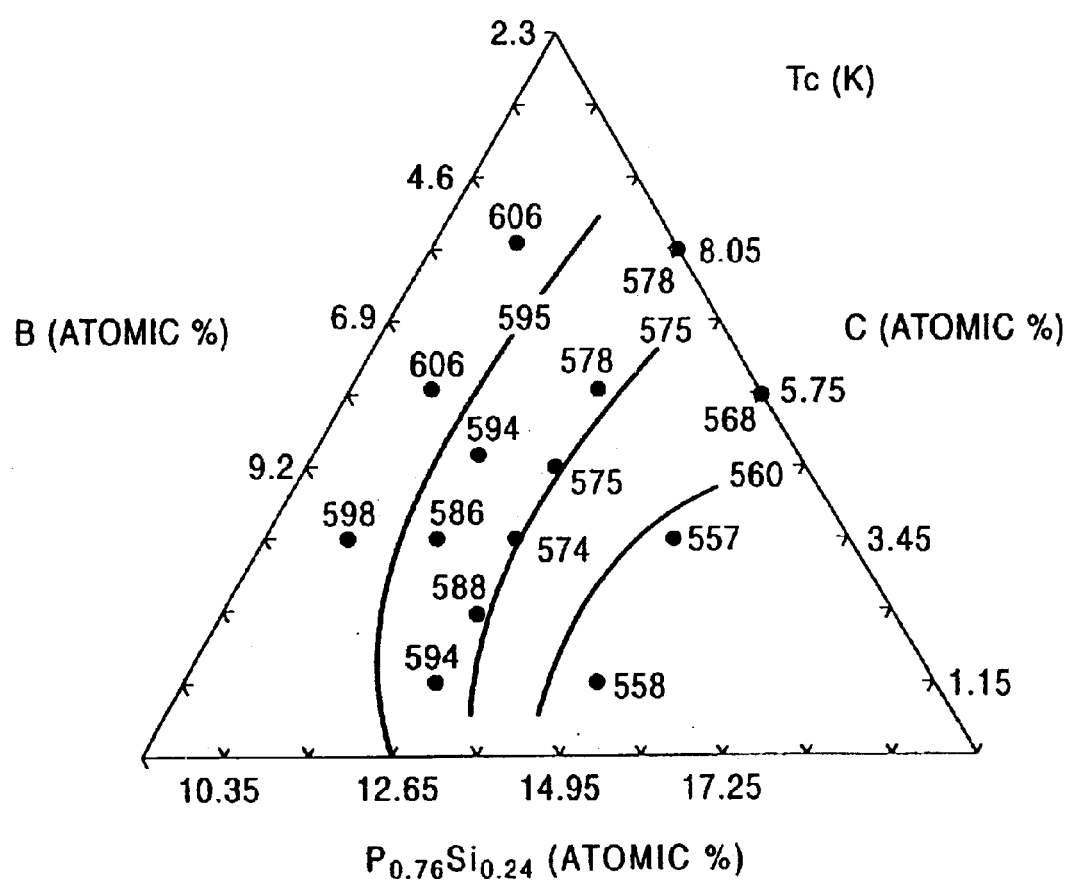
FIG. 44 is a ternary diagram illustrating the dependence of the Curie temperature $T_c$ on the P, C, and B contents in amorphous soft-magnetic alloy tapes represented by $Fe_{70}Al_7(P_{0.76}Si_{0.24})_vC_zB_w$.

FIG. 39 shows the dependence of the glass transition temperature $T_g$ on the composition, FIG. 40 shows the dependence of the crystallization temperature $T_x$ on the composition, FIG. 41 shows the dependence of the temperature difference $\Delta T_x$ in a supercooled liquid on the composition, FIG. 42 shows the dependence of the melting point $T_m$ on the composition, FIG. 43 shows the dependence of the ratio $T_g/T_m$ on the composition, and FIG. 44 shows the dependence of the Curie temperature $T_c$ on the composition.

The saturation magnetization ($\sigma$s) by a VSM (vibrating sample magnetometer) and the permeability ($\mu$e) and coercive force (Hc) by a BH loop tracer were measured for the amorphous soft-magnetic alloy tapes of EXAMPLES 6-1 to 6-14.

Figure 45:
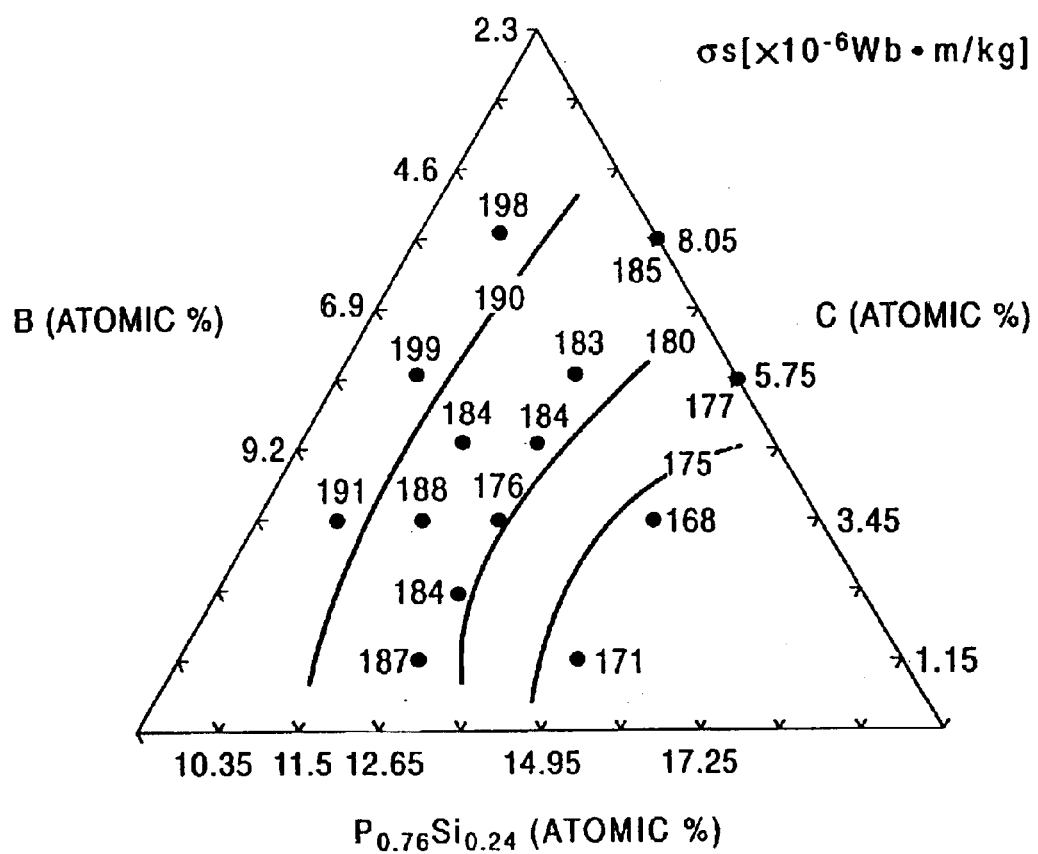
FIG. 45 is a ternary diagram illustrating the dependence of the saturation magnetization $\delta s$ on the P, C, and B contents in amorphous soft-magnetic alloy tapes represented by $Fe_{70}Al_7(P_{0.76}Si_{0.24})_vC_zB_w$.
Figure 46:
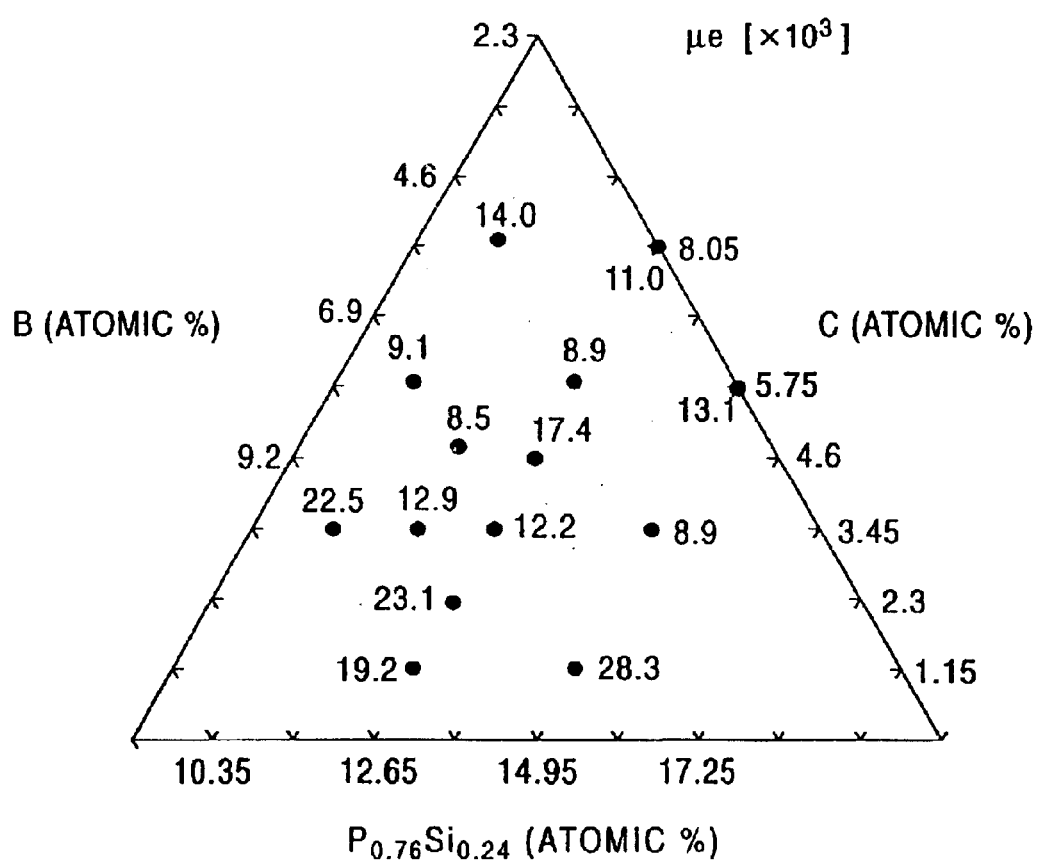
FIG. 46 is a ternary diagram illustrating the dependence of the permeability $\mu e$ on the P, C, and B contents in amorphous soft-magnetic alloy tapes represented by $Fe_{70}Al_7(P_{0.76}Si_{0.24})_vC_zB_w$.
Figure 47:
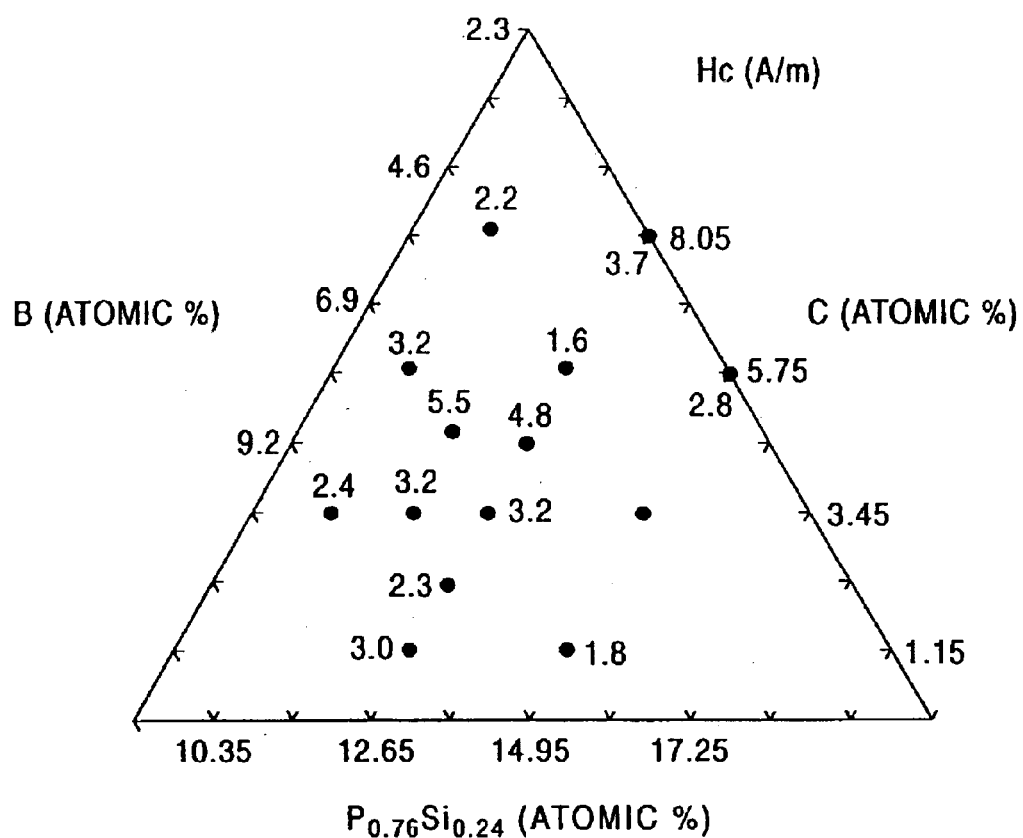
FIG. 47 is a ternary diagram illustrating the dependence of the coercive force Hc on the P, C, and B contents in amorphous soft-magnetic alloy tapes represented by $Fe_{70}Al_7(P_{0.76}Si_{0.24})_vC_zB_w$.

FIG. 45 shows the dependence of the saturation magnetization ($\sigma$s) on the composition, FIG. 46 shows the dependence of the permeability ($\mu$e) on the composition, and FIG. 47 shows the dependence of the coercive force (Hc) on the composition.

Figures attached to the plots in the ternary diagrams in FIGS. 39 to 47 represent the glass transition temperature $T_g$, the crystallization temperature $T_x$, the temperature difference $\Delta T_x$ in the supercooled liquid, melting point $T_m$, the ratio $T_g/T_m$, the Curie point $T_c$, the saturation magnetization ($\sigma$s), the permeability ($\mu$e), and the coercive force (Hc), respectively.

In FIGS. 39 to 47, a figure shown in the vicinity of each isothermal line or isoline represents the temperature or the value thereof.

FIG. 39 illustrates that the glass transition temperature $T_g$ increases with an increased B content and a decreased C content. The isothermal line at $T_g=760$ K lies in a region defined by the B content w in the range of 4.1 atomic percent to 8.05 atomic percent and by the C content z in the range of 2.3 atomic percent to 5.1 atomic percent.

FIG. 40 illustrates the crystallization temperature $T_x$ increases with an increased B content and a decreased C content, as in the $T_g$. The isothermal line at $T_x=815$ K lies in a region defined by the B content w in the range of 4 atomic percent to 8.4 atomic percent and by the C content z in the range of 0.3 atomic percent to 5 atomic percent.

As shown in FIG. 41, the region surrounded by the isothermal line at $T_g=760$ K shown in FIG. 39 and the isothermal line at $T_x=815$ K corresponds to the isothermal line at $\Delta T_x=60$ K. The temperature difference $\Delta T_x$ in the supercooled liquid exceeds 60 K within this range. In particular, the amorphous soft-magnetic alloy $Fe_{70}Al_7(P_{0.76}Si_{0.24})_{12.65}C_{3.45}B_{6.9}$ of EXAMPLE 6-4 exhibits a temperature difference $\Delta T_x$ of 63 K.

FIG. 42 illustrates that the melting point $T_m$ exhibits the maximum of 1,361 K at a higher-B-content side and the minimum of 1,226 K at a lower-B-content side of the isothermal line at 1,290 K. Since the difference between the maximum and the minimum is 135 K, the melting point $T_m$ of this amorphous soft-magnetic alloy is sensitive to the B content w.

With reference to FIG. 43, the high sensitivity of the melting point $T_m$ to the composition affects the dependence of the ratio $T_g/T_m$ on the composition. The ratio $T_g/T_m$ slightly increases a lower-B-content side of the isoline at $T_g/T_m=0.6$, which lies along a B content of 5.75 atomic percent. A large ratio $T_g/T_m$ means a decreased temperature difference $\Delta T_x$ between the melting point $T_m$ and the glass transition temperature $T_g$. Thus, an alloy having a composition within this range has enhanced amorphous formability even the cooling rate is decreased; that is, the critical cooling rate is low. Accordingly, the larger $T_g/T_m$, the higher amorphous formability.

Comparing FIG. 43 with FIG. 41, the region of $T_g/T_m$ of 0.60 or less in FIG. 43 overlaps with the region of $\Delta T_x$ of 60 K or more in FIG. 41. Thus, a high $T_g/T_m$ region does not always overlap with a high $\Delta T_x$ region. The $T_g/T_m$, however, is as relatively high as 0.57 to 0.58 even in a region of $\Delta T_x$ of 60 K or more. Thus, this amorphous soft-magnetic alloy within this range exhibits relatively high amorphous formability.

FIG. 44 illustrates that the Curie temperature $T_c$ increases with a decreased total content of P and Si. FIG. 45 illustrates that the saturation magnetization ($\sigma$s) also increases with a decreased total content of P and Si. At a total content of 12.65 atomic percent or less, the saturation magnetization ($\sigma$s) is $180 \times 10^{-6}$ (Wb.m.kg$^{-1}$) or more. At a total content of 11.5 atomic percent or less, the saturation magnetization ($\sigma$s) is $190 \times 10^{-6}$ (Wb.m.kg$^{-1}$) or more. Thus, the amorphous soft-magnetic alloy of the present invention exhibits a high saturation magnetization ($\sigma$s).

As described above, the Curie temperature $T_c$ is highly correlated with the saturation magnetization ($\sigma$s). Accordingly, an optimized composition increases both the Curie temperature $T_c$ and the saturation magnetization ($\sigma$s) and the resulting amorphous soft-magnetic alloy exhibits high thermal stability of magnetic characteristics due to the increased Curie temperature $T_c$.

FIG. 46 shows a maximum permeability ($\mu$e) of 28,300, but does not show nor suggest a clear relationship between the composition and the permeability ($\mu$e). Thus, it is considered that the dependence of the permeability ($\mu$e) on the P, C, B, and Si contents is not significant.

FIG. 47 illustrates that the coercive force (Hc) does not show a clear dependence on the P, C, B, and Si contents, unlike the saturation magnetization ($\sigma$s) and the above thermal properties.

Accordingly, the thermal properties $T_g$, $T_x$, $\Delta T_x$, $T_m$, $T_g/T_m$, $T_c$ and the saturation magnetization ($\sigma$s) show high dependence on the P, C, B, and Si contents.

Example 7

Dependence of Physical and Magnetic Properties on Fe and Al Contents

Figure 48:
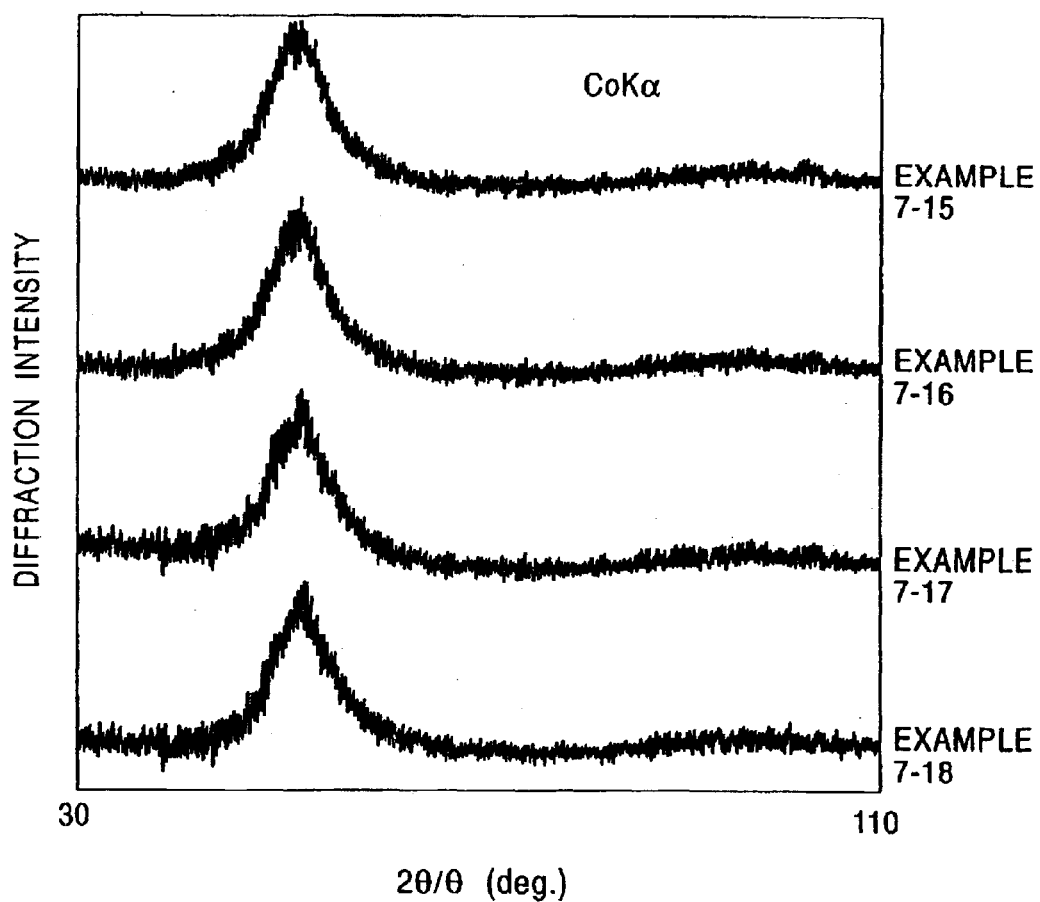
FIG. 48 is a graph illustrating X-ray diffraction patterns of amorphous soft-magnetic alloy tapes in accordance with EXAMPLES 7-15 to 7-18.

Melts prepared by melting ingots having different composition were sprayed onto a rotating roller in a reduced-pressure atmosphere as in EXAMPLE 6 to prepare amorphous soft-magnetic alloy tapes with a width of 1 mm and a thickness of 20 $\mu$m of EXAMPLES 7-15 to 7-18. These amorphous soft-magnetic alloys had compositions represented by $Fe_{100-x-y}Al_x(P_{0.42}C_{0.1}B_{0.35}Si_{0.13})_y$ wherein x was 1 to 5 atomic percent and y was 18 to 22 atomic percent. Table 5 shows the compositions of the resulting amorphous soft-magnetic alloy tapes. FIG. 48 illustrates X-ray diffraction patterns of the resulting amorphous soft-magnetic alloy.

TABLE 5

| | Alloy Composition |
|---|---|
| EXAMPLE 7-15 | $Fe_{77}Al_5(P_{0.42}C_{0.1}B_{0.35}Si_{0.13})_{18}$ |
| EXAMPLE 7-16 | $Fe_{77}Al_3(P_{0.42}C_{0.1}B_{0.35}Si_{0.13})_{20}$ |
| EXAMPLE 7-17 | $Fe_{77}Al_1(P_{0.42}C_{0.1}B_{0.35}Si_{0.13})_{22}$ |
| EXAMPLE 7-18 | $Fe_{79}Al_1(P_{0.42}C_{0.1}B_{0.35}Si_{0.13})_{20}$ |

FIG. 48 demonstrates that the amorphous soft-magnetic alloy tapes of EXAMPLES 7-15 to 7-18 exhibit broad X-ray diffraction patterns which are assigned to amorphous textures.

The amorphous soft-magnetic alloy tapes of EXAMPLES 7-15 to 7-18 were subjected to DSC at a heating rate of 0.67 K/sec to determine the glass transition temperature $T_g$, the crystallization temperature $T_x$, the Curie temperature $T_c$, and the melting point $T_m$, the temperature difference $\Delta T_x$ in a supercooled liquid, and the ratio $T_g/T_m$.

Figure 49:
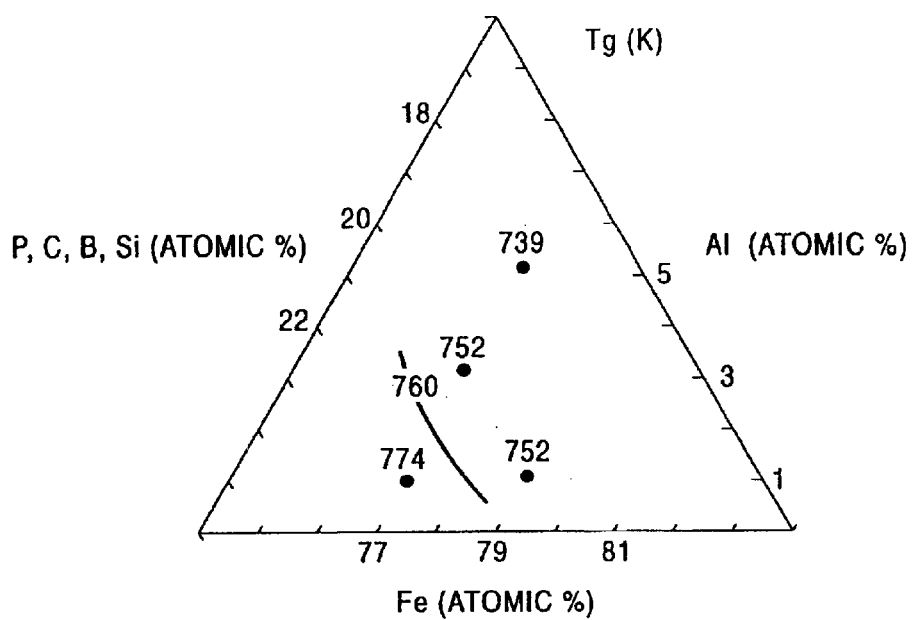
FIG. 49 is a ternary diagram illustrating the dependence of the glass transition temperature $T_g$ on the Fe and Al contents in amorphous soft-magnetic alloy tapes represented by $Fe_{100-x-y}Al_x(P_{0.42}C_{0.1}B_{0.35}Si_{0.13})_y$.
Figure 50:
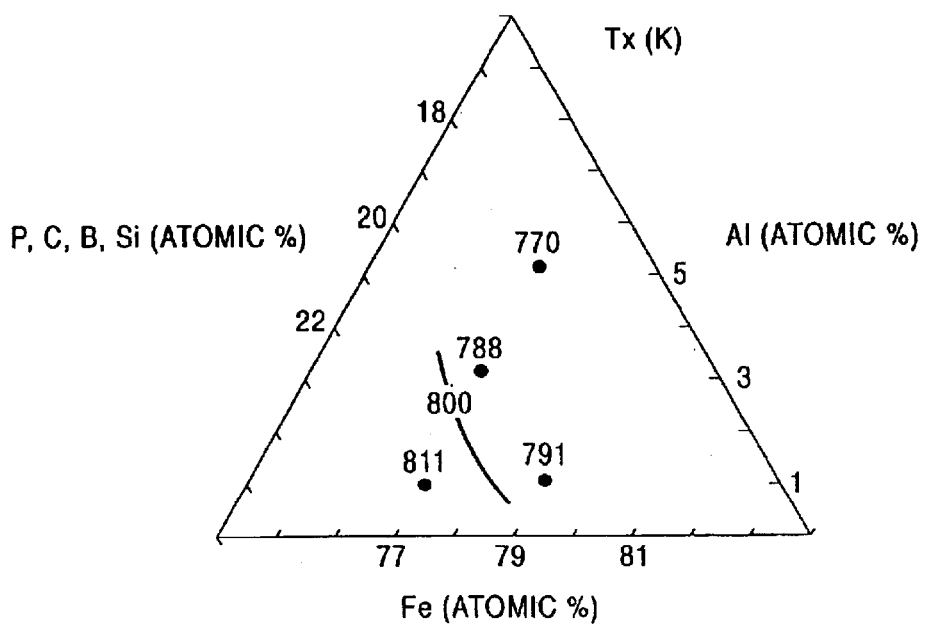
FIG. 50 is a ternary diagram illustrating the dependence of the crystallization temperature $T_x$ on the Fe and Al contents in amorphous soft-magnetic alloy tapes represented by $Fe_{100-x-y}Al_x(P_{0.42}C_{0.1}B_{0.35}Si_{0.13})_y$.
Figure 51:
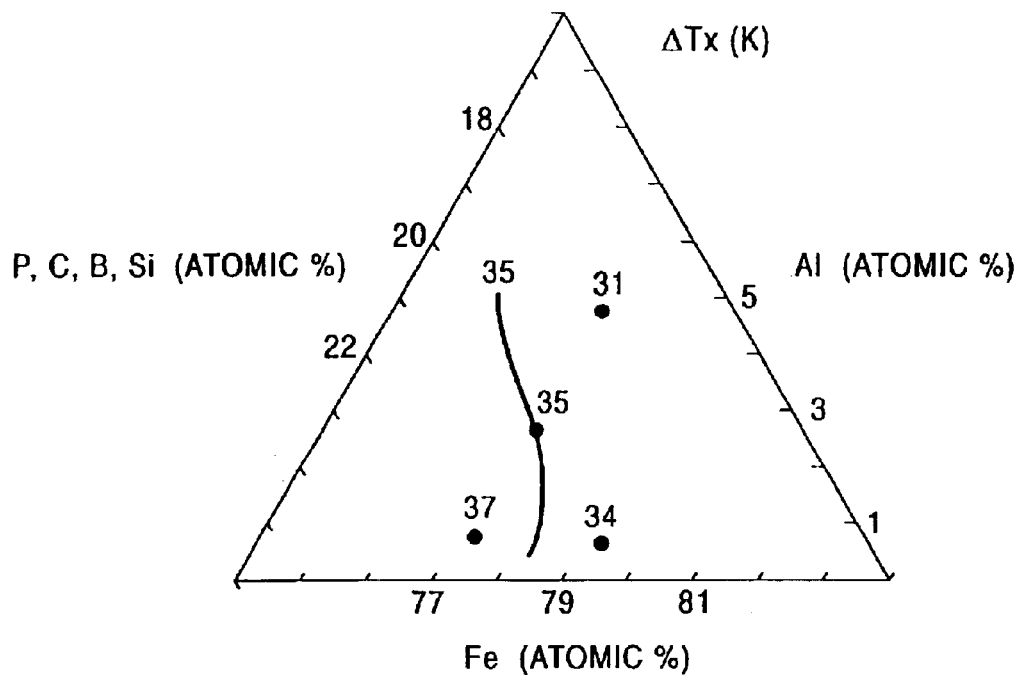
FIG. 51 is a ternary diagram illustrating the dependence of the temperature difference $\Delta T_x$ on the Fe and Al contents in supercooled liquids of amorphous soft-magnetic alloy tapes represented by $Fe_{100-x-y}Al_x(P_{0.42}C_{0.1}B_{0.35}Si_{0.13})_y$.
Figure 52:
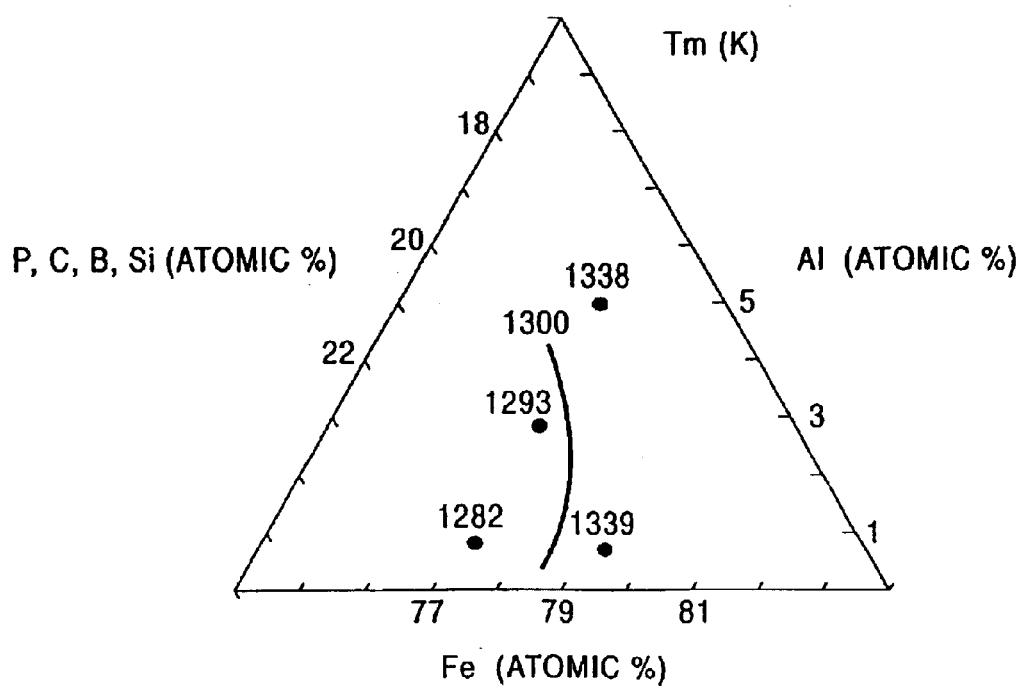
FIG. 52 is a ternary diagram illustrating the dependence of the melting point $T_m$ on the Fe and Al contents in amorphous soft-magnetic alloy tapes represented by $Fe_{100-x-y}Al_x(P_{0.42}C_{0.1}B_{0.35}Si_{0.13})_y$.
Figure 53:
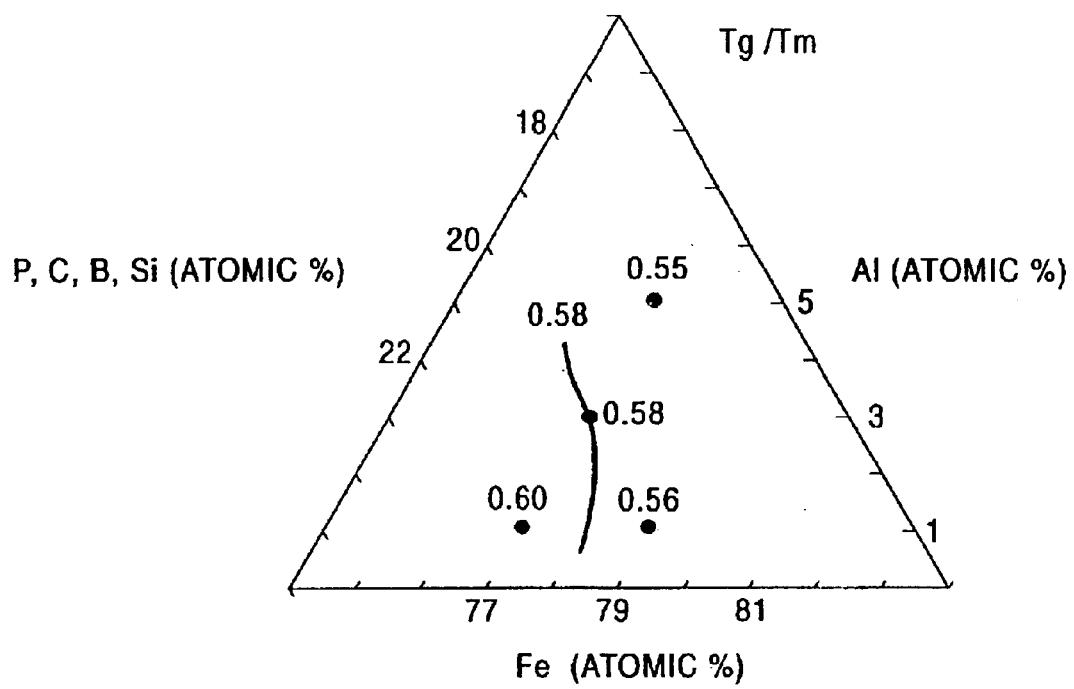
FIG. 53 is a ternary diagram illustrating the dependence of the ratio $T_g/T_m$ on the Fe and Al contents in amorphous soft-magnetic alloy tapes represented by $Fe_{100-x-y}A_x(P_{0.42}C_{0.1}B_{0.35}Si_{0.13})_y$.
Figure 54:
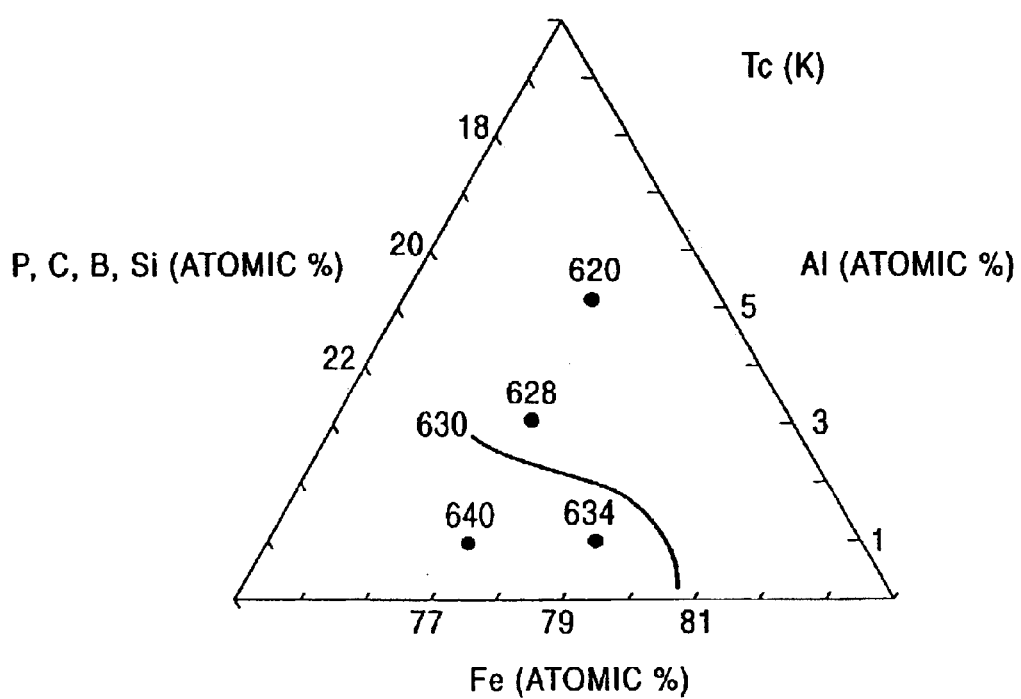
FIG. 54 is a ternary diagram illustrating the dependence of the Curie temperature $T_c$ on the Fe and Al contents in amorphous soft-magnetic alloy tapes represented by $Fe_{100-x-y}Al_x(P_{0.42}C_{0.1}B_{0.35}Si_{0.13})_y$.

FIG. 49 shows the dependence of the glass transition temperature $T_g$ on the composition, FIG. 50 shows the dependence of the crystallization temperature $T_x$ on the composition, FIG. 51 shows the dependence of the temperature difference $\Delta T_x$ in a supercooled liquid on the composition, FIG. 52 shows the dependence of the melting point $T_m$ on the composition, FIG. 53 shows the dependence of the ratio $T_g/T_m$ on the composition, and FIG. 54 shows the dependence of the Curie temperature $T_c$ on the composition.

The saturation magnetization (σs) by VSM and the permeability (μe) and the coercive force (Hc) by a BH loop tracer were measured for the amorphous soft-magnetic alloy tapes of EXAMPLES 7-15 to 7-18.

Figure 55:
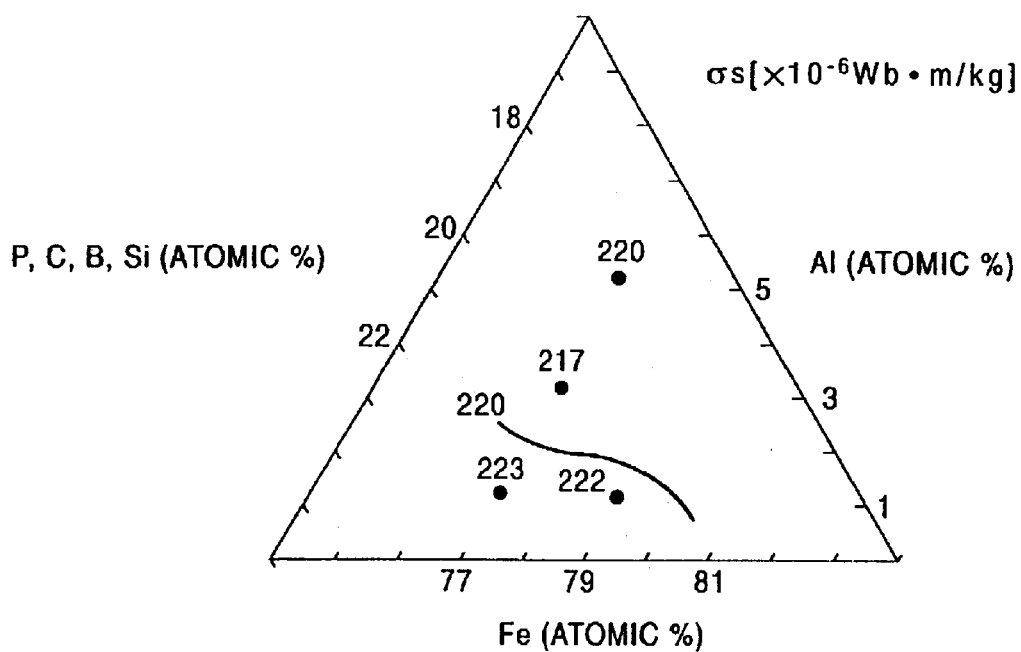
FIG. 55 is a ternary diagram illustrating the dependence of the saturation magnetization $\delta s$ on the Fe and Al contents in amorphous soft-magnetic alloy tapes represented by $Fe_{100-x-y}Al_x(P_{0.42}C_{0.1}B_{0.35}Si_{0.13})_y$.
Figure 56:
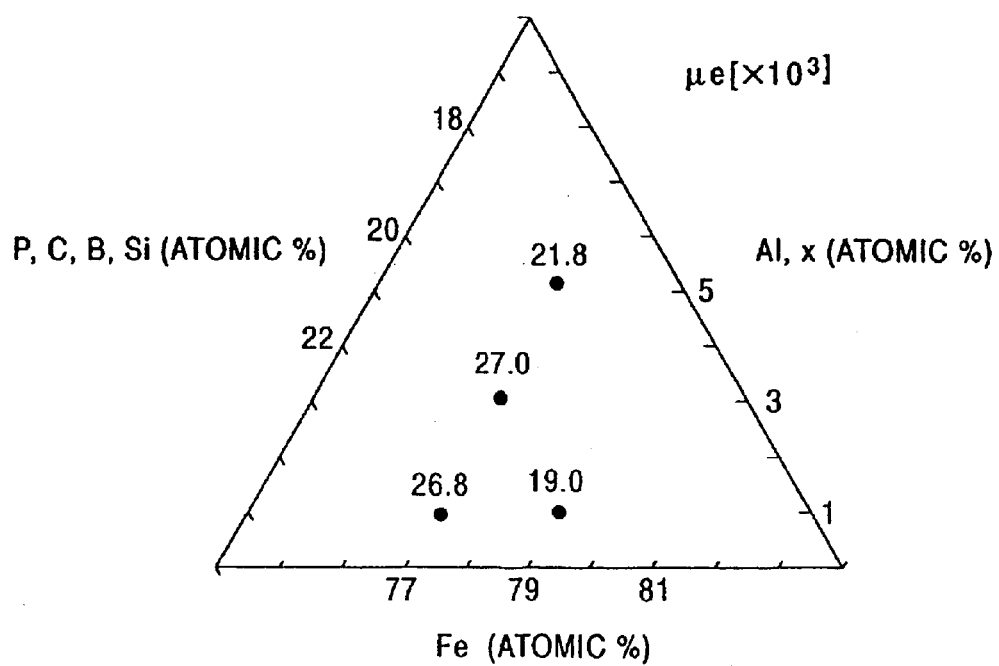
FIG. 56 is a ternary diagram illustrating the dependence of the permeability $\mu e$ on the Fe and Al contents in amorphous soft-magnetic alloy tapes represented by $Fe_{100-x-y}Al_x(P_{0.42}C_{0.1}B_{0.35}Si_{0.13})_y$.
Figure 57:
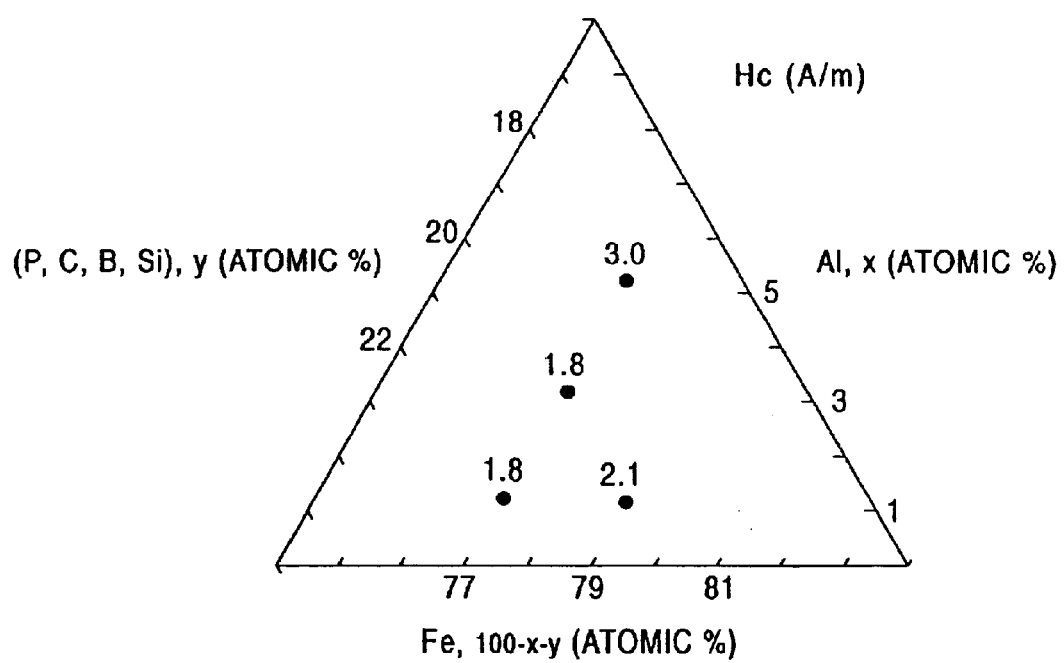
FIG. 57 is a ternary diagram illustrating the dependence of the coercive force Hc on the Fe and Al contents in amorphous soft-magnetic alloy tapes represented by $Fe_{100-x-y}Al_x(P_{0.42}C_{0.1}B_{0.35}Si_{0.13})_y$.

FIG. 55 shows the dependence of the saturation magnetization (σs) on the composition, FIG. 56 shows the dependence of the permeability (μe) on the composition, and FIG. 57 shows the dependence of the coercive force (Hc) on the composition.

Figures attached to the plots in the ternary diagrams in FIGS. 49 to 57 represent the glass transition temperature $T_g$, the crystallization temperature $T_x$, the temperature difference $\Delta T_x$ in the supercooled liquid, melting point $T_m$, the ratio $T_g/T_m$, the Curie point $T_c$, the saturation magnetization (σs), the permeability (μe), and the coercive force (Hc).

In FIGS. 49 to 57, a figure shown in the vicinity of each isothermal line or isoline represents the temperature or the value thereof.

FIG. 49 illustrates that the glass transition temperature $T_g$ increases with an increased total (PCBSi) content and a decreased Fe or Al content. The isothermal line at $T_g$=760 K lies along a line of the total (PCBSi) content y of approximately 21 atomic percent.

FIG. 50 illustrates the crystallization temperature $T_x$ increases with an increased total (PCBSi) content and a decreased Fe or Al content, as in the $T_g$. The isothermal line at $T_x$=800 K lies along a line of the (PCBSi) content y of approximately 21 atomic percent.

As shown in FIG. 51, the temperature difference $\Delta T_x$ increases with an increased total (PCBSi) content and a decreased Fe or Al content. The isothermal line at $\Delta T_x$=35 K lies in the vicinity of a total (PCBSi) content y of 20 to 22 atomic percent and in the vicinity of an Fe content of 75 to 78 atomic percent. Thus, the temperature difference $\Delta T_x$ in a supercooled liquid exceeds 35 K within the range of the total content y of 20 atomic percent or more and the Fe content of 78 atomic percent or less. In particular, the amorphous soft-magnetic alloy $Fe_{77}Al_1(P_{0.42}C_{0.1}B_{0.35}Si_{0.13})_{22}$ of EXAMPLE 7-17 exhibits a temperature difference $\Delta T_x$ of 37 K The temperature difference $\Delta T_x$ shown in FIG. 41 is larger than that shown in FIG. 51. This difference is probably due to a difference in the composition between EXAMPLE 6 and EXAMPLE 7. The amorphous soft-magnetic alloy shown in FIG. 41 has an Al content of 7 atomic percent, which is higher than the Al content (1 to 5 percent) in the amorphous soft-magnetic alloy shown in FIG. 51. Moreover, the amorphous soft-magnetic alloy shown in FIG. 41 has an Fe content of 70 atomic percent, which is lower than the Fe content (77 to 79 atomic percent) in the amorphous soft-magnetic alloy shown in FIG. 51. Such differences in the composition are considered to affect the temperature difference $\Delta T_x$. Thus, the temperature difference $\Delta T_x$ tends to increase with an increase in Al content and with a decrease in Fe content.

FIG. 52 illustrates that the melting point $T_m$ exhibits the maximum of 1,339 K at a higher-Fe-content side and the minimum of 1,282 K at a lower-Fe-content side of the isothermal line at 1,300 K. Thus, the difference between the maximum and the minimum is 57 K, which is smaller than the difference 135 K in FIG. 42. Accordingly, the melting point $T_m$ of this amorphous soft-magnetic alloy is less sensitive to the Fe content, compared to the B content.

With reference to FIG. 53, the sensitivity of the melting point $T_m$ to the composition affects the dependence of the ratio $T_g/T_m$ on the composition. The ratio $T_g/T_m$ slightly increases a lower-Fe-content side of the isoline at $T_g/T_m$=0.58, which lies within the range of Fe content of 76 to 78 atomic percent. A large ratio $T_g/T_m$ means a decreased temperature difference $\Delta T_x$ between the melting point $T_m$ and the glass transition temperature $T_g$. Thus, an alloy having a composition within this range has enhanced amorphous formability even the cooling rate is decreased; that is, the critical cooling rate is low. Accordingly, the larger $T_g/T_m$, the higher amorphous formability.

Comparing FIG. 53 with FIG. 51, the region of $T_g/T_m$ of 0.58 in FIG. 53 overlaps with the region of $\Delta T_x$ of 35 K in FIG. 51. Thus, a high $T_g/T_m$ region overlaps with a high $\Delta T_x$ region. Thus, this amorphous soft-magnetic alloy has a temperature difference $\Delta T_x$ of at least 35 K and exhibits enhanced amorphous formability by decreasing the Fe content.

FIG. 54 illustrates that the Curie temperature $T_c$ increases with an increased total (PCBSi) content and a decreased Al content. FIG. 55 illustrates that the saturation magnetization (σs) also increases with an increased total (PCBSi) content and a decreased Al content.

The Curie temperature $T_c$ is highly correlated with the saturation magnetization (σs). That is, the Curie temperature $T_c$ and the saturation magnetization (σs) increase by increasing the total (PCBSi) content and decreasing the Al content. Furthermore, the increased Curie temperature $T_c$ contributes to improved thermal stability of magnetic characteristics of the amorphous soft-magnetic alloy.

FIG. 56 illustrates that the permeability (μe) tends to increase as the Fe or Al content decreases. Also, FIG. 56 illustrates a maximum permeability (μe) of 27,000 at an Fe content of 77 atomic percent and an Al content of 3 atomic percent.

The permeabilities (μe) of EXAMPLES 7-16 AND 7-18 having the same total (PCBSi) content of 20 atomic percent are 27,000 and 19,000, respectively, which are significantly different from each other. Thus, it is considered that the dependence of the permeability (μe) on the total (PCBSi) content is not significant, as in FIG. 46.

FIG. 57 illustrates that the coercive force (Hc) tends to increase as the Fe content increases and the total (PCBSi) content decreases. The difference in the coercive force is, however, small and does not show a clear dependence on the composition, unlike the above thermal properties.

Accordingly, the thermal properties $T_g$, $T_x$, $\Delta T_x$, $T_m$, $T_g/T_m$, $T_c$ show high dependence on the Fe and Al contents, whereas the magnetic characteristics including the saturation magnetization (σs) does not show clear dependence.

Example 8

Manufacturing of Injection-Molding Article

Predetermined amounts of Fe, Al, an Fe—C alloy, an Fe—P alloy, B, and Si were melt. The melt was injected into a mold shown in FIG. 1 to prepare a toroidal injection-molding article (EXAMPLE 8-19) of an amorphous soft-magnetic alloy as shown in FIG. 3. The resulting injection-molding article had an outer diameter of 6 mm, an inner diameter of 4 mm, and a thickness of 1 mm and had a composition of $Fe_{70}Al_7P_{9.65}C_{3.45}B_{6.9}Si_3$ which was the same as that in EXAMPLE 6-4.

An injection-molding article of COMPARATIVE EXAMPLE 8-1 having an outer diameter of 6 mm, an inner diameter of 4 mm, and a thickness of 1 mm and having a composition of $Fe_{70}Al_5Ga_2P_{9.65}C_{5.75}B_{4.6}Si_3$ was produced as in Example 8-19. This amorphous soft-magnetic alloy had the same composition as that of the amorphous soft-magnetic alloy of COMPARATIVE

EXAMPLE 6.

The resulting injection-molding articles were subjected to X-ray diffractometry and DSC at a heating rate of 0.67 K/sec. The results are shown in FIGS. 25 and 26.

Figure 58:
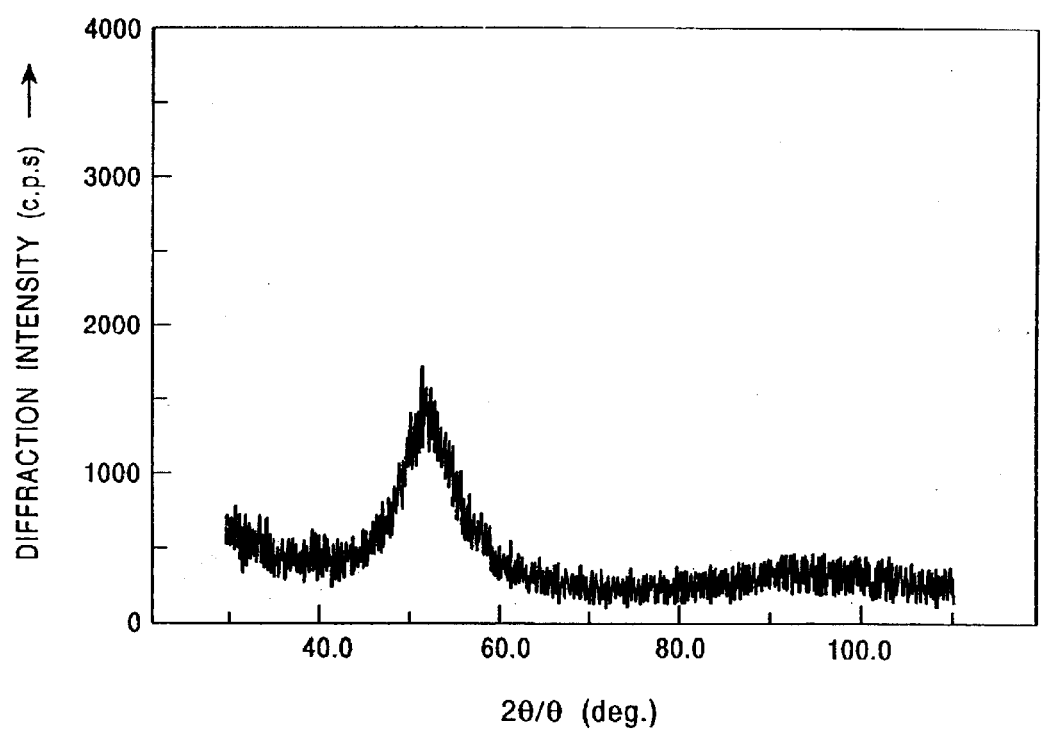
FIG. 58 is a graph illustrating an X-ray diffraction pattern of an injection-molding article in accordance with EXAMPLE 8-19.
Figure 59:
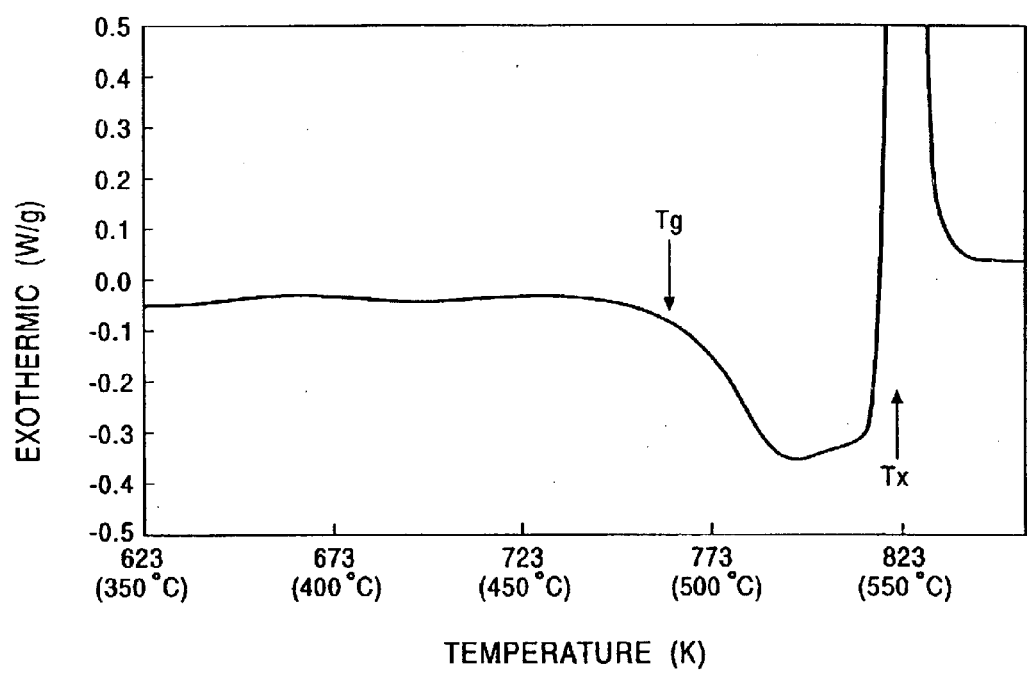
FIG. 59 is a DSC thermogram of the injection-molding article in accordance with EXAMPLE 8-19.

FIG. 58 illustrates that the injection-molding article of EXAMPLE 8-19 has a broad X-ray diffraction pattern which is assigned to an amorphous phase. FIG. 59 illustrates that the DSC thermogram has a glass transition temperature $T_g$ at 760 K and a crystallization temperature $T_x$ at 822 K, thus the temperature difference $\Delta T_x$ in a supercooled liquid being 62 K.

As described above, the injection-molding article of EXAMPLE 8-19 has a wide supercooled liquid region below the crystallization temperature $T_x$ regardless of the Ga-free composition and a large $\Delta T_x$ ($=T_x-T_g$) as a glassy alloy.

The injection-molding articles of EXAMPLE 8-19 and COMPARATIVE EXAMPLE 8-2 were annealed at 698 K for 30 minutes. B-H curves of unannealed articles and annealed articles were measured. The results are shown in FIG. 60 to 63. Moreover, the magnetic characteristics of these articles are shown in Table 6 in which the magnetization $B_{800}$ indicates a magnetization in an external magnetic field of 800 A/m.

decreases and the coercive force (Hc) increases. Thus, the soft magnetic characteristics are impaired by annealing. It is considered that a crystalline phase precipitates during annealing and the internal stress increases in the injection-molding article, although no diffraction patterns suggesting an amorphous phase were observed by X-ray diffractometry of this injection molding article.

Although no crystalline phases are identified, the grounds for the assumption of the crystalline phase precipitation are as follows.

First, the amorphous soft-magnetic alloy of the injection-molding article of COMPARATIVE EXAMPLE 8-2 is inferior in amorphous formability to the amorphous soft-magnetic alloy of the injection-molding article of EXAMPLE 8-19. Thus, the regularity of the atomic arrangement in the texture of the alloy of COMPARATIVE EXAMPLE 8-2 is higher than that of EXAMPLE 8-19. As a result, a crystalline phase readily precipitates during annealing.

Second, it is considered that a slight amount of crystalline phase is formed or nuclei facilitating the crystal growth are formed due to low amorphous formability of the amorphous soft-magnetic alloy of COMPARATIVE EXAMPLE 8-2 and crystallization from these nuclei occurs during annealing.

The reason that no crystalline phases are observed by X-ray diffractometry in COMPARATIVE EXAMPLE 8-2 is as follows. The crystalline phase precipitates into part of the texture and thus is not detected by the X-ray diffractometry due to insufficient detection sensitivity.

As described above, the amorphous soft-magnetic alloy of the present invention exhibits high amorphous formability which facilitates the formation of a perfect amorphous phase by quenching an alloy melt. Thus, the internal stress occurring during the quenching process can be relieved without precipitation of a crystalline phase during annealing. As a result, the amorphous soft-magnetic alloy exhibits improved soft magnetic characteristics which are not achieved by conventional glassy alloys.

TABLE 6

| | | Remanence Magnetization Br (T) | Magnetization $B_{800}$ (T) | Coercive Force Hc (A/m) | Remanence Ratio $Br/B_{800}$ |
|---|---|---|---|---|---|
| EXAMPLE 8-19 | Unannealed | 0.28 | 0.605 | 2.79 | 0.463 |
| | Annealed | 0.38 | 0.990 | 1.83 | 0.384 |
| COMPARATIVE | Unannealed | 0.31 | 0.665 | 7.96 | 0.466 |
| EXAMPLE 8-2 | Annealed | 0.02 | 0.995 | 4.00 | 0.020 |

Figure 60:
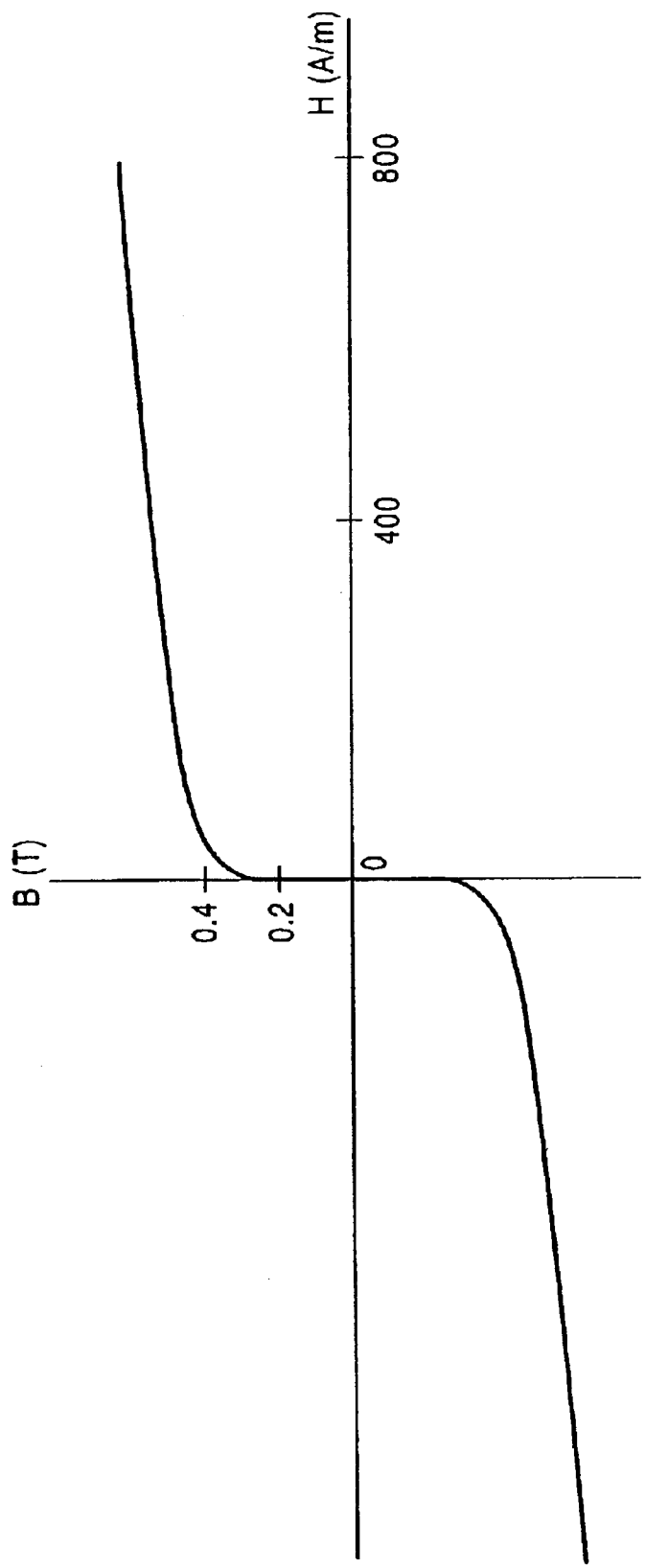
FIG. 60 is a graph illustrating a B-H curve of an injection-molding article before annealing in accordance with EXAMPLE 8-19.
Figure 61:
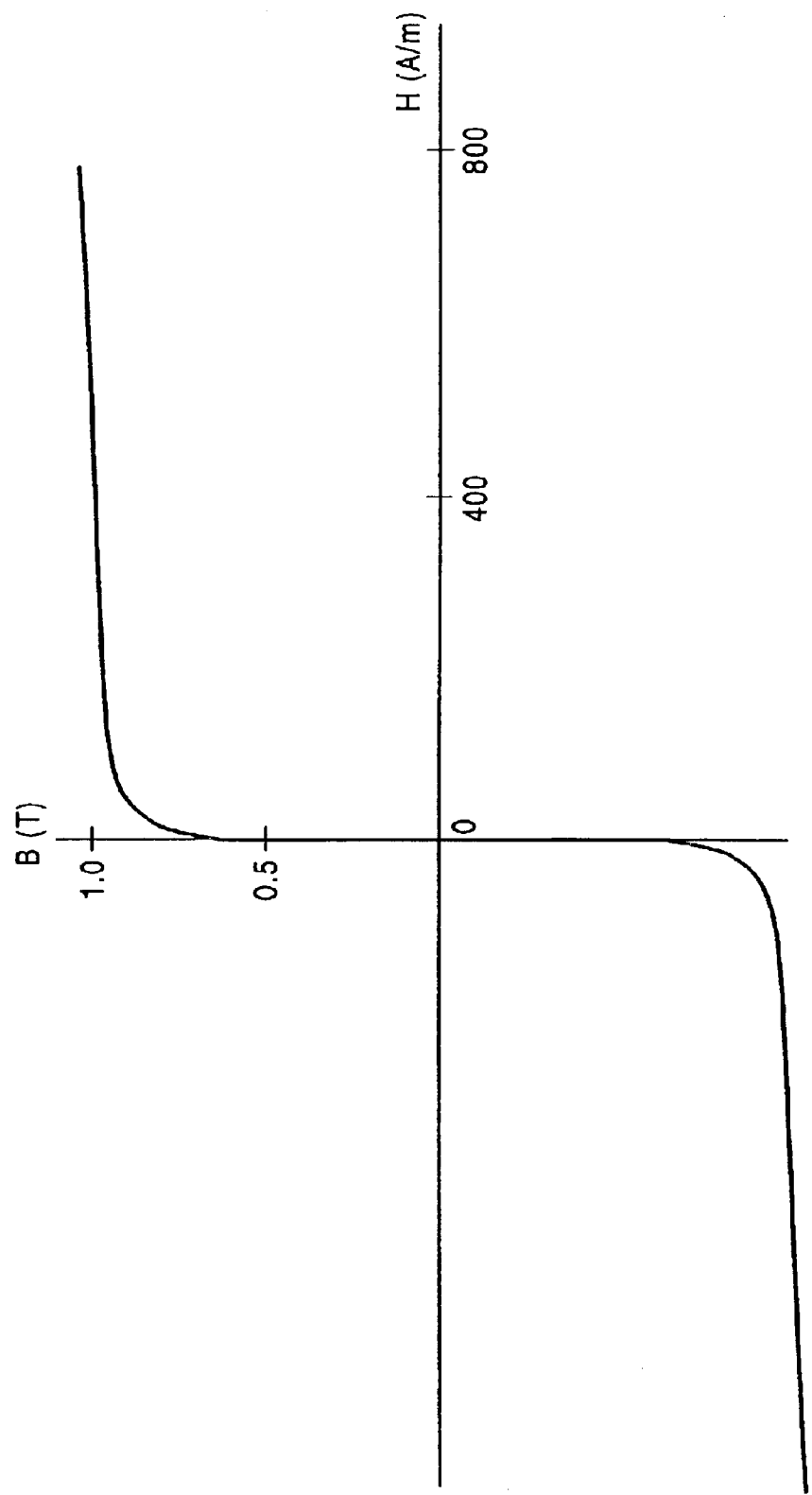
FIG. 61 is a graph illustrating a B-H curve of the injection-molding article after annealing in accordance with EXAMPLE 8-19.

FIGS. 60 and 61 show B-H curves of the unannealed and annealed articles, respectively, of EXAMPLE 8-19. FIGS. 60 and 61 and Table 6 demonstrate that the remanence magnetization (Br) and the magnetization ($B_{800}$) of the injection-molding article of EXAMPLE 8-19 increase by annealing, whereas the coercive force (Hc) decreases. Thus, the soft magnetic characteristics are improved by annealing. It is considered that the internal stress in the injection-molding article is relieved without precipitation of a crystalline phase during annealing.

Figure 62:
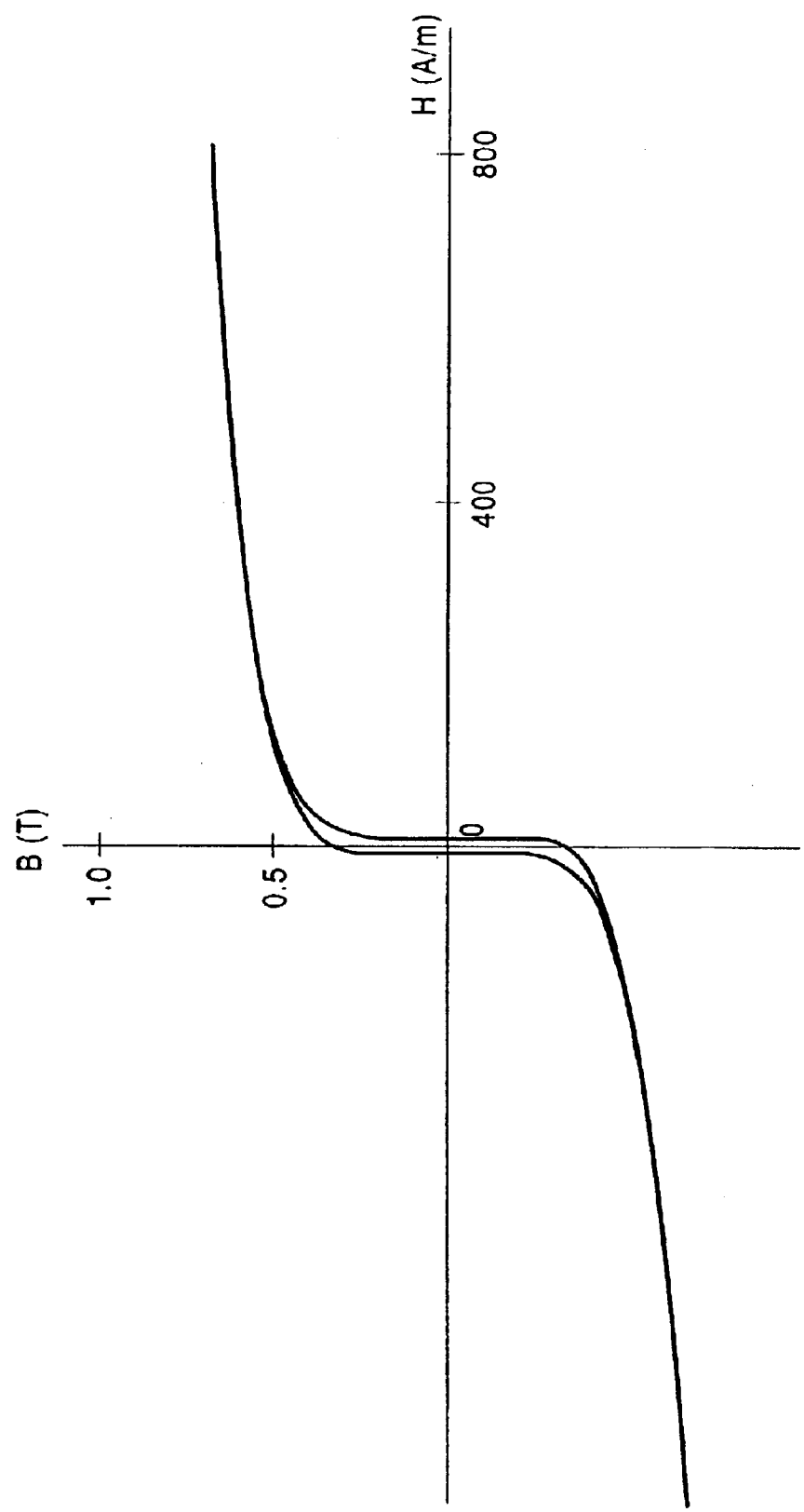
FIG. 62 is a graph illustrating a B-H curve of an injection-molding article before annealing in accordance with COMPARATIVE EXAMPLE 2.
Figure 63:
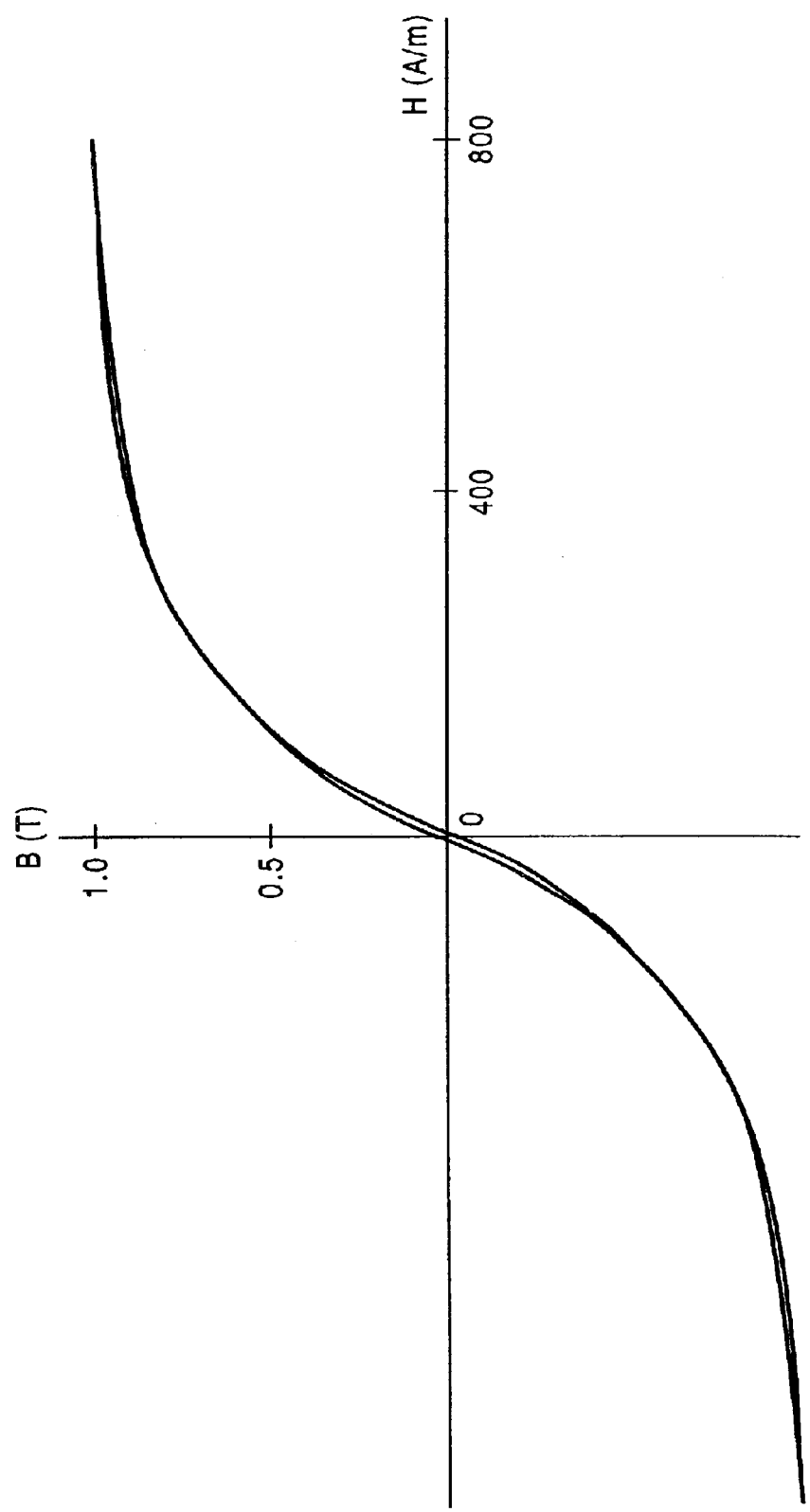
FIG. 63 is a graph illustrating a B-H curve of the injection-molding article after annealing in accordance with COMPARATIVE EXAMPLE 2.

FIGS. 62 and 63 show B-H curves of the unannealed and annealed articles, respectively, of COMPARATIVE EXAMPLE 8-2. FIGS. 62 and 63 and Table 6 demonstrate that the magnetization ($B_{800}$) of the injection-molding article of COMPARATIVE EXAMPLE 8-2 increases by annealing, whereas the remanence magnetization (Br) significantly Since the amorphous soft-magnetic alloy of the present invention contains Fe as a magnetic element and Al, P, C, B, and Si having amorphous formability, this alloy is primarily composed of an amorphous alloy and exhibits superior soft magnetic characteristics. Since Al enhances the amorphous formability, the entire texture can be composed of a perfect amorphous phase.

Since this amorphous soft-magnetic alloy has a large temperature difference $\Delta T_x$ of at least 20 K in a supercooled liquid, an amorphous phase can be formed from a melt at a relatively low cooling rate. Thus, a bulk alloy which is thicker than a tape can be produced. In particular, a bulk casting or injection molding article can be formed by a casting or injection process using a melt of an alloy.

This amorphous soft-magnetic alloy exhibits high amorphous formability compared to the conventional Fe—Al—

Ga—C—P—Si—B alloy. Since a perfect amorphous phase can be formed at a decreased cooling rate, a bulk alloy having a relatively large size and containing an amorphous phase can be produced by a casting process.

Since the entire texture is composed of a complete amorphous phase, the amorphous soft-magnetic alloy exhibits significantly improved permeability and saturation magnetization, resulting in superior soft magnetic characteristics.

The internal stress in the amorphous soft-magnetic alloy can be relieved under an appropriate condition without precipitation of a crystalline phase due to the complete amorphous phase, and the soft magnetic characteristics are further improved.

What is claimed is:

1. An active filter comprising:
a boosting converter circuit comprising:
   a switching element;
   a coil provided with a magnetic core generating a back electromotive force when the switching element breaks a DC current, wherein the magnetic core comprises molded article of a mixture of a glassy alloy powder and an insulating material, the glassy alloy powder having a texture primarily composed of an amorphous phase and exhibiting a temperature difference $\Delta T_x$, which is represented by the equation $\Delta T_x = T_x - T_g$, of at least 20° K. in a supercooled liquid, wherein $T_x$ indicates the crystallization temperature and $T_g$ indicates the glass transition temperature;
a rectifying element connected in series in the forward direction to the coil provided with the magnetic core for rectifying a current generated by the back electromotive force; and
a capacitor for smoothing the rectified current; and
a control unit for controlling the switching interval of the switching element of the boosting converter circuit.

* * * * *

UNITED STATES PATENT AND TRADEMARK OFFICE
CERTIFICATE OF CORRECTION

PATENT NO.    : 6,897,718 B2
DATED         : May 24, 2005
INVENTOR(S)   : Shoji Yoshida et al.

It is certified that error appears in the above-identified patent and that said Letters Patent is hereby corrected as shown below:

<u>Column 56,</u>
Line 7, after "at least 20° K" delete "." (period).

Signed and Sealed this

Fourth Day of April, 2006

JON W. DUDAS
*Director of the United States Patent and Trademark Office*